US012529464B2

(12) United States Patent
Snell et al.

(10) Patent No.: US 12,529,464 B2
(45) **Date of Patent: *Jan. 20, 2026**

(54) LIGHTING FIXTURE WITH PERIPHERAL LIGHT EMISSION FEATURE

(71) Applicant: CREE LIGHTING USA LLC, Racine, WI (US)

(72) Inventors: Nathan R. Snell, Raleigh, NC (US); Randy Bernard, Durham, NC (US); Kurt Schreib, Waukesha, WI (US); Moxuan Zhu, Cary, NC (US); Kurt S. Wilcox, Libertyville, IL (US)

(73) Assignee: CREE LIGHTING USA LLC, Racine, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/805,152

(22) Filed: Aug. 14, 2024

(65) Prior Publication Data

US 2024/0401776 A1 Dec. 5, 2024

Related U.S. Application Data

(63) Continuation of application No. 18/006,118, filed as application No. PCT/US2021/042743 on Jul. 22, 2021, now Pat. No. 12,078,342.

(Continued)

(51) Int. Cl.

*F21V 9/02* (2018.01)
*F21S 8/02* (2006.01)

(Continued)

(52) U.S. Cl.

CPC ................ *F21V 9/02* (2013.01); *F21S 8/024* (2013.01); *F21S 8/026* (2013.01); *F21S 8/06* (2013.01);

(Continued)

(58) Field of Classification Search

None

See application file for complete search history.

(56) References Cited

U.S. PATENT DOCUMENTS 10,605,978 B2 * 3/2020 Blessitt ................ G02B 6/0068
10,935,212 B1 * 3/2021 Stolte ...................... F21S 8/026

(Continued)

FOREIGN PATENT DOCUMENTS

DE 202020106342 U1 * 3/2021 ............. F21S 10/02

*Primary Examiner* — Alexander K Garlen

(74) *Attorney, Agent, or Firm* — J. Clinton Wimbish; Maynard Nexsen PC

(57) ABSTRACT

A lighting fixture incorporates a peripheral light emission feature, such as a peripheral waveguide and/or a peripheral reflector region. A peripheral light emission feature may at least partially surround a non-peripheral feature that may include a light-transmissive panel. At least one first light source may illuminate a peripheral light emission feature, and at least one second light source may illuminate a light transmissive panel. Control circuitry is configured to selectively adjust intensity and/or color temperature of the light sources to cause aggregate emissions of the lighting fixture (or a lighting system with multiple lighting fixtures) to dynamically change over time (e.g., with different intensities and color temperature), so as resemble a skylight or window. A viewer may thereby perceive at least portions of a space as being naturally illuminated.

19 Claims, 51 Drawing Sheets

Related U.S. Application Data

(60) Provisional application No. 63/055,895, filed on Jul. 23, 2020, provisional application No. 63/055,847, filed on Jul. 23, 2020.

(51) Int. Cl.

| | |
|---|---|
| ***F21S 8/06*** | (2006.01) |
| ***F21S 10/00*** | (2006.01) |
| ***F21V 7/00*** | (2006.01) |
| ***F21V 8/00*** | (2006.01) |
| ***F21Y 113/13*** | (2016.01) |
| ***F21Y 115/10*** | (2016.01) |
| ***H05B 45/10*** | (2020.01) |
| ***H05B 45/20*** | (2020.01) |

(52) U.S. Cl.

CPC .......... *F21S 10/005* (2013.01); *F21V 7/0016* (2013.01); *G02B 6/0075* (2013.01); *H05B 45/10* (2020.01); *H05B 45/20* (2020.01); *F21V 2200/20* (2015.01); *F21Y 2113/13* (2016.08); *F21Y 2115/10* (2016.08)

(56) References Cited

U.S. PATENT DOCUMENTS

| | | | | |
|---|---|---|---|---|
| 2008/0273323 | A1* | 11/2008 | Ladstaetter ............... | F21S 8/04<br>362/231 |
| 2012/0320588 | A1* | 12/2012 | Quilici .................... | F21S 8/026<br>362/249.02 |
| 2014/0160736 | A1* | 6/2014 | Chung ...................... | F21S 8/03<br>362/249.02 |
| 2014/0355302 | A1* | 12/2014 | Wilcox ............... | F21V 23/0464<br>362/609 |
| 2015/0109820 | A1* | 4/2015 | Wilcox .................. | G02B 6/262<br>385/47 |
| 2015/0198760 | A1* | 7/2015 | Wilcox ................ | G02B 6/0015<br>362/610 |
| 2017/0082269 | A1* | 3/2017 | Castillo ................ | G02B 6/0046 |
| 2017/0138553 | A1* | 5/2017 | Ferrari ...................... | F21S 8/06 |
| 2017/0254487 | A1* | 9/2017 | Matsubayashi ........... | F21K 9/61 |
| 2018/0252374 | A1* | 9/2018 | Keller ..................... | F21S 8/026 |
| 2018/0259140 | A1* | 9/2018 | Keller .................... | H05B 47/11 |
| 2020/0264364 | A1* | 8/2020 | Sieberth ............... | G02B 6/0073 |
| 2021/0207786 | A1* | 7/2021 | Chang .................. | G02B 6/0083 |

* cited by examiner

LIGHTING FIXTURE WITH PERIPHERAL LIGHT EMISSION FEATURE

CROSS-REFERENCE TO RELATED APPLICATIONS

This application is a continuation application of U.S. patent application Ser. No. 18/006,118 filed Jan. 19, 2023 which is a 35 U.S.C. § 371 national phase filing of International Application No. PCT/US2021/042743 filed on Jul. 22, 2021, and claims priority to U.S. Provisional Patent Application No. 63/055,847 filed on Jul. 23, 2020 and to U.S. Provisional Patent Application No. 63/055,895 filed on Jul. 23, 2020, wherein the entire disclosures of the foregoing applications are hereby incorporated by reference herein.

FIELD OF THE DISCLOSURE

The present disclosure relates to a lighting fixtures incorporating peripheral light emission features and/or waveguides, as well as systems incorporating such fixtures.

BACKGROUND

Lighting fixtures increasingly utilize lighting technologies with increased efficiency (e.g., relative to incandescent light bulbs) and/or which produce a more pleasing, natural light (e.g., relative to fluorescent lighting fixtures). One such lighting technology is light emitting diodes (LEDs). Compared with incandescent sources, LED-based lighting fixtures are much more efficient at converting electrical energy into light, are longer lasting, and are also capable of producing light that is very natural. Compared with fluorescent lighting, LED-based fixtures are also very efficient, but are capable of producing light that is much more natural and more capable of accurately rendering colors. LED sources may also be provided in numerous color points and may be controlled to provide lighting effects not easily achievable with other (e.g., incandescent and fluorescent) sources in light fixtures. As a result, lighting fixtures that employ LED technologies are replacing incandescent and fluorescent bulbs in residential, commercial, and industrial applications.

Various LED-based lighting fixtures are known. However, some of these lighting fixtures may provide inferior performance and/or aesthetics. For example, some ceiling-mounted lighting fixtures may direct and/or reflect light in such a way that results in hard and uneven illumination. Further, it may be challenging to integrate conventional lighting fixtures with architectural and/or functional features that may be provided in a space to be illuminated, particularly in a manner that is cost effective, aesthetically pleasing, and/or unobtrusive.

A skylight is a window that is generally installed in a roof or ceiling. Windows, including skylights, beneficially admit natural light and are desirable in residential and commercial buildings. Providing natural light is known to enhance mood, increase productivity, maintain circadian rhythms, and improve ambiance among other benefits. Skylights can be used to supplement natural light provided by windows, and frequently represent the only option to provide natural light to interior spaces that do not abut exterior walls of a structure where windows would be ineffective.

Unfortunately, providing skylights in many spaces is impractical or impossible. The lower floors of a multi-story building typically lack direct access to the roof of the building. In many instances, even a top floor of a building may have structural or mechanical components that prevent the installation of skylights, limit the functionality of skylights, or would cause installation of the skylights to be too expensive.

Accordingly, there is a need to provide the benefits of windows and/or skylights to spaces where installation of skylights and/or windows would be impractical or impossible, particularly in a manner that is cost-effective and aesthetically pleasing.

SUMMARY

The present disclosure relates to a lighting fixture incorporating a peripheral light emission feature. A peripheral light emission feature may include a plurality of light sources distributed around a periphery of the lighting fixture and configured to illuminate a peripheral light emission feature defining a peripheral region, optionally in conjunction with a peripheral reflector defining a peripheral reflector region laterally enclosing a non-reflector region and arranged around substantially an entire perimeter of the lighting fixture. A peripheral light emission feature may include a waveguide defining a peripheral waveguide region laterally enclosing a non-waveguide region and arranged around substantially an entire perimeter of the lighting fixture. A peripheral light emission feature may include at least one waveguide that is used in conjunction with a light-transmissive panel, with the waveguide and light-transmissive panel being illuminated by different light sources. A lighting fixture may include a light-transmissive panel that is configured to be recessed, at least one waveguide positioned along a perimeter of the light-transmissive panel and transverse to the light-transmissive panel, separate light sources configured to illuminate the light-transmissive panel and the at least one waveguide, and control circuitry. The control circuitry is configured to selectively adjust intensity and/or color temperature of the light sources to cause aggregate emissions of the lighting fixture to dynamically change over time. Portions or an entirety of a resulting light fixture may resemble a skylight or transom window. A lighting system incorporates a plurality of lighting fixtures each including a light transmissive panel, at least one waveguide, and separate light sources configured to illuminate the light-transmissive panel and the at least one waveguide, and control circuitry. The control circuitry is configured to selectively adjust intensity and/or color temperature of the light sources to cause aggregate emissions of the lighting fixture to dynamically change over time, wherein during at least some times the dynamic change of emissions of the lighting system includes simultaneous operation of different lighting fixtures to provide different intensities and/or color temperatures. Lighting fixtures may be suspended or recessed, and such fixtures may be operated in a manner that a viewer perceives at least portions of a space as being naturally illuminated.

In one aspect, a lighting fixture includes: a light-transmissive panel; at least one peripheral light emission feature arranged around at least part of a periphery of the light-transmissive panel; at least one first light source configured to illuminate the light-transmissive panel; at least one second light source configured to illuminate the at least one peripheral light emission feature; and control circuitry configured to selectively adjust, for one or more of the at least one first light source and the at least one second light source, at least one of intensity and color temperature to cause aggregate emissions of the lighting fixture to dynamically change over time.

In certain embodiments, the at least one peripheral light emission feature comprises at least one waveguide that comprises at least one light extraction feature configured to emit light into a space to be illuminated by the lighting fixture.

In certain embodiments, the at least one waveguide comprises a face that is transversely oriented relative to the light-transmissive panel and extends from the light-transmissive panel to a waveguide distal edge that is spaced from the light-transmissive panel.

In certain embodiments, the at least one waveguide comprises a plurality of waveguides, the at least one second light source comprises a plurality of second light sources, and each second light source is configured to illuminate a different waveguide of the plurality of waveguides.

In certain embodiments, the at least one peripheral light emission feature comprises at least one peripheral reflector region that is configured to reflect at least a portion of emissions of the at least one second light source in a downward direction.

In certain embodiments, the at least one first light source comprises a first plurality of LEDs, and the at least one second light source comprises a second plurality of LEDs.

In certain embodiments, the at least one light-transmissive panel in combination with the first light source are configured to emulate a window portion of a traditional skylight, without allowing transmission of natural light from an external environment through the at least one light-transmissive panel.

In certain embodiments, the control circuitry is configured to selectively adjust at least one of intensity and color temperature for the at least one first light source and for the at least one second light source to illuminate the light-transmissive panel and the at least one peripheral light emission feature such that the lighting fixture resembles a skylight that is externally illuminated by the sun, and such that a perceived direction of external illumination of the lighting fixture moves from east to west over time. The control circuitry may be additionally or separately configured to provide any other effects disclosed herein.

In another aspect, a lighting fixture includes a light-transmissive panel configured to be recessed with respect to a surface of a static structure, and at least one waveguide positioned along a perimeter of the light-transmissive panel, wherein the at least one waveguide comprises a face that is transversely oriented relative to the light-transmissive panel and extends from the light-transmissive panel to a waveguide distal edge that is spaced from the light-transmissive panel. The lighting fixture further includes at least one first light source configured to illuminate the light-transmissive panel, and at least one second light source configured to illuminate the at least one waveguide. The lighting fixture additionally includes control circuitry that is configured to selectively adjust, for one or more of the at least one first light source and the at least one second light source, at least one of intensity and color temperature to cause aggregate emissions of the lighting fixture to dynamically change over time.

In certain embodiments, the control circuitry is configured to selectively adjust at least one of intensity and color temperature for the at least one first light source and for the at least one second light source to illuminate the light-transmissive panel and the at least one waveguide such that the lighting fixture resembles a skylight that is externally illuminated by the sun, and such that a perceived direction of external illumination of the lighting fixture moves from east to west over time.

In certain embodiments, the control circuitry is configured to selectively adjust at least one of intensity and color temperature for the at least one second light source to illuminate the at least one waveguide in a manner such that the at least one waveguide resembles being externally illuminated by the sun with a perceived direction of external illumination of the at least one waveguide moving from east to west over time, while the light-transmissive panel is illuminated by the at least one first light source but does not appear to be externally illuminated by the sun. Restated, the at least one waveguide may appear to be sun-illuminated while the light-transmissive panel does not appear to be sun-illuminated.

In certain embodiments, the control circuitry is configured to selectively adjust at least one of intensity and color temperature for the at least one first light source to illuminate the light-transmissive panel in a manner such that the light-transmissive panel resembles being externally illuminated by the sun with a perceived direction of external illumination of the light-transmissive panel moving from east to west over time, while the at least one waveguide is illuminated by the at least one second light source but does not appear to be externally illuminated by the sun. Restated, the light-transmissive panel may appear to be sun-illuminated while the at least one waveguide does not appear to be sun-illuminated.

In certain embodiments, the at least one waveguide comprises a plurality of waveguides, the at least one second light source comprises a plurality of second light sources, and each second light source is configured to illuminate a different waveguide of the plurality of waveguides.

In certain embodiments, the at least one waveguide comprises a plurality of waveguides; the at least one second light source comprises a plurality of second light sources, with each second light source of the plurality of second light sources being configured to illuminate a different waveguide of the plurality of waveguides; the light-transmissive panel comprises a substantially rectangular shape bounded by first through fourth edges of the light-transmissive panel; the plurality of waveguides comprises first through fourth waveguides bounding the first through fourth edges of the light-transmissive panel, respectively; and each second light source of the plurality of second light sources is separately controllable by the control circuitry to separately adjust at least one of intensity and color temperature of emissions with which the first through fourth waveguides are illuminated. Such an embodiment may be suitable for in-ceiling mounting.

In certain embodiments, the at least one waveguide comprises a plurality of waveguides; the at least one second light source comprises a plurality of second light sources, with each second light source of the plurality of second light sources being configured to illuminate a different waveguide of the plurality of waveguides; the light-transmissive panel comprises a substantially rectangular shape bounded by first through fourth edges of the illuminated panel; the plurality of waveguides comprises first through third waveguides bounding first through third edges of the illuminated panel, respectively; and each second light source of the plurality of second light sources is separately controllable by the control circuitry to separately adjust at least one of intensity and color temperature of emissions with which the first through third waveguides are illuminated. Such an embodiment may be suitable for mounting within a wall (e.g., to resemble a transom window).

In certain embodiments, the static structure comprises a lateral wall of a space to be illuminated, and the light-transmissive panel is recessed into the lateral wall.

In certain embodiments, the at least one waveguide comprises a face having a plurality of light extraction features.

In certain embodiments, the at least one waveguide comprises a plurality of waveguides, and at least some waveguides of the plurality of waveguides are substantially coplanar.

In certain embodiments, the at least one waveguide comprises a curved face.

In another aspect, the disclosure relates to a lighting system that includes a plurality of lighting fixtures arranged in a single space to be illuminated and associated control circuitry. Each lighting fixture comprises: a light-transmissive panel; at least one waveguide positioned along a perimeter of the light-transmissive panel, wherein the at least one waveguide comprises a face that is transversely oriented relative to the light-transmissive panel and extends from the light-transmissive panel to a waveguide distal edge spaced from the light-transmissive panel; at least one first light source configured to illuminate the light-transmissive panel; and at least one second light source configured to illuminate the at least one waveguide. The control circuitry is configured to selectively adjust, for one or more of (i) at least one light source and (ii) the at least one second light source and separately for each lighting fixture of the plurality of lighting fixtures, at least one of intensity and color temperature to cause emissions of the lighting system to dynamically change over time, wherein during at least some times the dynamic change of emissions of the lighting system includes simultaneous illumination of different lighting fixtures of the plurality of lighting fixtures at different intensities and/or color temperatures.

In certain embodiments, at least a portion of each lighting fixture of the plurality of lighting fixtures resembles a skylight that is externally illuminated by the sun, and the dynamic change of emissions of the lighting system includes illumination of different lighting fixtures of the plurality of lighting fixtures at different intensities and/or color temperatures to cause a perceived direction of external illumination of the plurality of lighting fixtures to move from east to west over time.

In certain embodiments, for each lighting fixture of the plurality of lighting fixtures, the at least one waveguide comprises a plurality of waveguides, the at least one second light source comprises a plurality of second light sources, and each second light source is configured to illuminate a different waveguide of the plurality of waveguides.

In certain embodiments, at least one lighting fixture of the plurality of lighting fixtures is configured to be recessed into a static structure bounding at least a portion of a space to be illuminated.

In certain embodiments, at least one lighting fixture of the plurality of lighting fixtures is configured to be suspended from a ceiling structure. In certain embodiments, the at least one lighting fixture further comprises a third light source configured to transmit emissions in an upward direction.

In certain embodiments, the control circuitry is further configured to selectively adjust, for the third light source of the at least one lighting fixture, at least one of intensity and color temperature of to cause emissions of the third light source to dynamically change over time.

In another aspect, a lighting fixture includes at least one peripheral reflector defining at least one peripheral reflector region laterally enclosing a non-reflector region, wherein the at least one peripheral reflector region is arranged around substantially an entire perimeter of the lighting fixture. The lighting fixture further includes a plurality of light sources distributed around a periphery of the lighting fixture and configured to illuminate the at least one peripheral reflector region. The at least one peripheral reflector is configured to reflect at least a portion of emissions of the plurality of light sources in a downward direction.

In certain embodiments, the at least one peripheral reflector is configured to reflect substantially an entirety of the emissions of the plurality of light sources in the downward direction for indirect illumination of a space in which the lighting fixture is arranged. In certain embodiments, the at least one peripheral reflector includes a curved cross-sectional shape. In certain embodiments, the at least one peripheral reflector is configured for diffuse reflection. In certain embodiments, the at least one peripheral reflector is configured for specular reflection. In certain embodiments, the at least one peripheral reflector region is arranged around at least 95% of the entire perimeter. In certain embodiments, the at least one peripheral reflector region is arranged around the entire perimeter. In certain embodiments, the at least one peripheral reflector region includes less than 50% of a total projected bottom area of the lighting fixture. In certain embodiments, the at least one peripheral reflector region includes less than 20% of a total projected bottom area of the lighting fixture.

In certain embodiments, the at least one reflector region encloses a shape that is generally rectangular, hexagonal, circular, or oval. In certain embodiments, the at least one reflector region encloses a shape having four or more sides. In certain embodiments, the non-reflector region includes an unfilled opening. In certain embodiments, the non-reflector region includes an opening arranged in the non-reflector region, the opening configured to be at least partially filled by at least one functional feature. In certain embodiments, the at least one functional feature includes at least one of a ceiling tile, an air duct opening, a downlight, a skylight, a light-transmissive panel resembling a skylight (i.e., a skylight fixture), a smoke detector, or a sensor. In certain embodiments, the lighting fixture further includes acoustic insulation arranged within at least a portion of the non-reflector region.

In certain embodiments, the lighting fixture is devoid of a lens arranged between the plurality of light sources and a light output surface configured to direct the at least a portion of the emissions of the plurality of light sources in the downward direction. In certain embodiments, the lighting fixture is devoid of a diffuser arranged between the plurality of light sources and a light output surface configured to direct the at least a portion of the emissions of the plurality of light sources in the downward direction. In certain embodiments, the lighting fixture is devoid of a lens and a diffuser in a light path originating from the plurality of light sources and the at least a portion of the emissions emitted into an environment containing the lighting fixture.

In certain embodiments, the lighting fixture is configured to be at least partially recessed into a ceiling structure, flush mounted to a ceiling structure, or suspended from a ceiling structure. In certain embodiments, the lighting fixture is configured to be at least partially recessed into a ceiling structure. Further, light sources of a plurality of light sources are configured to be positioned below a visible ceiling plane of the ceiling structure. In certain embodiments, light sources of the plurality of light sources are distributed around an inner edge of the at least one peripheral reflector region. In certain embodiments, light sources of the plurality of light sources are inset relative to an outer edge of the at least one peripheral reflector region.

In certain embodiments, a lighting system includes a plurality of the lighting fixtures arranged to illuminate a space. In certain embodiments, each lighting fixture of the plurality of lighting fixtures abuts at least one other lighting fixture of the plurality of lighting fixtures in an array. In certain embodiments, the array is a one-dimensional array. In certain embodiments, the array is a two-dimensional array. In certain embodiments, the lighting system further includes control circuitry configured to separately adjust, for each lighting fixture of the plurality of lighting fixtures, at least one of intensity, color temperature, and directionality of emissions of the lighting fixture to cause aggregate emissions of the lighting system to dynamically change over time. In certain embodiments, the control circuitry is configured to selectively illuminate a plurality of solid-state light sources such that a perceived direction of external illumination of the lighting fixture moves from east to west over time.

In another aspect, a lighting fixture includes a plurality of subassemblies arranged in an array. Each subassembly of the plurality of subassemblies includes at least one peripheral reflector defining at least one peripheral reflector region laterally enclosing a non-reflector region, wherein the at least one peripheral reflector region is arranged around substantially an entire perimeter of the non-reflector region. Each subassembly further includes a plurality of light sources distributed around a periphery of the non-reflector region and configured to illuminate the at least one peripheral reflector region. The at least one peripheral reflector is configured to reflect at least a portion of emissions of the plurality of light sources in a downward direction.

In certain embodiments, for at least one subassembly of the plurality of subassemblies, the at least one peripheral reflector is configured to reflect substantially an entirety of the emissions of the plurality of light sources in the downward direction for indirect illumination of a space in which the lighting fixture is arranged. In certain embodiments, for at least one subassembly of the plurality of subassemblies, the at least one peripheral reflector includes a curved cross-sectional shape. In certain embodiments, for at least one subassembly of the plurality of subassemblies, the at least one peripheral reflector is configured for diffuse reflection. In certain embodiments, for at least one subassembly of the plurality of subassemblies, the at least one peripheral reflector is configured for specular reflection. In certain embodiments, for at least one subassembly of the plurality of subassemblies, the at least one peripheral reflector region is arranged around at least 95% of the entire perimeter of the non-reflector region of the subassembly. In certain embodiments, for at least one subassembly of the plurality of subassemblies, the at least one peripheral reflector region is arranged around the entire perimeter of the non-reflector region of the subassembly. In certain embodiments, for at least one subassembly of the plurality of subassemblies, the at least one peripheral reflector region includes less than 50% of a total projected bottom area of the subassembly. In certain embodiments, for at least one subassembly of the plurality of subassemblies, the at least one peripheral reflector region includes less than 20% of a total projected bottom area of the subassembly.

In certain embodiments, for at least one subassembly of the plurality of subassemblies, the at least one reflector region encloses a shape that is generally rectangular, hexagonal, circular, or oval. In certain embodiments, for at least one subassembly of the plurality of subassemblies, the at least one reflector region encloses a shape having four or more sides. In certain embodiments, for at least one subassembly of the plurality of subassemblies, the non-reflector region includes an unfilled opening. In certain embodiments, for at least one subassembly of the plurality of subassemblies, the non-reflector region includes an opening arranged in the non-reflector region, the opening configured to be at least partially filled by at least one functional feature. In certain embodiments, the at least one functional feature includes at least one of a ceiling tile, an air duct opening, a downlight, a skylight, a light-transmissive panel resembling a skylight (i.e., a skylight fixture), a smoke detector, or a sensor. In certain embodiments, at least one subassembly of the plurality of subassemblies further includes acoustic insulation arranged within at least a portion of the non-reflector region.

In certain embodiments, at least one subassembly of the plurality of subassemblies is devoid of a lens arranged between the plurality of light sources and a light output surface configured to direct the at least a portion of the emissions of the plurality of light sources in the downward direction. In certain embodiments, at least one subassembly of the plurality of subassemblies is devoid of a diffuser arranged between the plurality of light sources and a light output surface configured to direct the at least a portion of the emissions of the plurality of light sources in the downward direction. In certain embodiments, at least one subassembly of the plurality of subassemblies is devoid of a lens and a diffuser in a light path originating from the plurality of light sources and the at least a portion of the emissions emitted into an environment containing the lighting fixture.

In certain embodiments, the lighting fixture is configured to be at least partially recessed into a ceiling structure, flush mounted to a ceiling structure, or suspended from a ceiling structure. In certain embodiments, the lighting fixture is configured to be at least partially recessed into a ceiling structure. Further, for at least one subassembly of the plurality of subassemblies, light sources are configured to be positioned below a visible ceiling plane of the ceiling structure. In certain embodiments, for at least one subassembly of the plurality of subassemblies, light sources are distributed around an inner edge of the at least one peripheral reflector region. In certain embodiments, for at least one subassembly of the plurality of subassemblies, light sources are inset relative to an outer edge of the at least one peripheral reflector region.

In certain embodiments, the array is a one-dimensional array. In certain embodiments, the array is a two-dimensional array. In certain embodiments, for at least one subassembly of the plurality of subassemblies, at least a portion of the at least one peripheral reflector region overlaps with at least a portion of a peripheral reflector region of another subassembly of the plurality of subassemblies.

In another aspect, a lighting fixture includes at least one peripheral waveguide defining at least one peripheral waveguide region laterally enclosing a non-waveguide region, wherein the at least one peripheral waveguide region is arranged around substantially an entire perimeter of the lighting fixture. The lighting fixture further includes a plurality of light sources configured to illuminate the at least one peripheral waveguide region.

In certain embodiments, the at least one peripheral waveguide region is arranged around at least 95% of the entire perimeter of the lighting fixture. In certain embodiments, the at least one peripheral waveguide region is arranged around the entire perimeter of the lighting fixture. In certain embodiments, the at least one peripheral waveguide region includes less than 50% of a total projected bottom area of the lighting fixture. In certain embodiments, the at least one peripheral waveguide region includes less than 20% of a total projected bottom area of the lighting fixture.

In certain embodiments, the at least one waveguide region encloses a shape that is generally rectangular, hexagonal, circular, or oval. In certain embodiments, the at least one waveguide region encloses a shape having four or more sides. In certain embodiments, the non-waveguide region includes an unfilled opening. In certain embodiments, the non-waveguide region includes an opening arranged in the non-waveguide region, and the opening is configured to be at least partially filled by at least one functional feature. In certain embodiments, the at least one functional feature includes at least one of a ceiling tile, an air duct opening, a downlight, a skylight, a light-transmissive panel resembling a skylight (i.e., a skylight fixture), a smoke detector, or a sensor. In certain embodiments, the lighting fixture further includes acoustic insulation arranged within at least a portion of the non-waveguide region.

In certain embodiments, the lighting fixture is configured to be at least partially recessed into a ceiling structure, flush mounted to a ceiling structure, or suspended from a ceiling structure. In certain embodiments, light sources of the plurality of light sources are distributed around an inner edge of the at least one peripheral waveguide region. In certain embodiments, light sources of the plurality of light sources are inset relative to an outer edge of the at least one peripheral waveguide region.

In certain embodiments, a lighting system includes a plurality of lighting fixtures arranged to illuminate a space. In certain embodiments, lighting fixtures of the plurality of lighting fixtures are arranged in a one-dimensional array. In certain embodiments, lighting fixtures of the plurality of lighting fixtures are arranged in a two-dimensional array.

In another aspect, any of the foregoing aspects, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
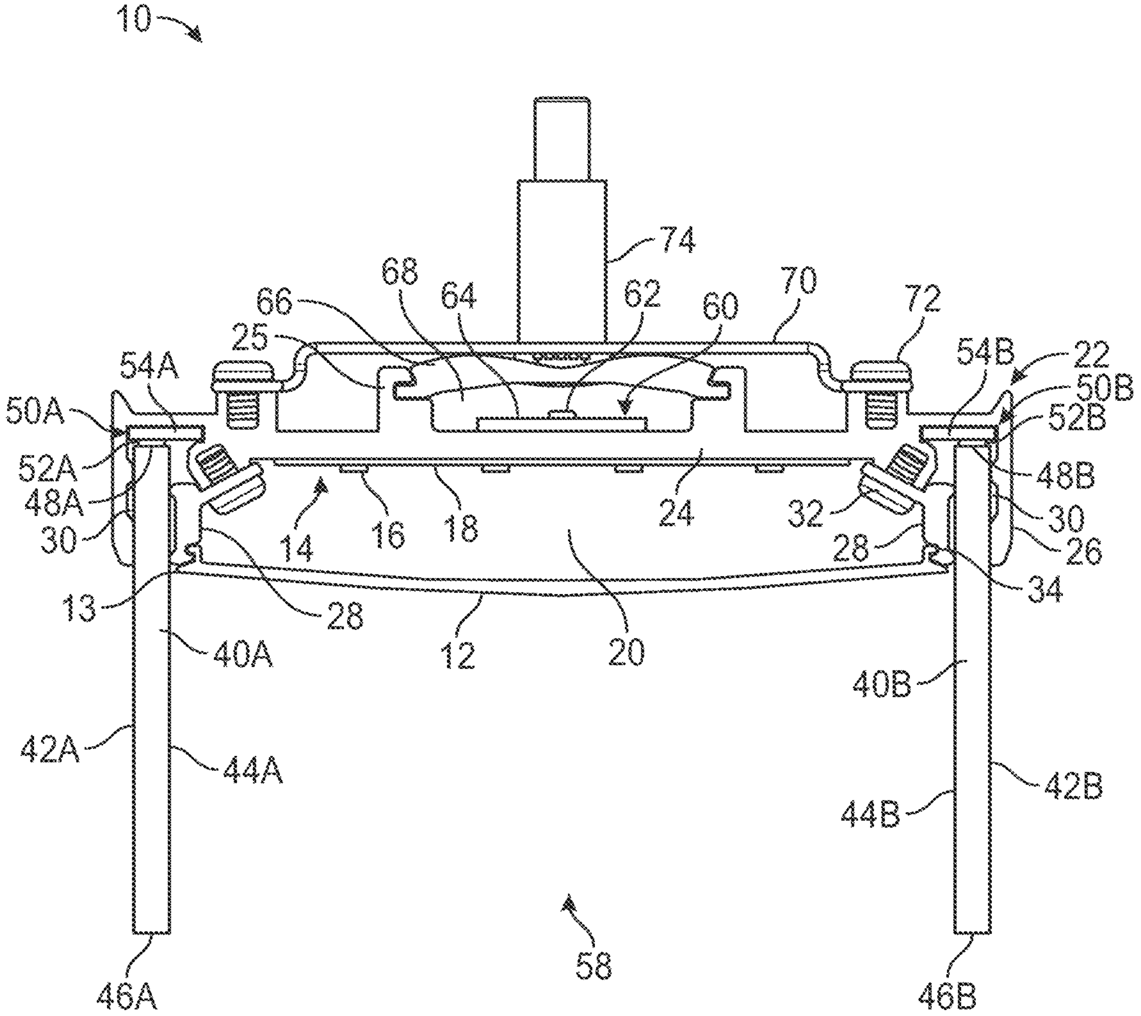
FIG. 1 is a cross-sectional view of a lighting fixture according to one embodiment of the present disclosure, including an illuminated light-transmissive panel configured to emit light in a downward direction, two illuminated waveguides arranged in parallel along peripheral portions of and extending in a transverse direction relative to the light-transmissive panel, and an illuminated upper portion configured to emit light in an upward direction.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As used herein, "luminance" refers to a photometric measure of the luminous intensity per unit area of light travelling in a given direction. Luminance described the amount of light that passes through, is emitted from, or is reflected from a particular area. In one example, the ratio of the maximum luminance uniformity to the minimum luminance uniformity is analyzed according to one or more IES standards, such as but not limited to RP-20 standards for outdoor use and RP-1-12 for office lighting. In one example, a maximum/minimum ratio of less than 3:1 is considered excellent. In one example, a maximum/minimum ratio of less than 5:1 is considered good.

As used herein, "illuminance" refers to the total luminous flux incident on a surface, per unit area. Illuminance is a measure of how much the incident light illuminates the surface, wavelength-weighted by the luminosity function to correlate with human brightness perception.

As used herein, "glare" refers to the difficulty of seeing in the presence of bright light. Glare is caused by a significant ratio of luminance between the object looked at and the glare source.

Visual discomfort is the subjective adverse effects encountered on viewing certain stimuli (e.g., headaches, eyestrain, blurred vision, etc.).

Disabling glare is caused by light too bright for the eye and reduces/blocks visions due to retinal veiling. This type of glare comes from excessive, intense light.

The Unified Glare Rating (UGR) is a measure of the discomfort produced by a lighting system along a psychometric scale of discomfort. In other words, the UGR is an indicative rating for glare based on a prescribed set of circumstances in a lit environment. The UGR is calculated based on an equation that includes the luminance value of the luminaire, the value of background luminance, the solid angle of the luminaire as seen by the viewer, among other considerations.

Visual comfort probability (VCP) is a metric used to rate lighting scenes and is defined as the percentage of people that will find a certain scene (viewpoint and direction) comfortable with regard to visual glare.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

Lighting fixtures according to certain embodiments herein incorporate at least one peripheral emission features. In certain embodiments, a peripheral light emission feature may include a plurality of light sources distributed around a periphery of the lighting fixture and configured to illuminate a peripheral light emission feature defining a peripheral region, optionally in conjunction with a peripheral reflector defining a peripheral reflector region laterally enclosing a non-reflector region and arranged around substantially an entire perimeter of the lighting fixture. In certain embodiments, a peripheral light emission feature may include a waveguide defining a peripheral waveguide region laterally enclosing a non-waveguide region and arranged around substantially an entire perimeter of the lighting fixture. In certain embodiments, a peripheral light emission feature may include at least one waveguide, which is used in conjunction with a light-transmissive panel (optionally configured to be recessed within a structure such as a ceiling or a wall, such as to resemble a skylight or transom window), with the at least one waveguide and the light-transmissive panel being illuminated by different light sources. In certain embodiments, at least one waveguide extends in a direction that is transverse to a light transmissive panel, wherein separate light sources are provided to separately illuminate the light-transmissive panel and the at least one waveguide. Light sources either within one fixture or within multiple fixtures of a lighting system are controlled by control circuitry that may be configured to selectively adjust intensity and/or color temperature of the light sources to cause aggregate emissions of the lighting fixture to dynamically change over time. Lighting fixtures may be suspended or recessed, and such fixtures may be operated in a manner that a viewer perceives at least portions of a space as being naturally illuminated.

In certain embodiments, a light-transmissive panel in combination with at least one light source (e.g., a plurality of LEDs, which may be controlled with control circuitry) are configured to emulate a window portion of a traditional skylight, without allowing transmission of natural light from an external environment through the light-transmissive panel.

Lighting fixtures according to certain embodiments disclosed herein utilize a light-transmissive panel that is illuminated by a first light source, and utilize at least one waveguide arranged transverse to the light-transmissive panel and that is illuminated by at least one second light source.

In certain embodiments, a light-transmissive panel may comprise a display element (e.g., a LED display or a LCD display element), an edge-lit optical element, a backlit optical element, or a side-lit optical element, which may be illuminated with LEDs or other light sources of different colors and/or color points to permit adjustment of localized and/or aggregate color point. In certain embodiments, multiple light-transmissive panels may be provided in any suitable configuration (e.g., abutting one another in an open or closed geometric shape, in a one-dimensional array, or in a two-dimensional array).

As noted previously, lighting fixtures according to certain embodiments include at least one waveguide illuminated by at least one second light source. The at least one waveguide may be arranged along at least a portion of (or substantially an entirety of) a perimeter of the light-transmissive panel. In certain embodiments, at least one waveguide may include multiple waveguides. In certain embodiments, multiple waveguides may be arranged in parallel, such as along two parallel sides of a light-transmissive panel. In certain embodiments, multiple waveguides may be linearly arranged and substantially coplanar with one another (e.g., with an end of one waveguide abutting or proximate to an end of another waveguide). In certain embodiments, a waveguide may include a body structure with one or more faces that are substantially flat, or with one or more faces that are curved. One or more faces of a waveguide may include light extraction features.

An optical waveguide may be used to mix and direct light emitted by one or more light sources, such as one or more light emitting diodes (LEDs). A typical optical waveguide may include one or more coupling elements, one or more distribution elements, and one or more extraction elements, wherein the coupling element(s) direct light into the distribution element(s), and the extraction element(s) determine how light is removed from the waveguide. The distribution element(s) determine how light flows through the waveguide, and are primarily dependent on the waveguide geometry and material. A distribution element may include a waveguide body. Redirecting features may also be used to redirect light traveling laterally through a waveguide body. Various waveguides, including coupling elements, distribution elements, extraction elements, and redirecting features of different types and that may be utilized with lighting fixtures and/or lighting devices described herein are disclosed in U.S. Pat. Nos. 9,366,799, 9,442,243, 9,519,095, 9,625,636, 9,690,029, 9,773,760, 10,042,106, and 10,168,467, wherein the entire disclosures of the foregoing patents are hereby incorporated by reference as if fully set forth herein.

Waveguides according to various embodiments herein preferably comprise optical grade materials that exhibit total internal reflection (TIR) characteristics, such as (but not limited to) one or more of acrylic, polycarbonate, molded silicone, glass, and/or cyclic olefin copolymers, and combinations thereof, optionally in a layered arrangement, to achieve a desired effect and/or appearance. In certain embodiments, waveguides are all solid of a substantially continuous material; in other embodiments, waveguides may have one or more voids or discrete bodies of differing materials therein. Waveguides may be fabricated using procedures such as hot embossing or molding, such as injection molding or compression molding, but other manufacturing methods may be used as desired.

Various structures and methods may be used to promote extraction of light from one or more waveguides used in lighting fixtures as disclosed herein. In certain embodiments, an optical waveguide may include a waveguide body and a film (e.g., a light extraction film) disposed on a surface of the waveguide body, wherein the film includes a base (i.e., a film base) and plurality of undercut light extraction elements disposed between the film base and the surface. The film may be optically transmissive. In certain embodiments, a plurality of undercut light extraction elements may be disposed in a regular pattern between the film base and the surface. Undercut light extraction elements may include features of any suitable shape, such as curved shapes, truncated curved shapes, truncated hemispherical shapes, hexagonal arrays, and the like. A light extraction film may control stray light, promote efficient light extraction, facilitate highly directional light distributions (e.g., a high proportion of light emitted from one side of a waveguide), and/or provide a wide range of illuminate distributions. In certain embodiments, extraction elements and/or optical waveguides may be independently selected from acrylic, silicone, polycarbonate, glass, or other suitable materials to provide a desired effect. Further details regarding light extraction films and related waveguide structures incorporating same that may be incorporated into lighting fixtures and/or lighting devices described herein are disclosed in U.S. Pat. No. 9,651,740, wherein the entire disclosure of the foregoing patent is hereby incorporated by reference as if fully set forth herein.

In certain embodiments, waveguides and associated architectures may be used for dynamic alteration of illuminance distribution patterns. For example, in certain embodiments, a lighting fixture may incorporate at least one waveguide body and individual light sources (e.g., LEDs) having different angular positions relative to the waveguide body for altering illuminance distribution patterns according to one or more activation patterns of the individual light sources. In certain embodiments, individual light sources with differing angular positions can be located along a perimeter of a waveguide body and/or at one or more internal locations of a waveguide body. Further details regarding waveguide-based lighting elements that may be incorporated into lighting fixtures and/or lighting devices described herein are disclosed in U.S. Pat. No. 10,527,785, wherein the entire disclosure of the foregoing patent is hereby incorporated by reference as if fully set forth herein.

In certain embodiments, at least a portion of a lighting fixture resembles a skylight, such that the resulting fixture may be referred to as a skylight fixture. A skylight fixture may include a sky-resembling assembly. In certain embodiments, a light-transmissive panel may embody a sky-resembling assembly. In certain embodiments, at least one waveguide may embody a sky-resembling assembly. A skylight may further include at least one sun-resembling source (preferably multiple sun-resembling sources), which may be embodied in a light-transmissive panel or a waveguide in various embodiments. A sky-resembling assembly has a sky-resembling optical assembly and a sky-specific light source, wherein light from the sky-specific light source exits a surface of the sky-resembling optical assembly as skylight light. In general, light exiting a sky-resembling assembly may be relatively shifted toward blue in the light spectrum to better emulate the appearance of a blue sky. In certain embodiments, light exiting a sky-resembling assembly may have a color point within a first skylight color space (which may be defined by the following x, y coordinates on the 1931 CIE Chromaticity diagram: (0.37, 0.34), (0.35, 0.38), (0.15, 0.20), and (0.20, 0.14)) or within a second skylight color space (which may be defined by the following x, y coordinates on the 1931 CIE Chromaticity diagram: (0.32, 0.31), (0.30, 0.33), (0.15, 0.17), and (0.17, 0.14)). In certain embodiments, light exiting a sun-resembling assembly may have a color point within a first sunlight color space (which may be defined by the following x, y coordinates on the 1931 CIE Chromaticity diagram: (0.29, 0.32), (0.32, 0.29), (0.41, 0.36), (0.48, 0.39), (0.48, 0.43), (0.40, 0.41), and (0.35, 0.38) or within a second sunlight color space (which may be defined by the following x, y coordinates on the 1931 CIE Chromaticity diagram: (0.30, 0.34), (0.30, 0.30), (0.39, 0.36), (0.45, 0.39), (0.47, 0.43), (0.40, 0.41), and (0.35, 0.38)). A sky-resembling assembly and a sun-resembling assembly may be configured to vary a color point of emissions thereof during operation to emulate and/or track changing conditions of outside environments throughout the day and/or night. In certain embodiments, a sky-resembling assembly may comprise a display, an edge-lit optical element, a backlit optical element, or a side-lit optical element, which may be illuminated with LEDs or other light sources of different colors and/or color points to permit adjustment of localized and/or aggregate color point. Further details regarding skylight fixtures and components thereof that may be incorporated into lighting fixtures and/or lighting devices described herein are disclosed in U.S. Pat. Nos. 10,451,229, 10,465,869, and 10,502,374, wherein the entire disclosures of the foregoing patents are hereby incorporated by reference as if fully set forth herein.

Figure 2:
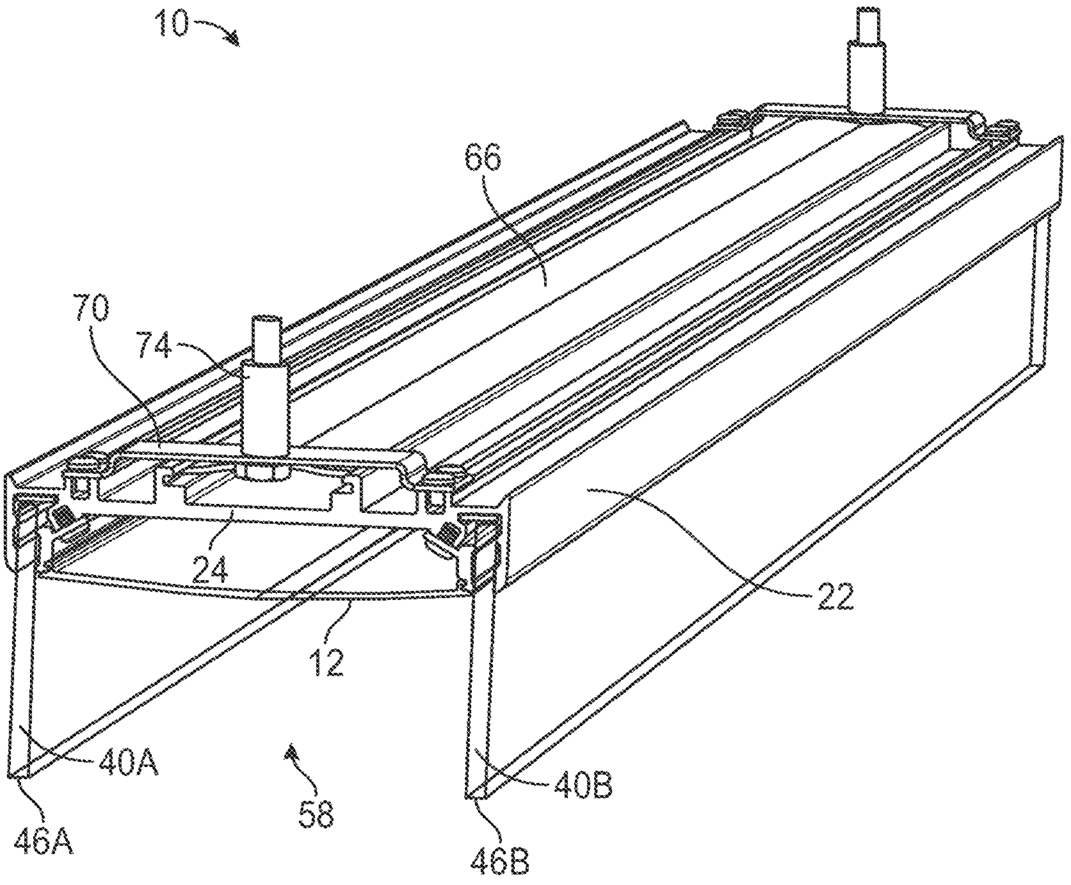
FIG. 2 is a perspective view of the lighting fixture of FIG. 1.

FIGS. 1 and 2 provide cross-sectional and perspective views, respectively, of a lighting fixture 10 according to one embodiment of the present disclosure. The lighting fixture 10 includes a light-transmissive panel 12 that is illuminated by a first light source 14 that includes an array of LEDs 16 supported by a first substrate 18 that may include a circuit board. The light-transmissive panel 12 is separated from the first light source 14 by a first cavity 20. The first substrate 18 is supported by a lateral portion 24 of a frame member 22 that also includes transverse portions 26. The frame member 22 is configured to receive inner retaining members 28 that, in combination with the transverse portions 26, define channels 30 for receiving waveguides 40A, 40B. Each inner retaining member 28 is joined to the frame member 22 with a fastener 32, and may include a retaining feature 34 for receiving portions of the light-transmissive panel 12. Each waveguide 40A, 40B includes an outer face 42A, 42B, an inner face 44A, 44B, and a distal edge 46A, 46B that is positioned distal from the light transmissive panel 12. If desired, light extraction features (not shown) may be arranged on either or both of the outer face 42A, 42B and the inner face 44A, 44B of the waveguides 40A, 40B. As shown, the waveguides 40A, 40B are arranged in parallel along peripheral edges 13 of the light transmissive panel 12 and extend in a transverse direction (e.g., are perpendicular) relative to the light transmissive panel 12. If the lighting fixture 10 is arranged along or suspended from a ceiling structure, the light-transmissive panel 12 may be configured to cast emissions in a generally downward direction, and low-angle emissions from the light-transmissive panel 12 (e.g., in a generally lateral direction) may be filtered or otherwise shielded by the waveguides 40A, 40B.

With further reference to FIG. 1, each waveguide 40A, 40B is configured to be illuminated with a second light source 50A, 50B arranged along a proximal end 48A, 48B of the waveguide 40A, 40B. Each second light source 50A, 50B may include LEDs 52A, 52B supported by a second substrate 54A, 54B that may include a circuit board, with the second substrate 54A, 54B retained by the frame member 22. An inter-waveguide cavity 58 is provided between the waveguides 40A, 40B and is partially bounded by the light-transmissive panel 12. The lighting fixture 10 further includes a third light source 60 that includes LEDs 62 supported by a third substrate 64 (which may include a circuit board) that is arranged on a surface (e.g., upper surface) of the lateral portion 24 of the frame member 22 that opposes the first substrate 18. A light-transmissive cover 66, which may be retained by retaining features 25 of the frame member 22, may be separated from the third light source 60 by a third cavity 68. If the lighting fixture 10 is suspended from above (e.g., from a ceiling structure, using suspension member 74, connecting member 70, and fasteners 72), then the third light source 60 may be configured to transmit emissions through the light-transmissive cover 66 in a generally upward direction.

In certain embodiments, the light sources 14, 50A, 50B, 60 may include light emitting diodes (e.g., LEDs 16, 52A, 52B). In certain embodiments, each such LEDs may embody LED elements or modules that may include individual LEDs that are white or non-white in color, which may be mounted separately or together on a single substrate or package to form a module including, for example, at least one phosphor-coated LED either alone or in combination with at least one colored LED (e.g., a green LED, a yellow LED, a red LED, etc.). Different color temperatures and appearances could be produced using other LED combinations, as known in the art. In certain embodiments, the lighting fixture 10 (and other lighting fixtures disclosed herein) may provide aggregate emissions having a correlated color temperature in a range of 2700K-6500K, and in certain embodiments such correlated color temperature may be adjusted to provide Circadian benefits).

Figure 3:
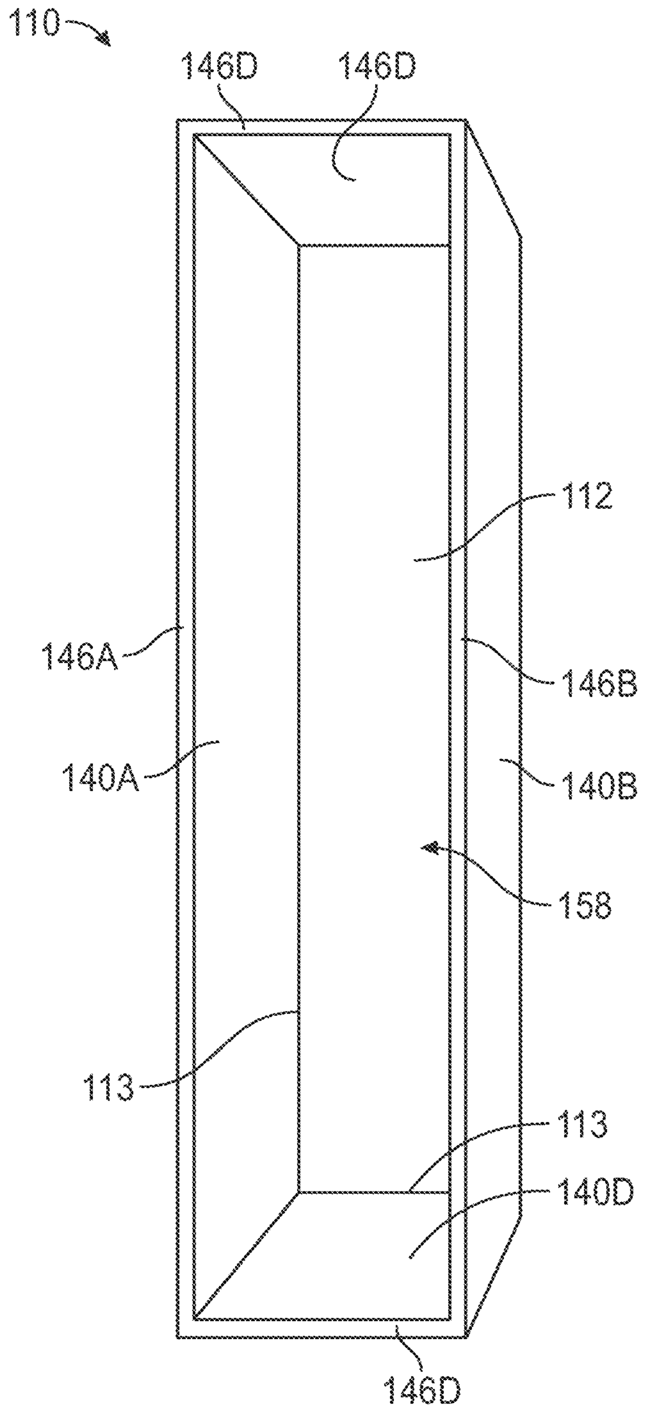
FIG. 3 is a schematic perspective view of a lighting fixture according to one embodiment including an illuminated light-transmissive panel bounded along four sides by illuminated waveguides that extend in a transverse direction relative to the light-transmissive panel.

FIG. 3 is a schematic perspective view of a lighting fixture 110 according to one embodiment including an illuminated light-transmissive panel 112 bounded along four peripheral edges 113 (or sides) by illuminated waveguides 140A-140D that each extend in a transverse direction relative to the light-transmissive panel 112. The light-transmissive panel 112 is configured to be illuminated by a first light source (not shown) and each waveguide 140A-140D has a corresponding second light source (not shown) configured to illuminate the respective waveguide 140A-140D.by a corresponding second light source (not shown). Each waveguide 140A-140D has a distal edge 146A-146D that is positioned distal from the light-transmissive panel 112. An inter-waveguide cavity 158 is provided between the waveguides 140A-140D and is partially bounded by the light-transmissive panel 112.

In certain embodiments, the lighting fixture 110 may be at least partially (or fully) recessed into a ceiling, with the light-transmissive panel 112 being recessed relative to a visible ceiling plane and optionally being positioned in a horizontal orientation. In such an embodiment, the light-transmissive panel 112 may comprise a sky-resembling assembly, and the waveguides 140A-140D may comprise a sun-resembling source. In certain embodiments, the lighting fixture 110 may be at least partially (or fully) recessed into a wall, with the light-transmissive panel 112 being recessed relative to a visible wall plane and optionally being positioned in a vertical orientation, and with at least some of the waveguides 140A-140D each comprising a sun-resembling source. In such an embodiment configured for wall-mounting, a reflective surface may be substituted for an uppermost one of the waveguides 140A-140D, since an uppermost surface of a window positioned horizontally would not typically be illuminated by the sun.

Figure 4A:
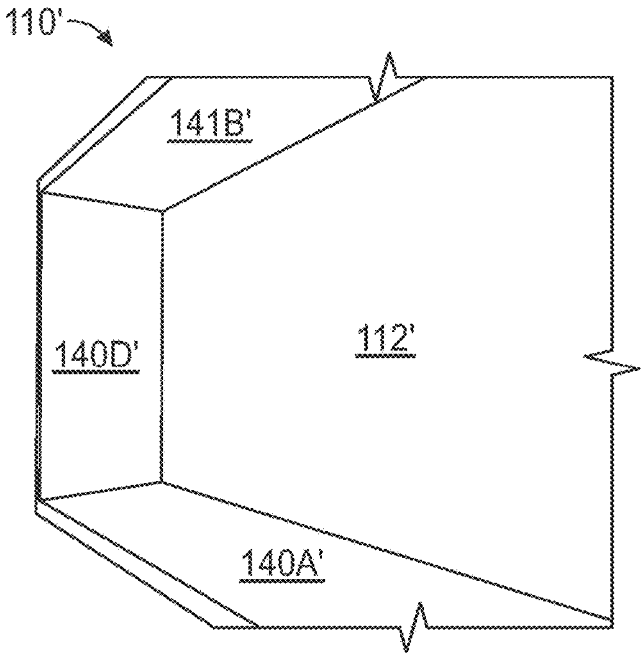
FIG. 4A is a perspective view of a portion of a lighting fixture useable as a transom window, including an illuminated light-transmissive panel bounded along three sides by illuminated waveguides that extend in a transverse direction relative to the light-transmissive panel, and bounded along a fourth side by a reflective (e.g., upper) surface.
Figure 4B:
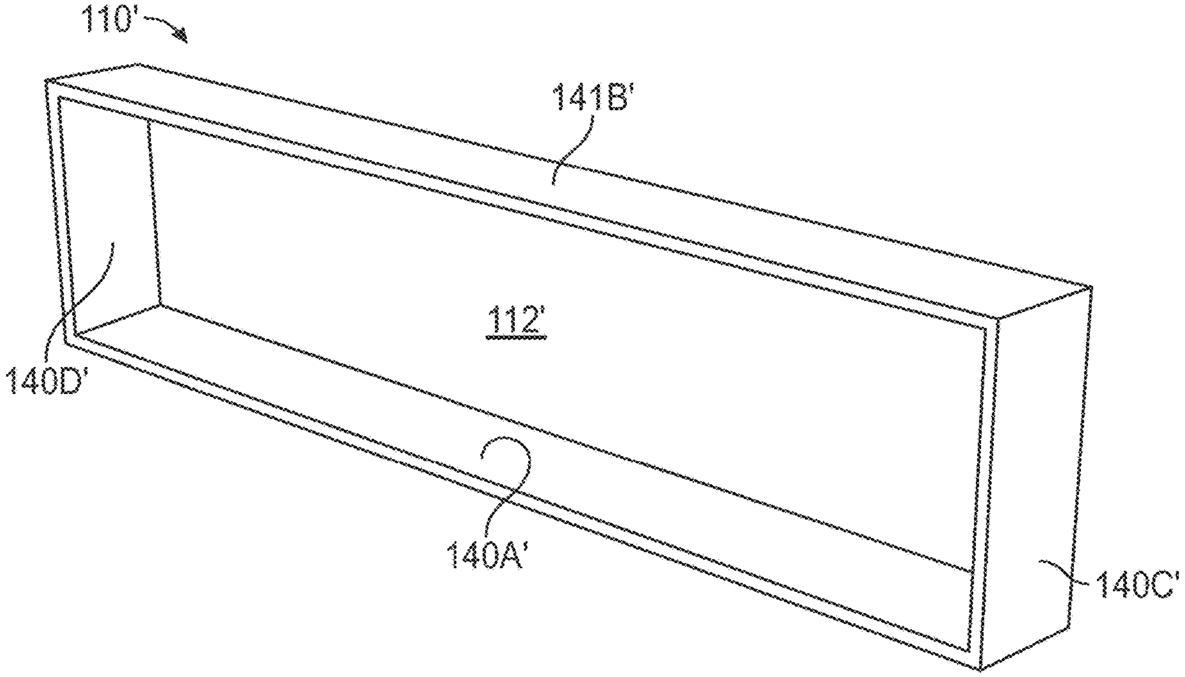
FIG. 4B is a perspective view of a lighting fixture incorporating the portion shown in FIG. 4A.

FIGS. 4A and 4B provide perspective views of a lighting fixture 110' configured to be at least partially recessed into a wall and useable as a transom window (e.g., arrangeable at a level generally above a top of a door defined in the wall), with the lighting fixture 110' including an illuminated light-transmissive panel 112' bounded along three sides by illuminated waveguides 140A', 140C', 140D' that extend in a transverse direction relative to the light-transmissive panel 112', and bounded along a fourth side by a reflective (e.g., upper) surface 141B'. In certain embodiments, the light-transmissive panel 112' comprises a sky-resembling assembly, and each waveguide 140A', 140C', 140D' comprises a sun-resembling source.

Figure 5:
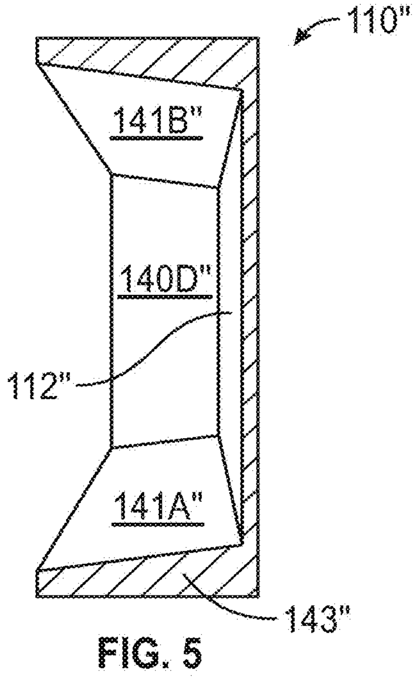
FIG. 5 is a cross-sectional view of a lighting fixture similar to that shown in FIGS. 4A-4B, but with waveguide and/or reflector surfaces angled non-perpendicular to a light-transmissive panel.

In certain embodiments, a lighting fixture may include waveguide surfaces that extend transversely relative to a light-transmissive panel but including one or more surfaces arranged at an angle that is non-perpendicular to a light-transmissive panel. For example, FIG. 5 is a cross-sectional view of a lighting fixture 110" including an illuminated light-transmissive panel 112" bounded along multiple sides by waveguides 140A", 140D" that extend in a transverse direction relative to the light-transmissive panel 112' but that are non-perpendicular to the light-transmissive panel 112". In certain embodiments, the light-transmissive panel 112" may be bounded along at least one side by a reflective (e.g., upper) member 141B". The waveguides 140A", 140D" and/or reflective member 141B" may have a tapered cross-sectional shape as shown. In certain embodiments, the light-transmissive panel 112" comprises a sky-resembling assembly, and each waveguide 140A", 140D" comprises a sun-resembling source.

Figure 6:
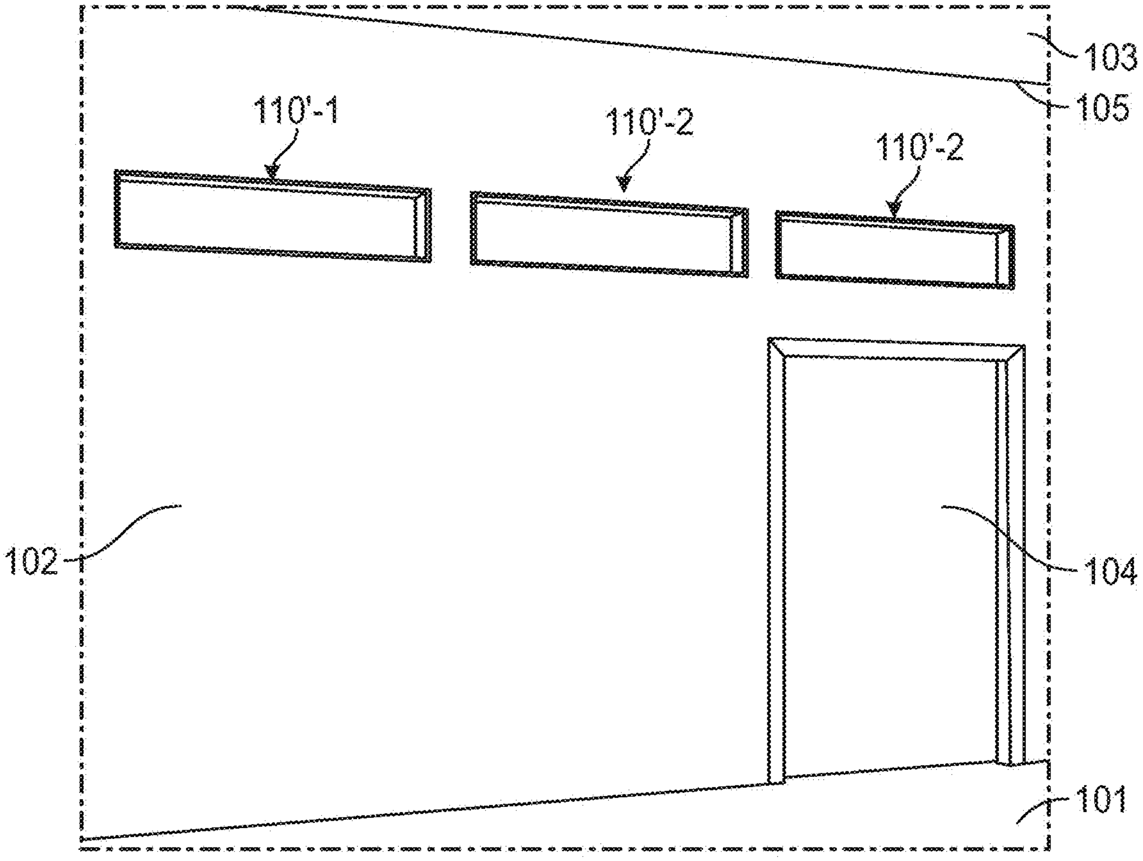
FIG. 6 is a perspective view of three lighting fixtures according to FIG. 5 recessed within a wall and oriented in a horizontal direction to resemble transom windows at a level generally above a door defined in the wall.

FIG. 6 is a perspective view of three lighting fixtures 110'-1 to 110'-3 each according to FIGS. 4A-4B recessed within a wall 102. The wall 102 extends in a vertical direction between a floor 101 and a ceiling 103. The lighting fixtures 110'-1 to 110'-3 are oriented in a horizontal direction to resemble transom windows at a level generally above a door 104 defined in the wall 102 and below a wall-ceiling interface 105.

Figure 7:
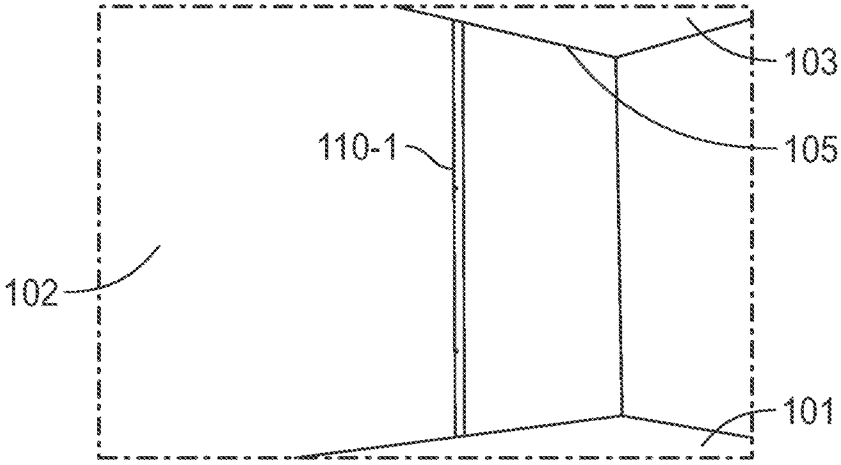
FIG. 7 is a perspective view of a lighting fixture recessed within a wall, extending from floor to ceiling, and oriented in a vertical direction to resemble a window, with the lighting fixture including an illuminated light-transmissive panel bounded along four sides by illuminated waveguides that extend in a transverse direction relative to the light-transmissive panel.

FIG. 7 is a perspective view of a lighting fixture 110-1 recessed within a wall 102, extending from a floor 101 to a ceiling 103, and oriented in a vertical direction to resemble a window. The lighting fixture 110 may embody a lighting fixture according to FIG. 3, including an illuminated light-transmissive panel bounded along four sides by illuminated waveguides that extend in a transverse direction relative to the light-transmissive panel. In certain embodiments, an uppermost waveguide of the lighting fixture (proximate to a wall-ceiling interface 105) and the light-transmissive panel each comprises a sky-resembling assembly, and the remaining waveguides may embody a sun-resembling source.

Figure 8:
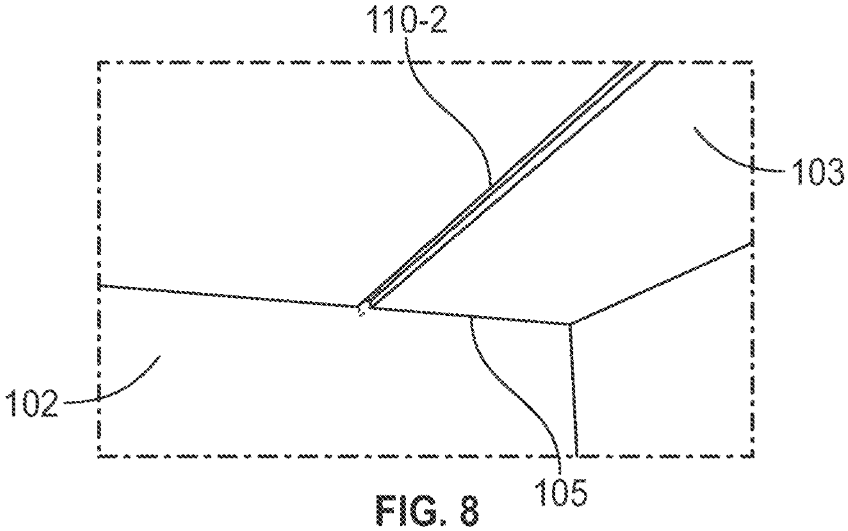
FIG. 8 is a perspective view of a lighting fixture recessed within a ceiling and extending horizontally to a wall-ceiling interface, with the lighting fixture including an illuminated light-transmissive panel bounded along four sides by illuminated waveguides that extend in a transverse direction relative to the light-transmissive panel.
Figure 9A:
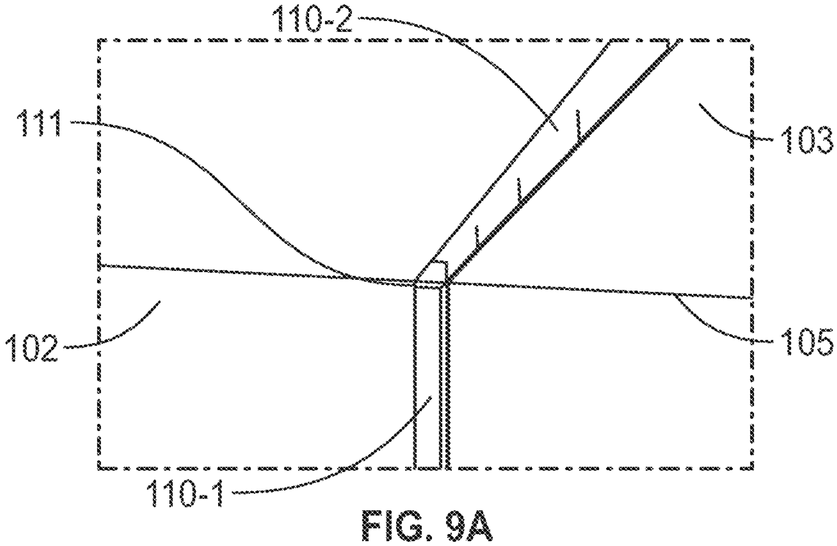
FIG. 9A is a perspective view of two lighting fixtures installed in a wall and a ceiling, respectively, with the lighting fixtures abutting one another at a wall-ceiling interface, and with each lighting fixture including an illuminated light-transmissive panel bounded along four sides by illuminated waveguides that extend in a transverse direction relative to the light-transmissive panel.

FIG. 8 is a perspective view of a lighting fixture 110-2 recessed within a ceiling 103 and oriented horizontally to resemble a skylight. The lighting fixture 110-2 may embody a lighting fixture according to FIG. 3, including an illuminated light-transmissive panel bounded along four sides by illuminated waveguides that extend in a transverse direction relative to the light-transmissive panel. In certain embodiments, the light-transmissive panel and a waveguide proximate to a wall-ceiling interface 105 (i.e., a corner where the ceiling 103 meets a wall 105) may each comprise a sky-resembling assembly, and the remaining waveguides may embody a sun-resembling source FIG. 9A is a perspective view of two lighting fixtures 110-1, 110-2 installed in a wall 102 and a ceiling 103, respectively, with the lighting fixtures 110-1, 110-2 abutting one another at a wall-ceiling interface 105. Each lighting fixture 110-1, 110-2 may embody a lighting fixture according to FIG. 3, with a first lighting fixture 110-1 specifically corresponding to the lighting fixture of FIG. 7 a second lighting fixture specifically corresponding to the lighting fixture 110-2 of FIG. 8. Each waveguide positioned at the wall-ceiling interface 105, as well as the light-transmissive panel of each lighting fixture 110-1, 110-2 may embody a sky-resembling assembly.

Figure 9B:
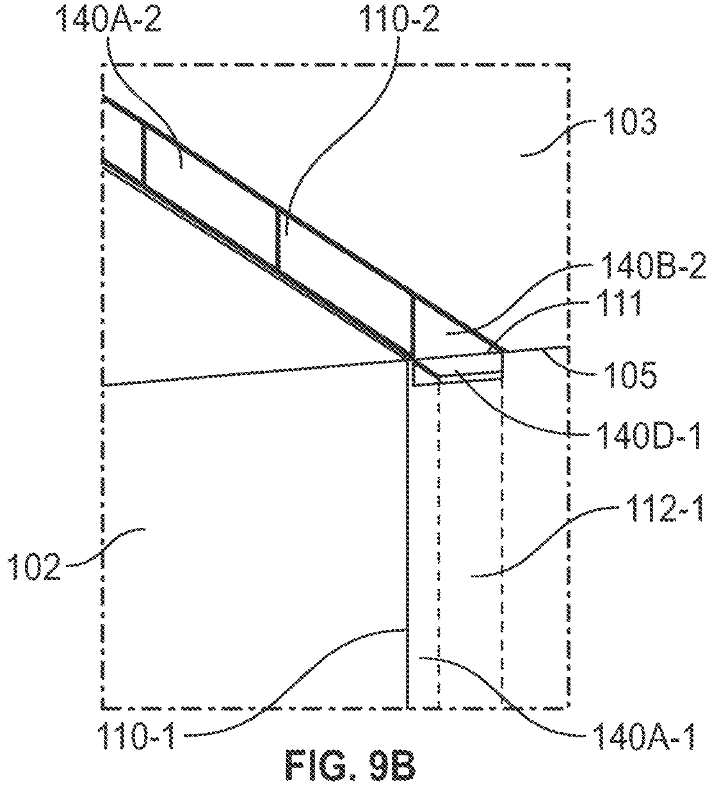
FIGS. 9B and 9C are magnified perspective views of portions of the two lighting fixtures of FIG. 9A proximate to the wall-ceiling interface.
Figure 9C:
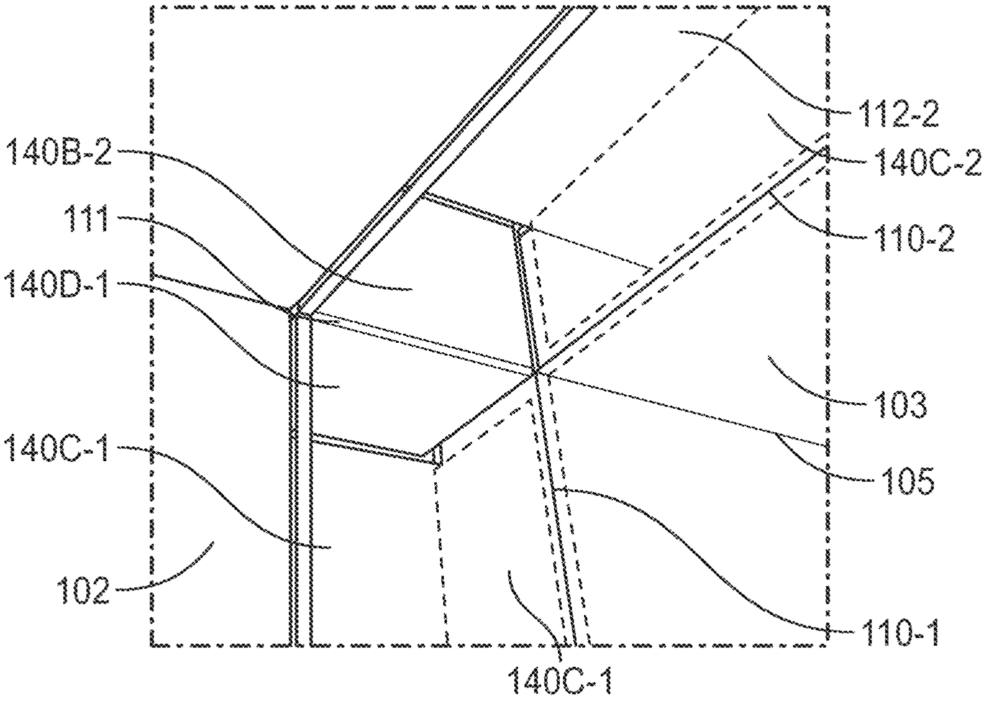

FIGS. 9B and 9C are magnified perspective views of portions of the two lighting fixtures 110-1, 110-2 of FIG. 9A proximate to the wall-ceiling interface 105. The first lighting fixture 110-1 is recessed within the wall 102, extends from a floor 101 to a ceiling 103, and is oriented in a vertical direction to resemble a window. The second lighting fixture 110-2 is recessed within the ceiling 103 and is oriented horizontally to resemble a skylight. In FIG. 9B, two waveguides 140A-1, 140D-1 and the light-transmissive panel 112-1 of the first lighting fixture 110-1 are visible, together with two waveguides 140A-2, 140B-2 of the second lighting fixture 110-2. Endmost waveguides 140D-1, 140B-2 of the lighting fixtures 110-1, 110-2 abut one another at a corner interface 111 that may be arranged collinearly with the wall-ceiling interface 105. In FIG. 9C, two waveguides 140C-1, 140D-1 and the light-transmissive panel 112-1 of the first lighting fixture 110-1 are visible, together with two waveguides 140C-2, 140B-2 and the light-transmissive panel 112-2 of the second lighting fixture 110-2.

Figure 10:
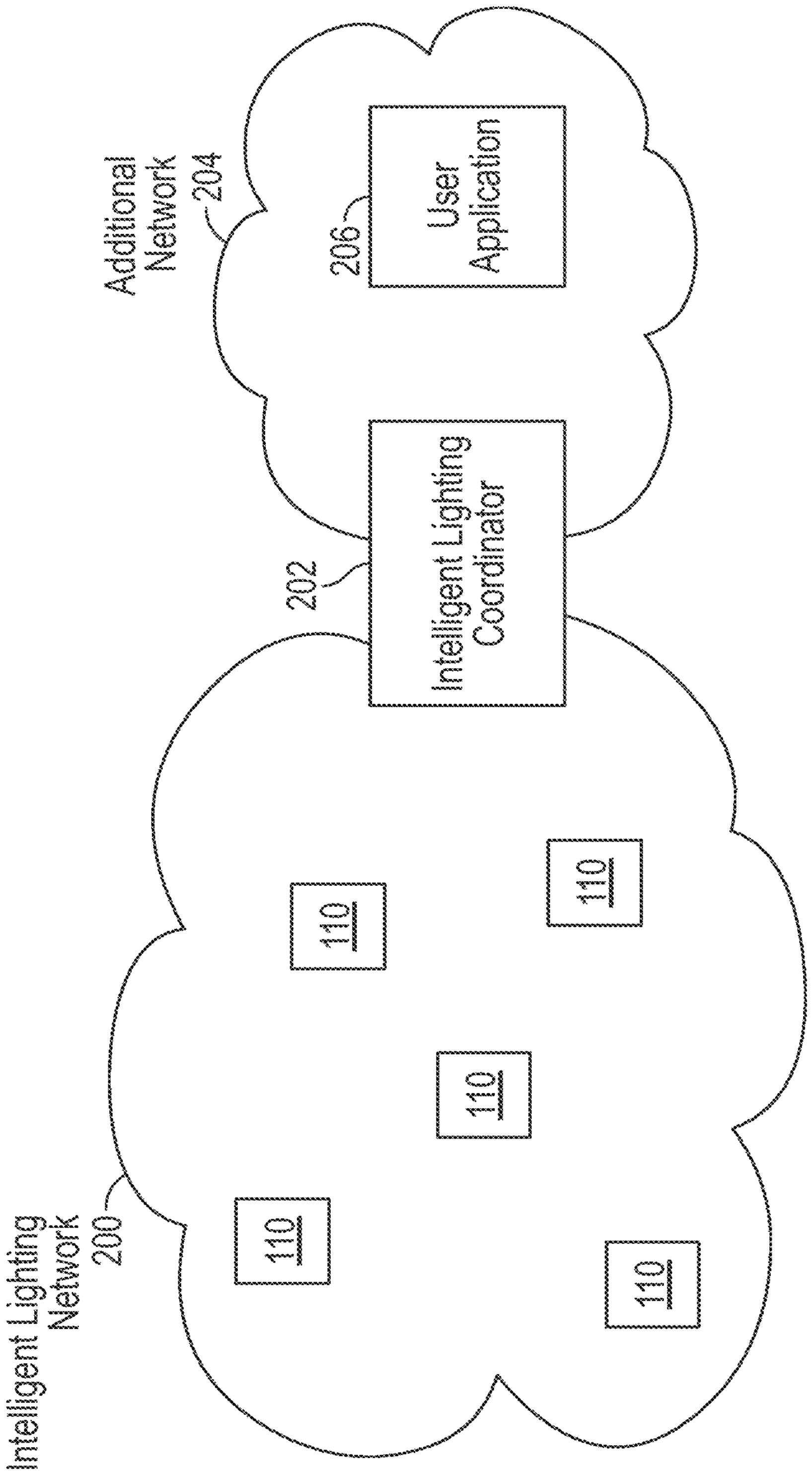
FIG. 10 is a schematic illustrating components of an intelligent lighting network according to one embodiment of the present disclosure.

FIG. 10 is a schematic illustrating components of an intelligent lighting network 200 comprised in or useable with one or more embodiments of the present disclosure. The intelligent lighting network 200 includes one or more lighting fixtures 110 and an intelligent lighting coordinator 202. The intelligent lighting network 200 may be a mesh network such as one based on the IEEE 802.15.4 standard. The intelligent lighting coordinator 202 may also be part of an additional network 204 such as a TCP/IP network (e.g., via Ethernet, Wi-Fi, or any other suitable connection mechanism). Accordingly, the intelligent lighting coordinator 202 may provide gateway functionality to bridge communication between the intelligent lighting network 200 and the additional network 204. A user application 206 may connect to the intelligent lighting coordinator 202 via the additional network 204 in order to determine information about the one or more lighting fixtures 110 and/or control one or more aspects of the functionality of the one or more lighting fixtures 110. The user application 206 may be a software application running on a computing device such as a smartphone, a tablet, a computer, or the like.

Figure 11:
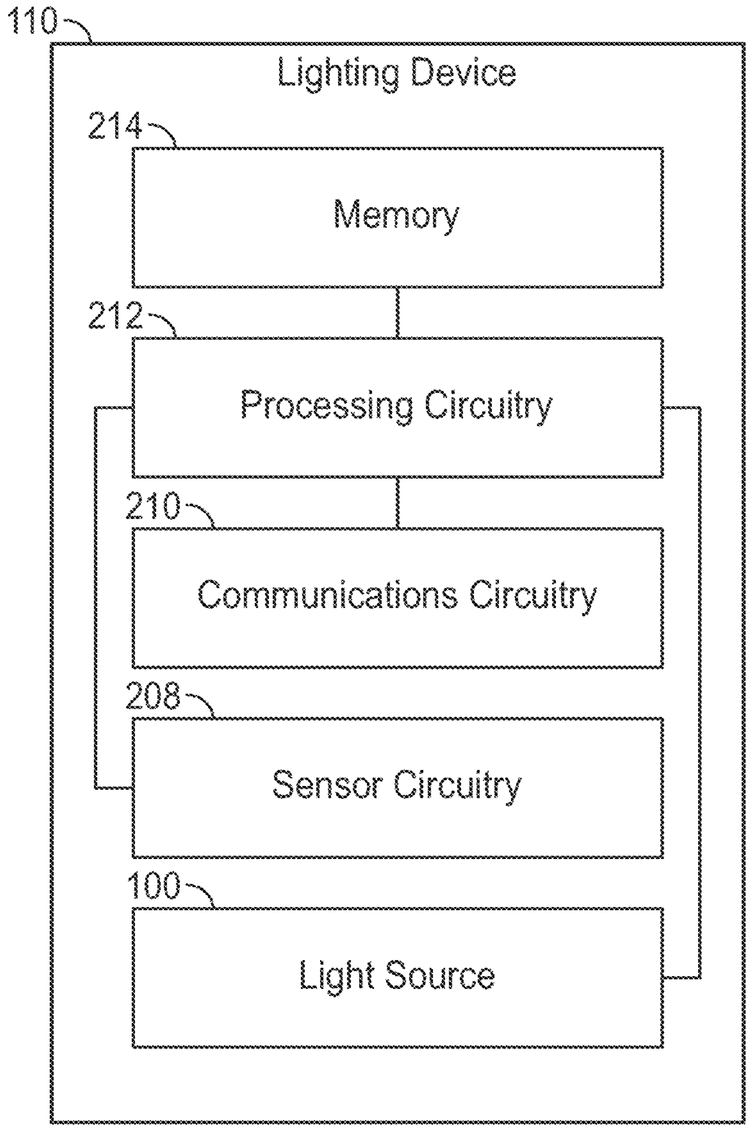
FIG. 11 is a high-level schematic illustrating control components of a lighting fixture in the intelligent lighting network of FIG. 10.

FIG. 11 is a high-level schematic illustrating control components of a lighting fixture 110 in the intelligent lighting network of FIG. 10 according to one embodiment of the present disclosure. The lighting fixture 110 includes light sources 100, sensor circuitry 208 including one or more sensors, communications circuitry 210, processing circuitry 212 coupled to the light source 100, the sensor circuitry 208, and the communications circuitry 210, and a memory 214 coupled to the processing circuitry 212. The light sources 100 may include any suitable type of light sources for providing light for general illumination. For example, the light sources 100 may include a number of light emitting diodes (LEDs). Circuitry for providing signals suitable to drive the light source 100 to provide light having one or more light output characteristics may be integrated into each light source 100 itself such that the processing circuitry 212 provides control signals for controlling the light source 100, may be provided by the processing circuitry 212, or may be provided by external circuitry such as driver circuitry. The sensor circuitry 208 may include any number of sensors such as an external light sensor, an ambient light sensor, an occupancy sensor, one or more image sensors, a temperature sensor, atmospheric data, weather data, or the like, and may provide sensor data from the one or more sensors to the processing circuitry 212 in order to enable certain functionality of the lighting fixture 110 discussed below. The communications circuitry 210 enables communication with other devices such as one or more other lighting fixtures 110 and an intelligent lighting coordinator. The memory 214 stores instructions, which, when executed by the processing circuitry 212 cause the lighting fixture 110 to perform one or more functions, such as provide dynamic lighting as discussed in detail below.

In certain embodiments, a lighting fixture 110 is capable of providing white light over an extended range of correlated color temperature (CCT) values. Such a lighting fixture 110 may include a driver module that is configured to drive at least three LEDs (or at least three strings of LEDs), including one or more first wavelength-converted LEDs of a first color point (e.g., blue-shifted yellow (BSY) or blue-shifted green (BSG)), one or more second wavelength-converted LEDs of a second color point (e.g., BSY or BSG), and one or more third wavelength-converted LEDs of a third color point (e.g., orange or red). In certain embodiments, one or more first wavelength-converted LEDs may be blue-shifted yellow (BSY) or blue-shifted green (BSG), one or more second wavelength-converted LEDs may be BSY or BSG, and one or more third wavelength-converted LEDs may be orange or red. Emissions of the respective LEDs (or strings thereof) may be combined to form white light of a desired CCT value, wherein CCT may be adjusted by adjusting current to different emitters or strings thereof. Further details regarding combinations of emitters and control circuitry that may be incorporated into lighting fixtures and/or lighting devices described herein are disclosed in U.S. Pat. No. 10,278,250, wherein the entire disclosure of the foregoing patent is hereby incorporated by reference as if fully set forth herein.

Figure 12:
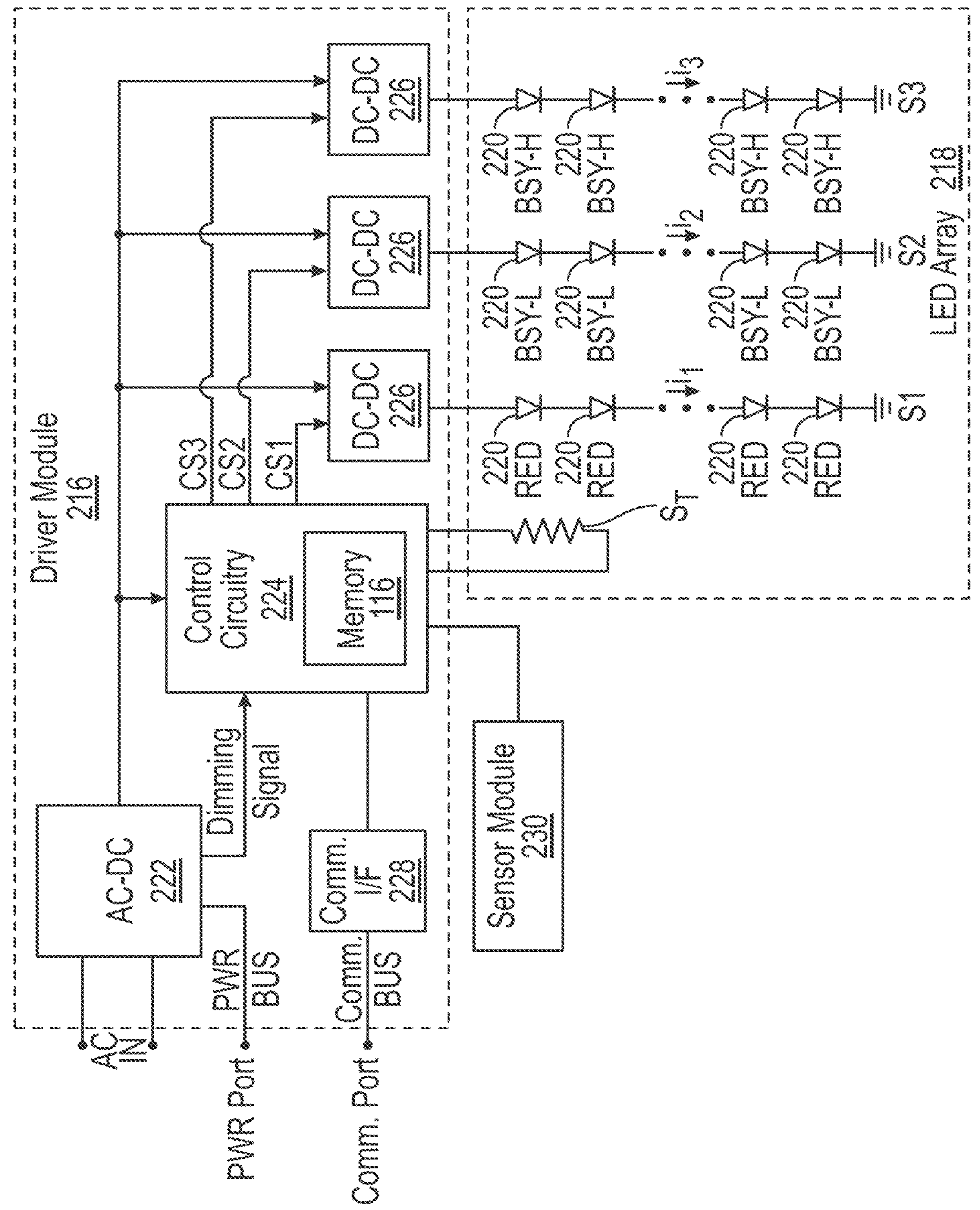
FIG. 12 is a schematic illustrating interconnections between components of a driver module and an LED array according to one embodiment of the present disclosure.

FIG. 12 is a schematic of a driver module 216 and an LED array 218 of a light source according to one embodiment of the disclosure. It is to be appreciated that the driver module 216 may apply to a single light source (e.g., a first source for illuminating a light-transmissive panel, a second source for illuminating a waveguide, or a third source for illuminating a light-transmissive cover), such that a lighting fixture may include multiple drivers. A LED array 218 may be divided into multiple strings of series connected LEDs 220. Red, low CCT blue-shifted yellow (BSY-L), and high CCT blue shifted yellow (BSY-H) are provided as labels in FIG. 12 but it is to be appreciated that any desired combination of LEDs may be used. In essence, LED string S1, which includes a number of red LEDs (RED), forms a first group of LEDs 220. LED string S2, which includes a number of low BSY LEDs (BSY-L), forms a second group of LEDs 220. LED string S3, which includes a number of high BSY LEDs (BSY-H), forms a third group of LEDs 220.

For clarity, the various LEDs 220 of the LED array 218 are referenced as RED, BSY-L, and BSY-H in FIG. 12 to indicate which LEDs are located in the various LED strings S1, S2, and S3. While BSY LEDs 220 are illustrated, BSG or other phosphor-coated, wavelength converted LEDs may be employed in analogous fashion. Non-phosphor-coated LEDs, such as non-wavelength converted red, green, and blue LEDs, may also be employed in certain embodiments.

In general, the driver module 216 controls the currents $i_1$, $i_2$, and $i_3$, which are used to drive the respective LED strings S1, S2, and S3. The ratio of currents $i_1$, $i_2$, and $i_3$ that are provided through respective LED strings S1, S2, and S3 may be adjusted to effectively control the relative intensities of the reddish light emitted from the red LEDs 220 of LED string S1, the yellowish/greenish light emitted from the low BSY-L LEDs 220 of LED string S2, and the yellow/greenish light emitted from the high BSY-H LEDs 220 of LED string S3. The resultant light from each LED string S1, S2, and S3 mixes to generate an overall light output that has a desired color, CCT, and intensity, the latter of which may also be referred to as dimming level. As noted, the overall light output may be white light that falls on or within a desired proximity of the blackbody locus (BBL) and has a desired CCT.

The driver module 216 depicted in FIG. 12 generally includes AC-DC conversion circuitry 222, control circuitry 224, and a number of current sources, such as the illustrated DC-DC converters 226. The AC-DC conversion circuitry 222 is adapted to receive an AC power signal (AC IN), rectify the AC power signal, correct the power factor of the AC power signal, and provide a DC output signal. The DC output signal may be used to directly power the control circuitry 224 and any other circuitry provided in the driver module 216, including the DC-DC converters 226, a communication interface 228, as well as a sensor module 230.

The DC output signal may also be provided to the power bus, which is coupled to one or more power ports, which may be part of the standard communication interface. The DC output signal provided to the power bus may be used to provide power to one or more external devices that are coupled to the power bus and separate from the driver module 216. These external devices may include the communications module and any number of auxiliary devices, such as the sensor module 230. Accordingly, these external devices may rely on the driver module 216 for power and can be efficiently and cost effectively designed accordingly. The AC-DC conversion circuitry 222 of the driver module 216 may be robustly designed in anticipation of being required to supply power to not only its internal circuitry and the LED array 218, but also to supply power to these external devices, thereby simplifying the power supply design (if not eliminating the need for a power supply) and reducing the cost for external devices.

As illustrated, the three respective DC-DC converters 226 of the driver module 216 provide currents 11, 12, and is for the three LED strings S1, S2, and S3 in response to control signals CS1, CS2, and CS3. The control signals CS1, CS2, and CS3 may be pulse width modulated (PWM) signals that effectively turn the respective DC-DC converters on during a logic high state and off during a logic low state of each period of the PWM signal. In one embodiment, the control signals CS1, CS2, and CS3 are the product of two PWM signals.

The CCT and dimming levels may be initiated internally or received from the commissioning tool, a wall controller, or another lighting fixture. If received from an external device via the communications module, the CCT and/or dimming levels are delivered from the communications module to the control circuitry 224 of the driver module 216 in the form of a command via the communication bus. The driver module 216 will respond by controlling the currents $i_1$, $i_2$, and $i_3$ in the desired manner to achieve the requested CCT and/or dimming levels.

The intensity and CCT of the light emitted from the LEDs 220 may be affected by temperature. If associated with a thermistor ST or other temperature-sensing device, the control circuitry 224 can control the currents $i_1$, $i_2$, and $i_3$ provided to each of the LED strings S1, S2, and S3 based on ambient temperature of the LED array 218 in an effort to compensate for temperature effects. The control circuitry 224 may also monitor the output of the occupancy and ambient light sensors $S_O$ and $S_A$ for occupancy and ambient light information and further control the currents $i_1$, $i_2$, and $i_3$ in a desired fashion. Each of the LED strings S1, S2, and S3 may have different temperature compensation adjustments, which may also be functions of the magnitude of the various currents $i_1$, $i_2$, and $i_3$.

The control circuitry 224 may include a central processing unit (CPU) and sufficient memory 232 to enable the control circuitry 224 to bidirectionally communicate with the communications module or other devices over the communication bus through an appropriate communication interface (I/F) 228 using a defined protocol, such as the standard protocol described above. The control circuitry 224 may receive instructions from the communications module or other device and take appropriate action to implement the received instructions. The functionality of the communications module may be integrated into the driver module 216, and vice versa.

In certain embodiments, the control circuitry 224 of the driver module 216 is loaded with a current model in the form of one or more functions (equation) or look up tables for each of the currents $i_1$, $i_2$, and $i_3$. Each current model is a reference model that is a function of dimming or output level, temperature, and CCT. The output of each model provides a corresponding control signal CS1, CS2, and CS3, which effectively sets the currents $i_1$, $i_2$, and $i_3$ in the LED strings S1, S2, and S3. The three current models are related to each other. At any given output level, temperature, and CCT, the resulting currents $i_1$, $i_2$, and $i_3$ cause the LED strings S1, S2, and S3 to emit light, which, when combined, provides an overall light output that has a desired output level and CCT, regardless of temperature. While the three current models do not need to be a function of each other, they are created to coordinate with one another to ensure that the light from each of the strings S1, S2, and S3 mix with one another in a desired fashion.

In certain embodiments, multiple independently-controllable groups of solid state light emitters of different dominant wavelengths have operation of the groups of solid state light emitters being automatically adjusted by at least one processor (and/or other control circuitry) to provide desired illumination, and have operation of the groups of solid state emitters subject to being further affected by sensors and/or user input commands. In certain embodiments, a lighting device may be adjusted to compensate for presence, absence, intensity, and/or color point of ambient or incident light. In certain embodiments, at least one sensor may be arranged to receive or provide at least one signal indicative of an environmental condition, and is arranged to sense one or more of: humidity, air pressure, ambient sound, gas concentration, presence or absence of gas, particulate concentration, presence or absence of particulates, temperature, cloud cover, outdoor ambient temperature, outdoor ambient light level, outdoor CCT, presence of precipitation, type of precipitation, UV index, solar radiation index, moon phase, moonlight light level, presence of aurora, and chill factor. Based on such sensing, operation of at least one lighting fixture may be adjusted. Further details regarding the foregoing features that may be incorporated into lighting fixtures and/or lighting devices described herein are disclosed in U.S. Pat. No. 10,412,809, wherein the entire disclosure of the foregoing patent is hereby incorporated by reference as if fully set forth herein.

In certain embodiments, operation of multiple lighting sources within a single lighting fixture may be adjusted to selectively adjust intensity and/or color temperature of the light sources to cause aggregate emissions of a lighting fixture to change with respect to time. In certain embodiments, the dynamic change of emissions of the lighting fixture includes illumination of different lighting sources at different intensities and/or color temperatures to cause a perceived direction of external illumination of the plurality of lighting fixtures to move from east to west over time. In certain embodiments, control circuitry is configured to selectively adjust at least one of intensity and color temperature of multiple light sources to cause a light transmissive panel and at least one waveguide to appear to be externally illuminated by the sun, such that a perceived direction of external illumination of the lighting fixture moves from east to west over time.

In certain embodiments, within a light fixture at least one waveguide may appear to be sun-illuminated while a light-transmissive panel does not appear to be sun-illuminated. In certain embodiments, within a light fixture a light-transmissive panel may appear to be sun-illuminated while at least one waveguide does not appear to be sun-illuminated. In this manner, either task lighting or ambient lighting may remain unchanged, while other lighting provided by a fixture may change with time to mimic external illumination by the sun that changes with time.

In certain embodiments, operation of multiple lighting fixtures (each having multiple light sources) may be adjusted to selectively adjust intensity and/or color temperature of the light sources to cause aggregate emissions of a lighting system to change with respect to time. In certain embodiments, the dynamic change of emissions of the lighting system includes illumination of different lighting fixtures of the plurality of lighting fixtures at different intensities and/or color temperatures to cause a perceived direction of external illumination of the plurality of lighting fixtures to move from east to west over time. During at least some times, the dynamic change of emissions of the lighting system includes simultaneous illumination of different lighting fixtures of the plurality of lighting fixtures at different intensities and/or color temperatures.

Figure 13A:
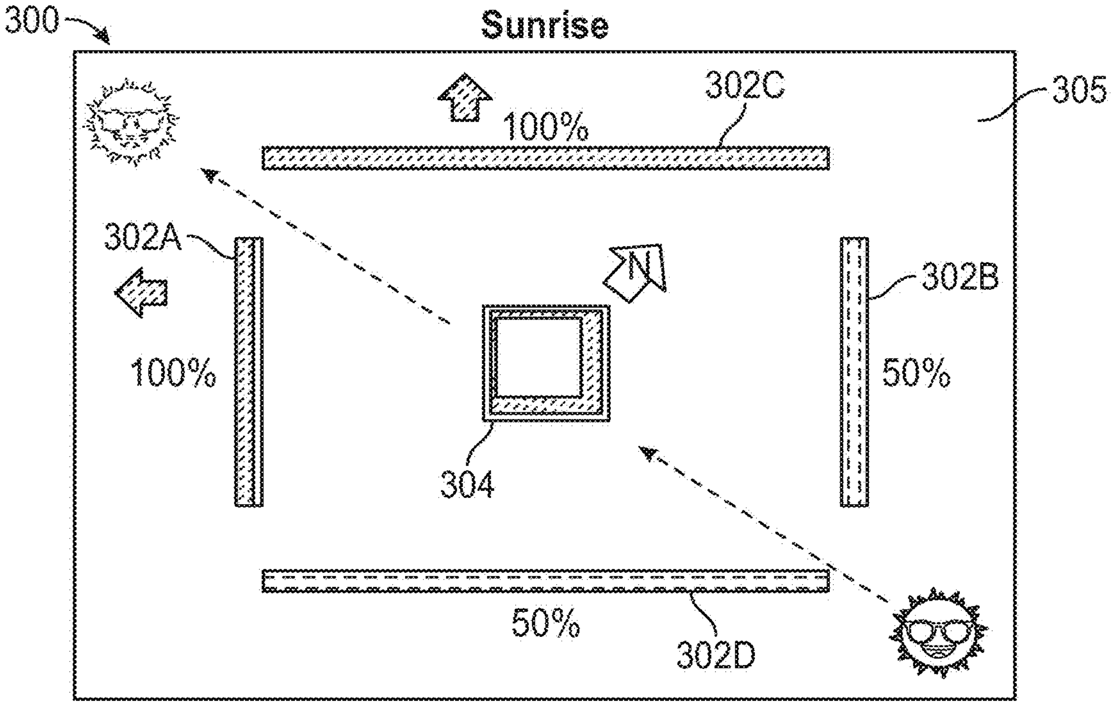
FIG. 13A is a diagram illustrating a first dynamic lighting operating state provided by a lighting system incorporating multiple light fixtures as disclosed herein.
Figure 13B:
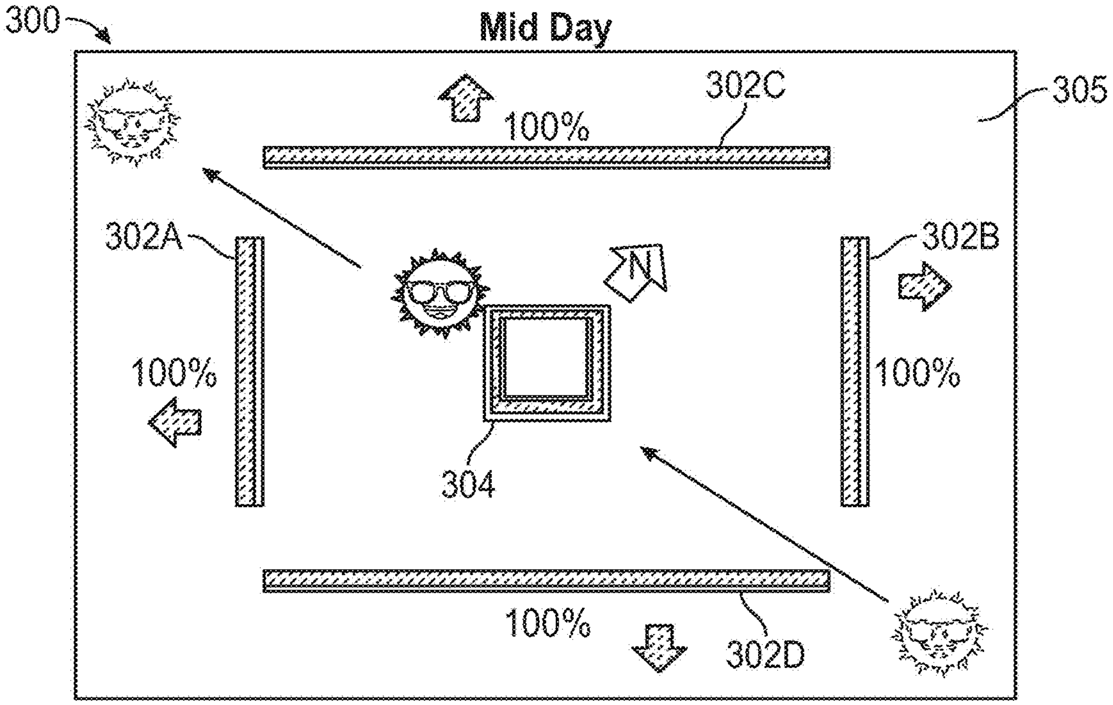
FIG. 13B is a diagram illustrating a second dynamic lighting operating state provided by the lighting system of FIG. 13A.
Figure 13C:
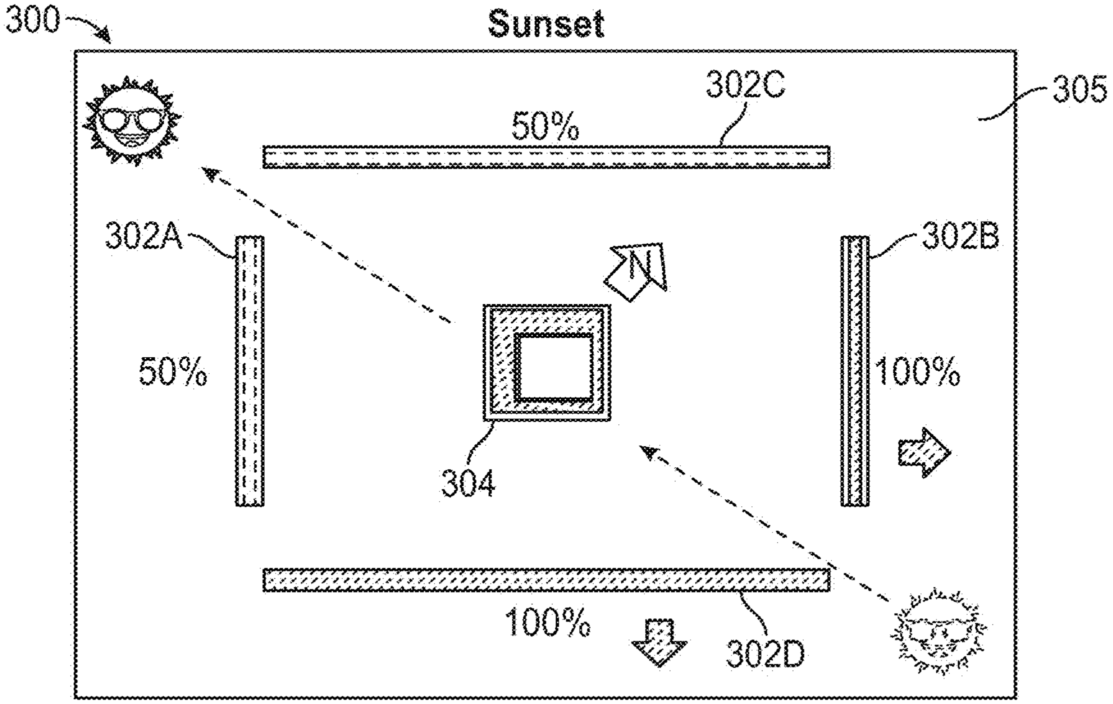
FIG. 13C is a diagram illustrating a third dynamic lighting operating state provided by the lighting system of FIG. 13A.

FIGS. 13A-13C are diagrams illustrating, according to one embodiment, dynamic lighting operating states provided by a lighting fixture 300 including waveguides 302A-302D arranged around peripheral portions of a light transmissive panel 304, wherein the waveguides 302A-302D and the light transmissive panel 304 are illuminated by different light sources (not shown) and configured to illuminate a space 305. In certain embodiments, the lighting fixture 300 includes control circuitry configured to separately adjust, for the light source of each lighting fixture 302A-302D, at least one of intensity, color temperature, and directionality of emissions of the lighting fixture to cause aggregate emissions of the lighting system to dynamically change over time. In certain embodiments, the control circuitry is configured to selectively illuminate the plurality of solid-state light sources to adjust according to the position of the sun throughout the day.

Referring to FIG. 13A as utilized to depict a lighting fixture, in the morning, to simulate sunrise, first and third waveguides 302A, 302C may emit light at 100% relative intensity, the second and fourth waveguides 302B, 302D may emit light at 75% relative intensity, and a light transmissive panel 304 may having one quadrant (e.g., upper left as shown) illuminated more brightly than other quadrants, with each of the waveguides 302A-302D and the light transmissive panel 304 emitting light of a relatively warm correlated color temperature, to simulate external illumination of the space 305 by the sun under sunrise conditions. Such a configuration increases the brightness at the west side of the space 305 when the sun is positioned on the east side of the space 305 during sunrise.

Referring to FIG. 13B as utilized to depict a lighting fixture, at mid-day, the first through fourth waveguides 302A-302D may emit light at 100% relative intensity, and the light-transmissive panel may have equally illuminated quadrants, at a relatively cool CCT in order to simulate external illumination of the space 305 by the sun at mid-day conditions.

Referring to FIG. 13C as utilized to depict a lighting fixture, in the late afternoon, to simulate sunset, second and fourth waveguides 302B, 302D may emit light at 100% relative intensity, the first and third waveguides 302A, 302C may emit light at 50% relative intensity, and the light transmissive panel 304 may having one quadrant (e.g., lower right as shown) illuminated more brightly than other quadrants, with each of the waveguides 302A-302D and the light transmissive panel 304 emitting light of a relatively warm correlated color temperature, to simulate external illumination of the space 305 by the sun under sunset conditions. Such a configuration increases the brightness at the east side of the space 305 when the sun is positioned on the west side of the space 305 during sunset.

In another embodiment, FIGS. 13A-13C may be utilized as diagrams to illustrate, according to one embodiment, dynamic lighting operating states provided by a lighting system 300 including lighting fixtures 302A-302D and 305 arranged at different locations of a space 305 to be illuminated, wherein each lighting fixture 302A-302D includes multiple light sources enabling one or more of intensity, color temperature, and directionality of light emissions to be adjusted.

Referring to FIG. 13A as utilized to depict a lighting system, in the morning, to simulate sunrise, first and third lighting fixtures 302A, 302C may emit light at 100% relative intensity, the second and fourth lighting fixtures 302B, 302D may emit light at 75% relative intensity, and a fifth lighting fixture 304 including a light transmissive panel may having one quadrant (e.g., upper left as shown) illuminated more brightly than other quadrants, with each of the lighting fixtures 302A-302D and 304 emitting light of a relatively warm correlated color temperature, to simulate external illumination of the space 305 by the sun under sunrise conditions. Such a configuration increases the brightness at the west side of the space 305 when the sun is positioned on the east side of the space 305 during sunrise.

Referring to FIG. 13B as utilized to depict a lighting system, at mid-day, the first through fifth lighting fixtures 302A-302D and 305 may emit light at 100% relative intensity, and a light transmissive panel of the fifth lighting fixture 304 may have equally illuminated quadrants, at a relatively cool CCT in order to simulate external illumination of the space 305 by the sun at mid-day conditions.

Referring to FIG. 13C as utilized to depict a lighting system, in the late afternoon, to simulate sunset, second and fourth lighting fixtures 302B, 302D may emit light at 100% relative intensity, the first and third lighting fixtures 302A, 302C may emit light at 50% relative intensity, and the light transmissive panel of the fifth lighting fixture 304 may having one quadrant (e.g., lower right as shown) illuminated more brightly than other quadrants, with each of the lighting fixtures 302A-302D and 304 emitting light of a relatively warm correlated color temperature, to simulate external illumination of the space 305 by the sun under sunset conditions. Such a configuration increases the brightness at the east side of the space 305 when the sun is positioned on the west side of the space 305 during sunset.

In certain embodiments, each lighting fixture 302A-302D may provide uniform illumination throughout each lighting fixture 302A-302D. In certain embodiments, each lighting fixture 302A-302D can provide non-uniform illumination, such that, for example, one side of the lighting fixture

302A-302D delivers light of a different intensity than an opposing side of the lighting fixture 302A-302D.

FIGS. 14-20 illustrate lighting fixtures of varying shapes and configurations. Although each of the lighting fixtures is illustrated as being configured to be suspended from a static surface (e.g., a ceiling structure), it is to be appreciated that in certain embodiments, lighting fixtures may be fully recessed, partially recessed (semi-recessed), flush-mounted, or surface-mounted relative to a static structure such as a wall, ceiling, or floor. Mounting relative to a surface may be provided in any suitable orientation, including horizontal, vertical, and any angle therebetween. In certain embodiments, fixtures may be arranged upside down in a floor (e.g., with a light transmissive panel configured to emit light upward, and with one or more waveguides extending upward relative to a light transmissive panel.

Figure 14:
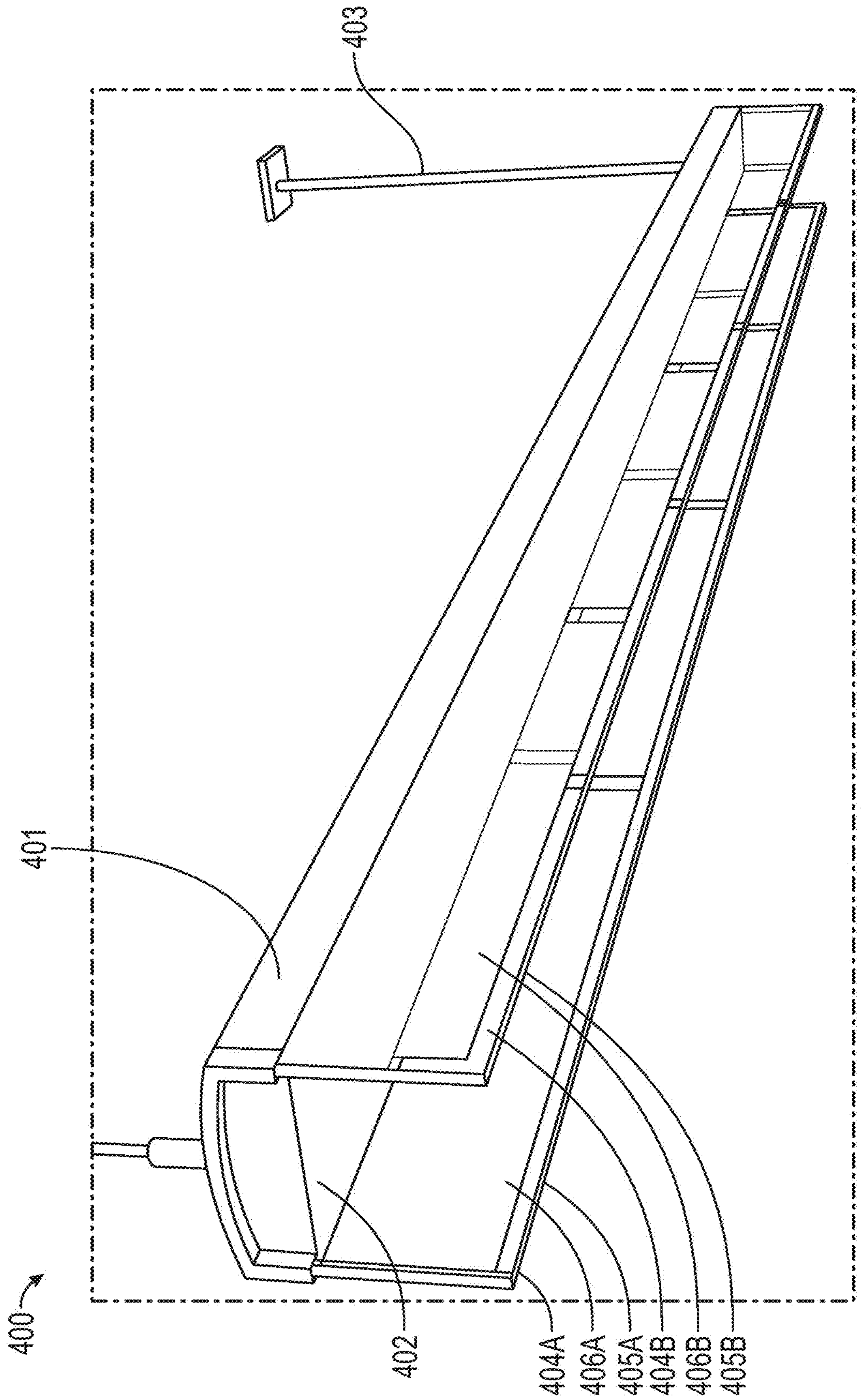
FIG. 14 is a perspective view of a lighting fixture according to one embodiment including an illuminated light-transmissive panel configured to emit light in a downward direction, and two groups of illuminated waveguides having a substantially planar light emitting faces and arranged in parallel along peripheral portions of, and extending in a transverse direction relative to, the light-transmissive panel.

FIG. 14 is a perspective view of a lighting fixture 400 according to one embodiment including a frame 401, an illuminated light-transmissive panel 402 configured to emit light in a downward direction, and two groups of illuminated waveguides 404A, 404B having a substantially planar light emitting faces and arranged in parallel along peripheral portions of, and extending in a transverse direction relative to, the light-transmissive panel 402. Each group of illuminated waveguides 404A, 404B may multiple waveguides that may be collinearly arranged. Light extraction features 406A, 406B may be provided along one or more faces of each waveguide 404A, 404B, with the waveguides 404A, 404B also including clear portions 405A, 405B devoid of light extraction features. The frame 401 is suspended by suspension elements 403.

Figure 15:
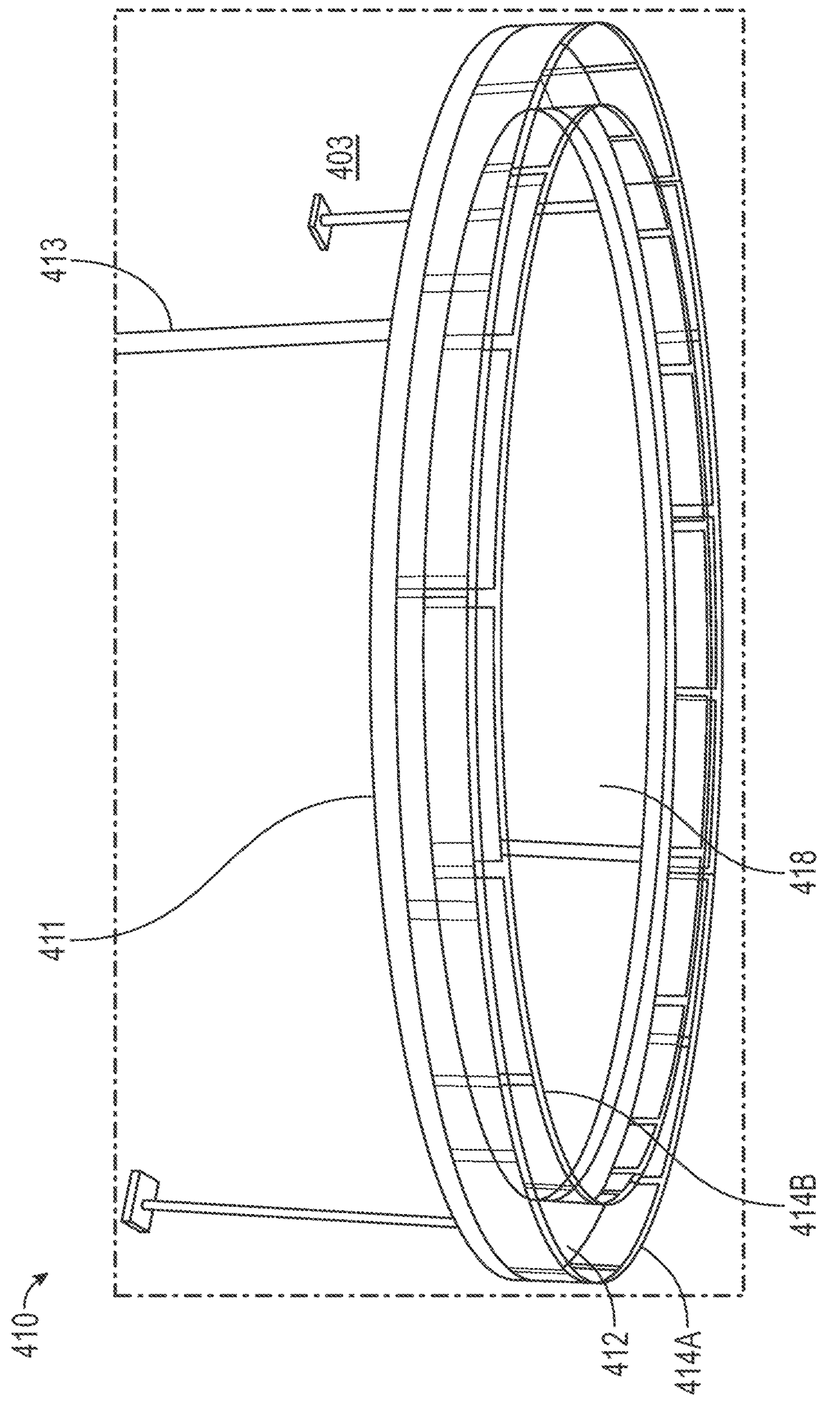
FIG. 15 is a perspective view of a lighting fixture according to one embodiment including an illuminated light-transmissive panel of an annular shape configured to emit light in a downward direction, and two circular groups of illuminated waveguides each having curved light-emitting faces and extending in a transverse direction relative to the light-transmissive panel.

FIG. 15 is a perspective view of a lighting fixture 410 according to one embodiment including a generally annular frame 411, an illuminated light-transmissive panel 412 having an annular shape surrounding a central opening 418 and configured to emit light in a downward direction, and including two circular groups of illuminated waveguides 414A, 414B each having curved light-emitting faces and extending in a transverse direction relative to the light-transmissive panel 412. The frame 411 is suspended by suspension elements 413. Light extraction features may be provided along one or more faces of each waveguide 414A, 414B.

Figure 16:
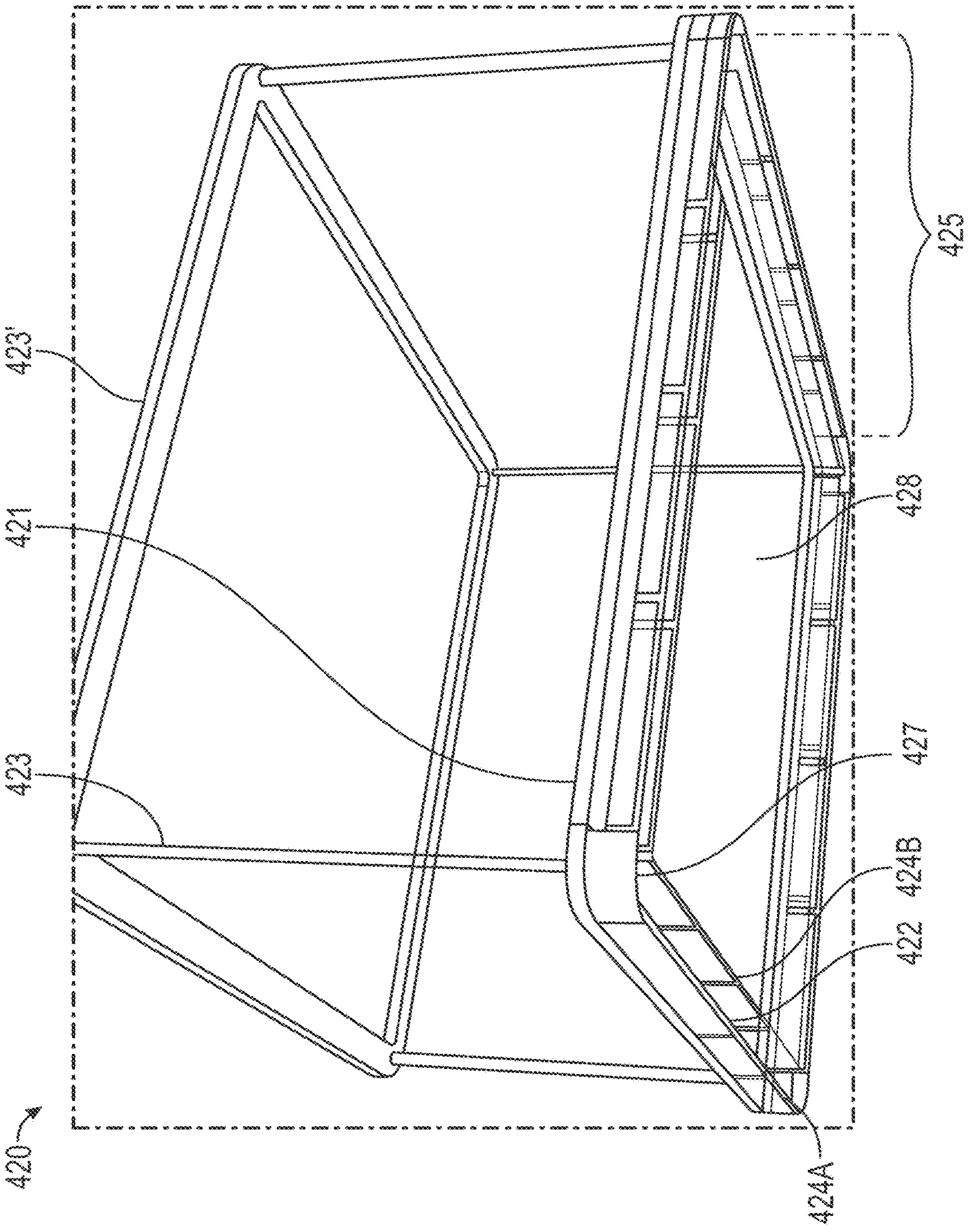
FIG. 16 is a perspective view of a lighting fixture according to one embodiment including four illuminated light-transmissive panels arranged in a rectangular assembly and configured to emit light in a downward direction, with each light-transmissive panel being bordered by two parallel groups of illuminated waveguides each having a generally planar light-emitting face and extending in a transverse direction, and four corner connectors.

FIG. 16 is a perspective view of a lighting fixture 420 according to one embodiment including a generally rectangular frame structure 421 having a central opening 428, with four modules 425 coupled by corner connectors 427. Each module 425 includes a light-transmissive panel 422 configured to emit light in a downward direction, with multiple waveguides 424A, 424B. Each light-transmissive panel 422 is bordered by two parallel groups of illuminated waveguides 424A, 424B each having a generally planar light-emitting face and extending in a transverse direction. The frame 421 is suspended by suspension elements 423, which may be suspended from an upper frame portion 423'. Light extraction features may be provided along one or more faces of each waveguide 424A, 424B.

Figure 17:
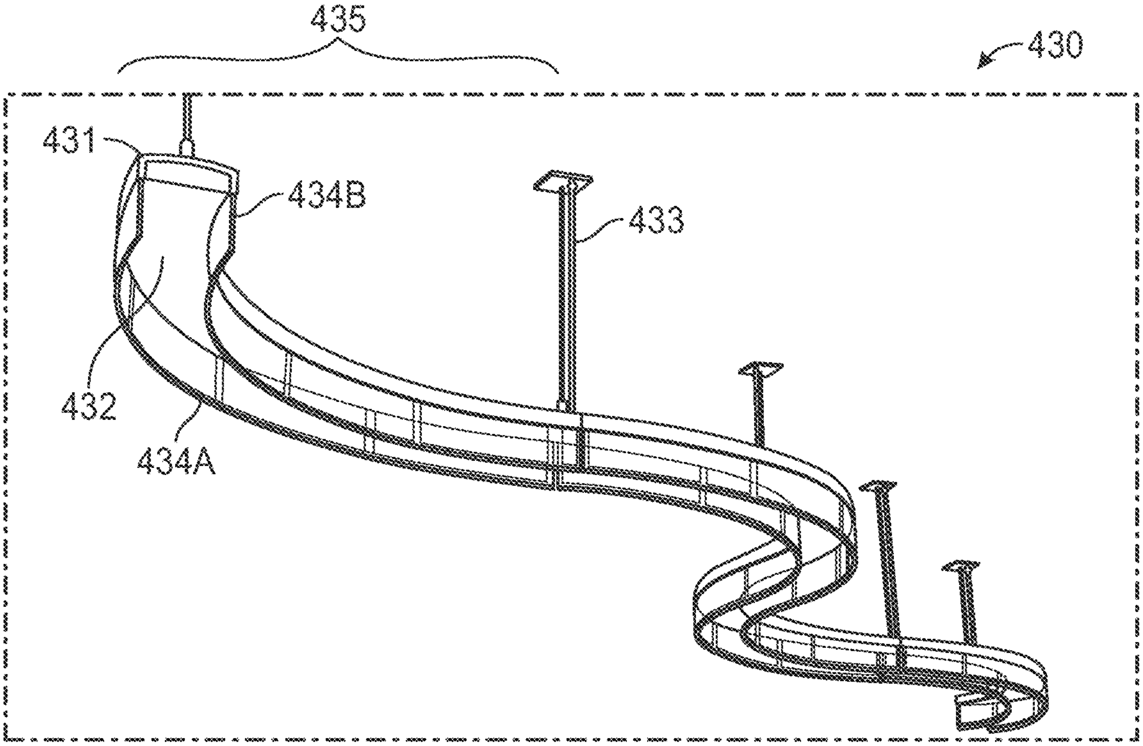
FIG. 17 is a perspective view of a lighting fixture according to one embodiment including multiple illuminated light-transmissive panels configured to emit light in a downward direction and joined in an assembly having a serpentine configuration, with each light-transmissive panel being bordered along sides thereof by illuminated waveguides each having a curved light-emitting face and extending in a transverse direction.

FIG. 17 is a perspective view of a lighting fixture 430 according to one embodiment formed of multiple modules 435 joined into a serpentine configuration. Each module 435 includes a frame structure 431, an illuminated light-transmissive panel 432 configured to emit light in a downward direction being supported by the frame structure 431, and multiple waveguides 434A, 434B. Each light-transmissive panel 432 is bordered along sides thereof by illuminated waveguides 434A, 434B each having a curved light-emitting face and extending in a transverse direction. The frame 431 is suspended by suspension elements 433.

Figure 18:
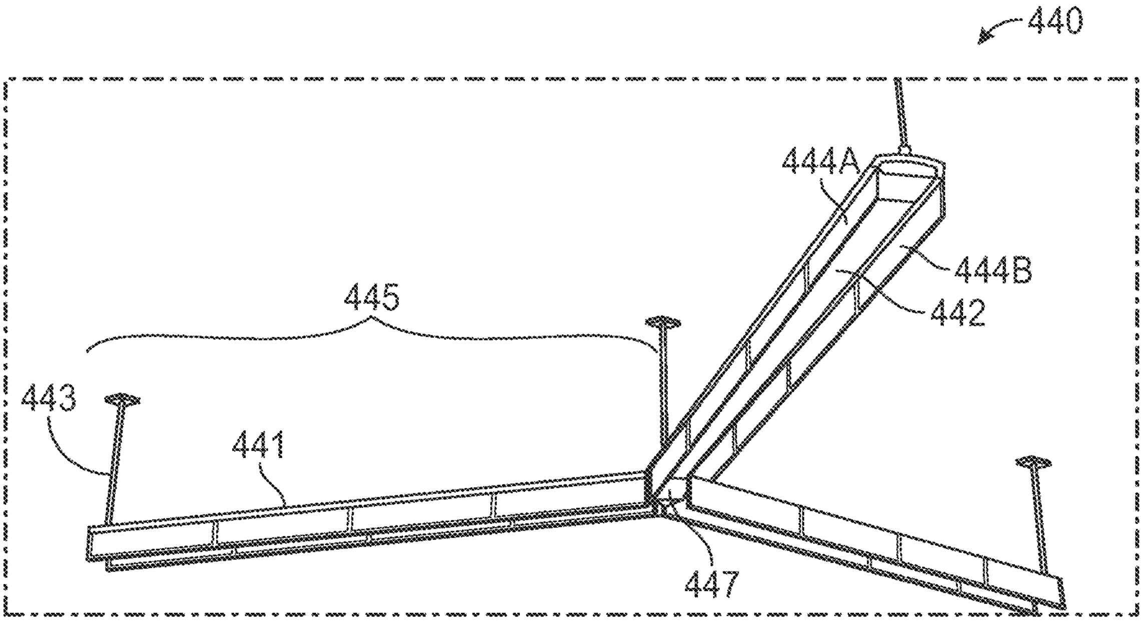
FIG. 18 is a perspective view of a lighting fixture according to one embodiment including three illuminated light-transmissive panels configured to emit light in a downward direction and joined by a central connector into a Y-shaped assembly, with each light-transmissive panel being bordered by two parallel groups of illuminated waveguides each having a generally planar light-emitting face and extending in a transverse direction.

FIG. 18 is a perspective view of a lighting fixture 440 according to one embodiment formed of multiple (three) modules 445 joined with a central connector 447 into a Y-shaped configuration. Each module 445 includes a frame structure 441, an illuminated light-transmissive panel 442 configured to emit light in a downward direction and supported by the frame 441, with multiple waveguides 444A, 444B. Each light-transmissive panel 442 is bordered by two parallel illuminated waveguides 444A, 444B (or groups thereof) each having a generally planar light-emitting face and extending in a transverse direction. The frame 441 is suspended by suspension elements 443.

Figure 19:
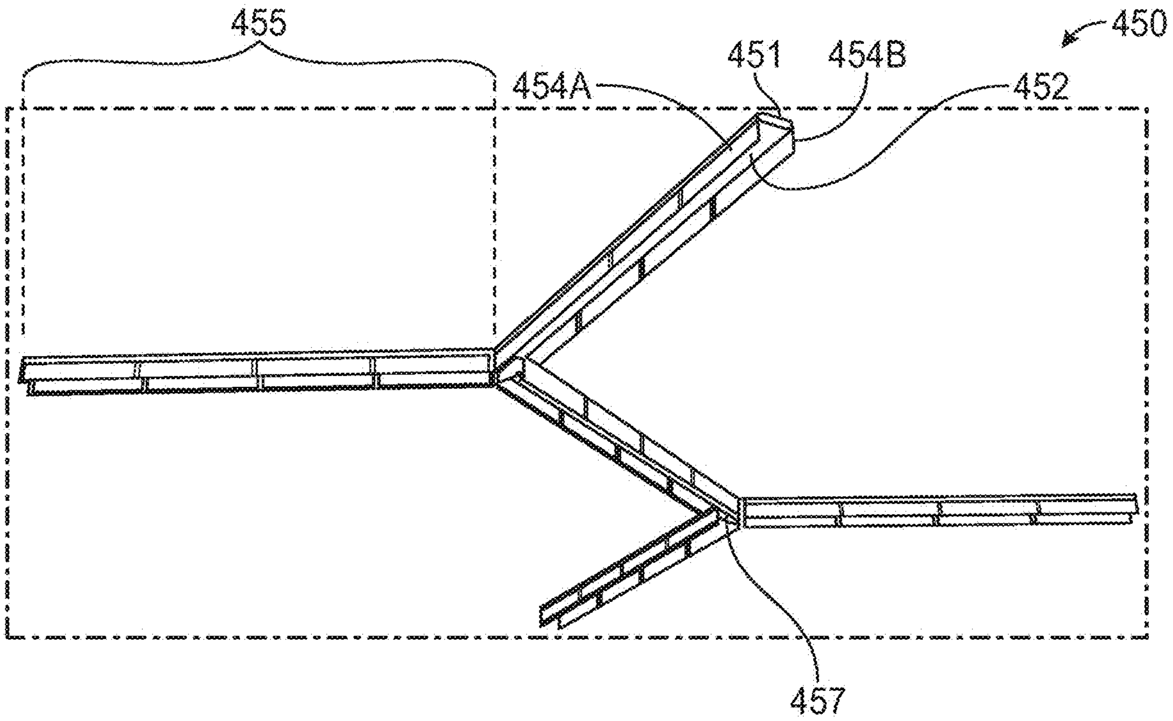
FIG. 19 is a perspective view of a lighting fixture according to one embodiment including multiple illuminated light-transmissive panels configured to emit light in a downward direction and joined by two Y-shaped connectors into a double Y-shaped assembly, with each light-transmissive panel being bordered by two parallel groups of illuminated waveguides each having a generally planar light-emitting face and extending in a transverse direction.

FIG. 19 is a perspective view of a lighting fixture 450 according to one embodiment formed of multiple modules 455 joined with a multiple Y-shaped connectors 457 into a double-Y-shaped configuration. Each module 455 includes a frame structure 451, multiple illuminated light-transmissive panels 452 configured to emit light in a downward direction being supported by the frame 451, and multiple waveguides 454A, 454B. Each light-transmissive panel 452 is bordered by two parallel illuminated waveguides 454A, 454 (or groups thereof) each having a generally planar light-emitting face and extending in a transverse direction. The frame 451 is suspended by suspension elements 453.

Figure 20:
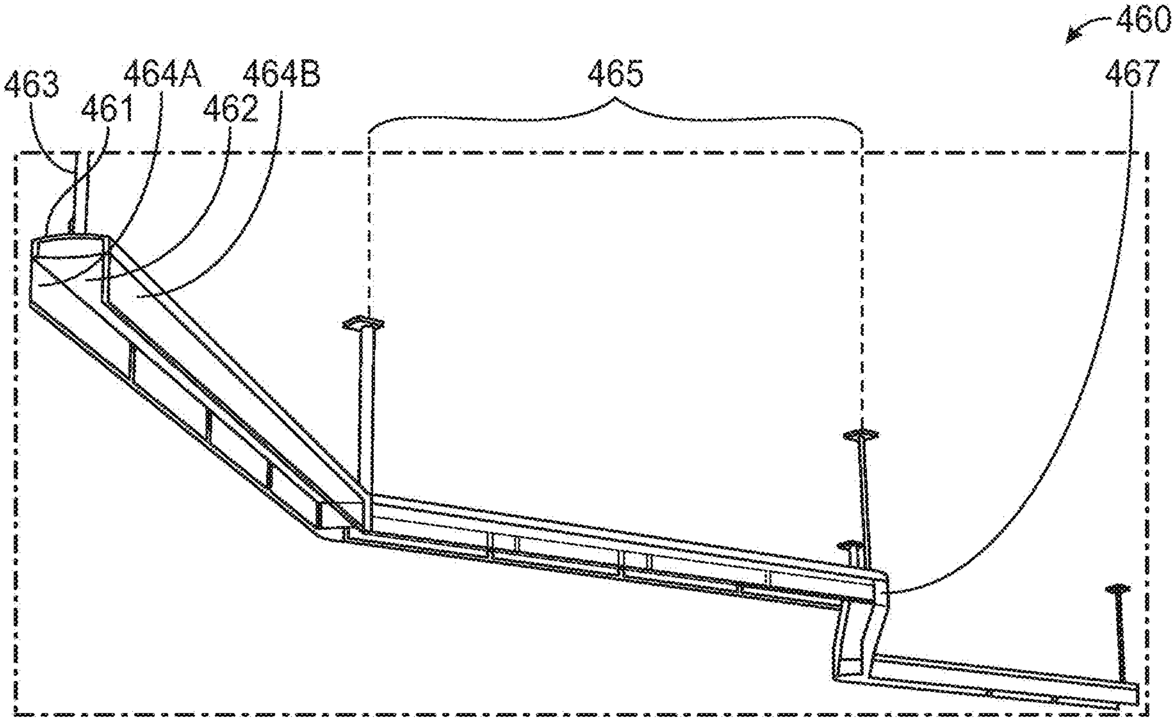
FIG. 20 is a perspective view of a lighting fixture according to one embodiment including multiple illuminated light-transmissive panels configured to emit light in a downward direction and joined by bent connectors into a zig-zag shaped assembly, with each light-transmissive panel being bordered by two parallel groups of illuminated waveguides each having a generally planar light-emitting face and extending in a transverse direction.

FIG. 20 is a perspective view of a lighting fixture 460 according to one embodiment formed of multiple modules 465 joined with angled connectors 467 into a zig-zag configuration. Each module 465 includes a frame structure 461, an illuminated light-transmissive panel 462 configured to emit light in a downward direction, and multiple waveguides 464A, 464B. Each light-transmissive panel is bordered by two parallel illuminated waveguides 464A, 464B (or groups thereof) each having a generally planar light-emitting face and extending in a transverse direction. The frame 461 is suspended by suspension elements 463.

Figure 21B:
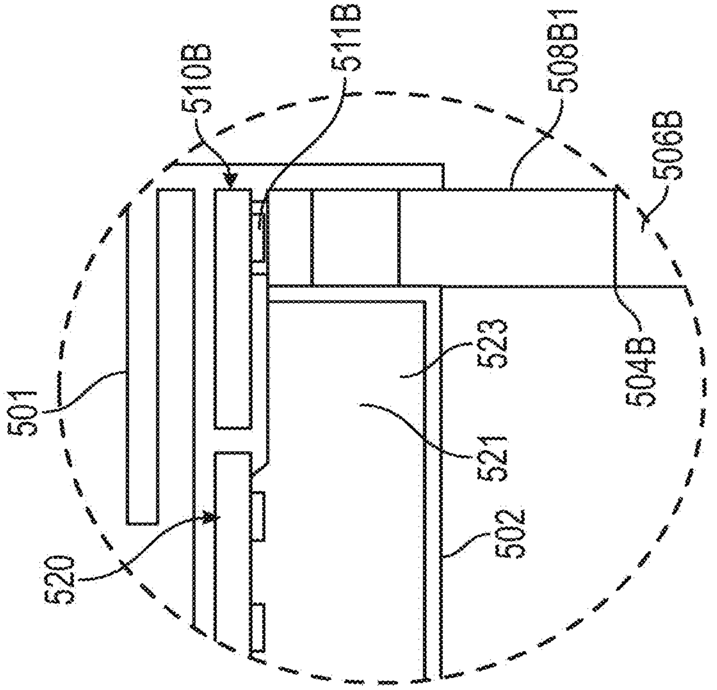
FIG. 21B is a magnified cross-sectional view of a portion of the lighting fixture of FIG. 21A.
Figure 21A:
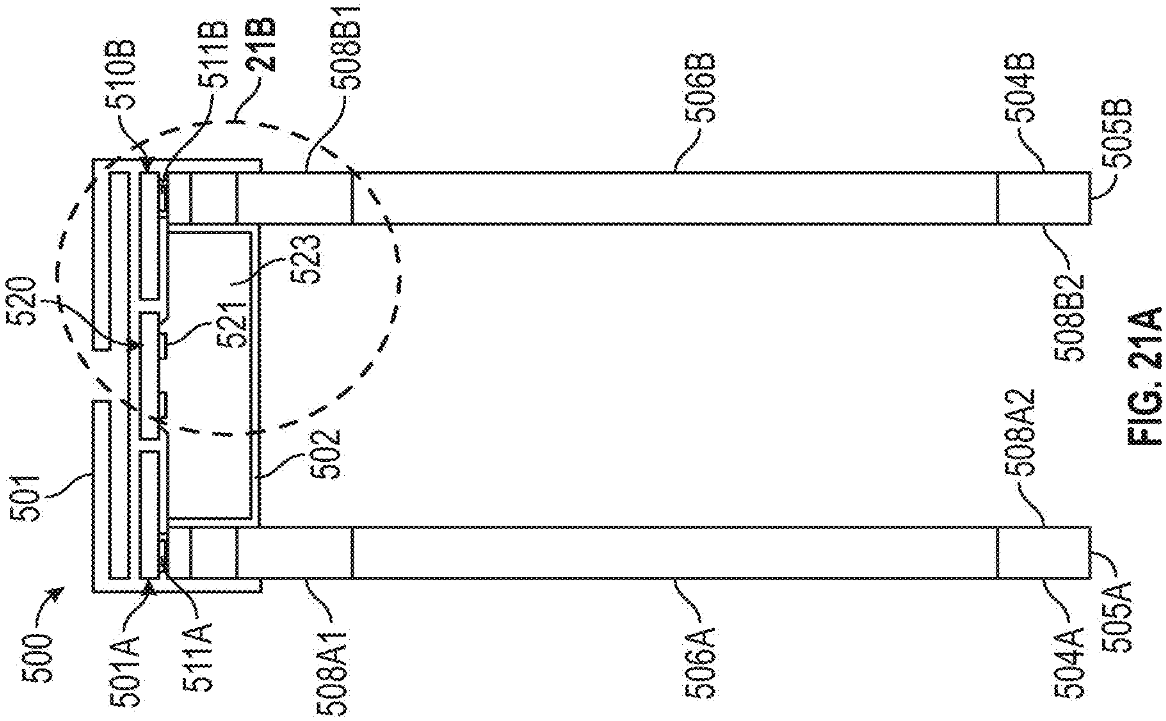
FIG. 21A is a cross-sectional view of a lighting fixture according to one embodiment, including an illuminated light-transmissive panel configured to emit light in a downward direction, with two illuminated waveguides arranged in parallel along peripheral portions of and extending in a transverse direction relative to the light-transmissive panel.
Figure 21C:
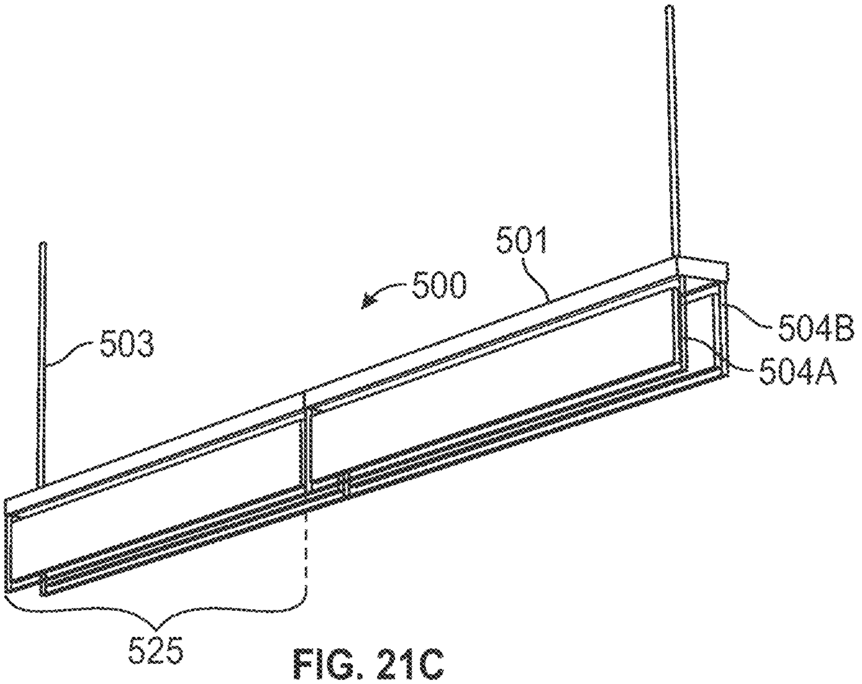
FIG. 21C is a perspective view of the lighting fixture of FIG. 21A configured to be suspended from a static surface (e.g., a ceiling).
Figure 21D:
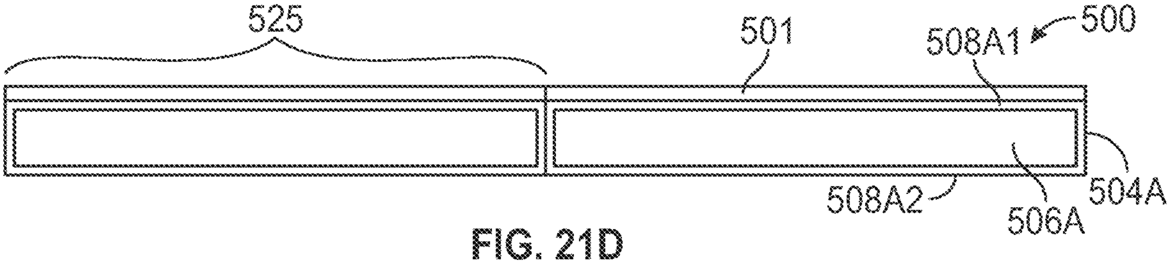
FIG. 21D is a side elevational view of the lighting fixture of FIG. 21A.
Figure 21E:
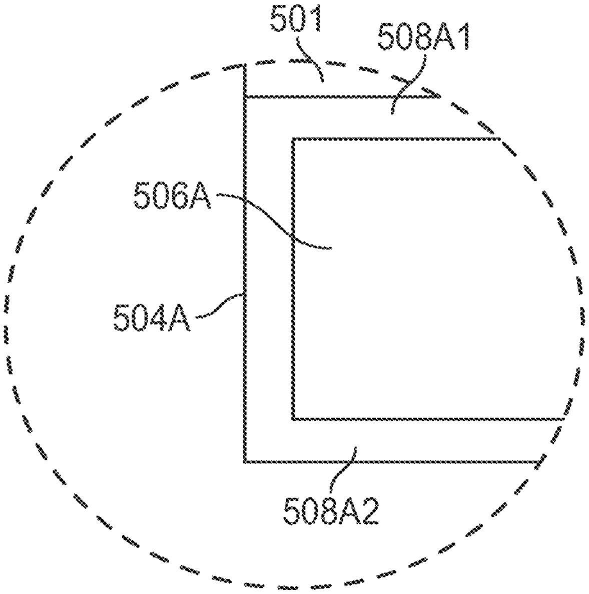
FIG. 21E is a magnified elevational view of a portion of the lighting fixture depicted in FIG. 21D.

FIGS. 21A-21E provide views of a lighting fixture 500 according to one embodiment, including an illuminated light-transmissive panel 502 configured to emit light in a downward direction, with two illuminated waveguides 504A, 504B arranged in parallel along peripheral portions of, and extending in a transverse direction relative to, the light-transmissive panel 502. A frame 501 is provided to support a first light source 520 (with LEDs 521) and second light sources 510A, 510B (with LEDs 511A, 511B). The first light source 520 is configured to illuminate the light-transmissive panel 502, which is separated from the first light source 520 by a cavity 523. Each waveguide 504A, 504B is configured to be illuminated by a corresponding second light source 510A, 510B. Each waveguide 504A, 504B extends in a transverse direction relative to the light-transmissive panel 502, and includes a light extraction region 506A, 506B arranged between two non-light-extraction regions 508A1, 508A2, 508B1, 508B2 (which may be clear, causing the light extraction regions 506A, 506B to appear to float in space). The light extraction regions 506A, 506B may be medially arranged between the second light sources 510A, 501B and distal ends 505A, 505B of the waveguides 504A, 504B. As shown in FIG. 21C, the frame 501 may be suspended by suspension elements 503.

Figure 22:
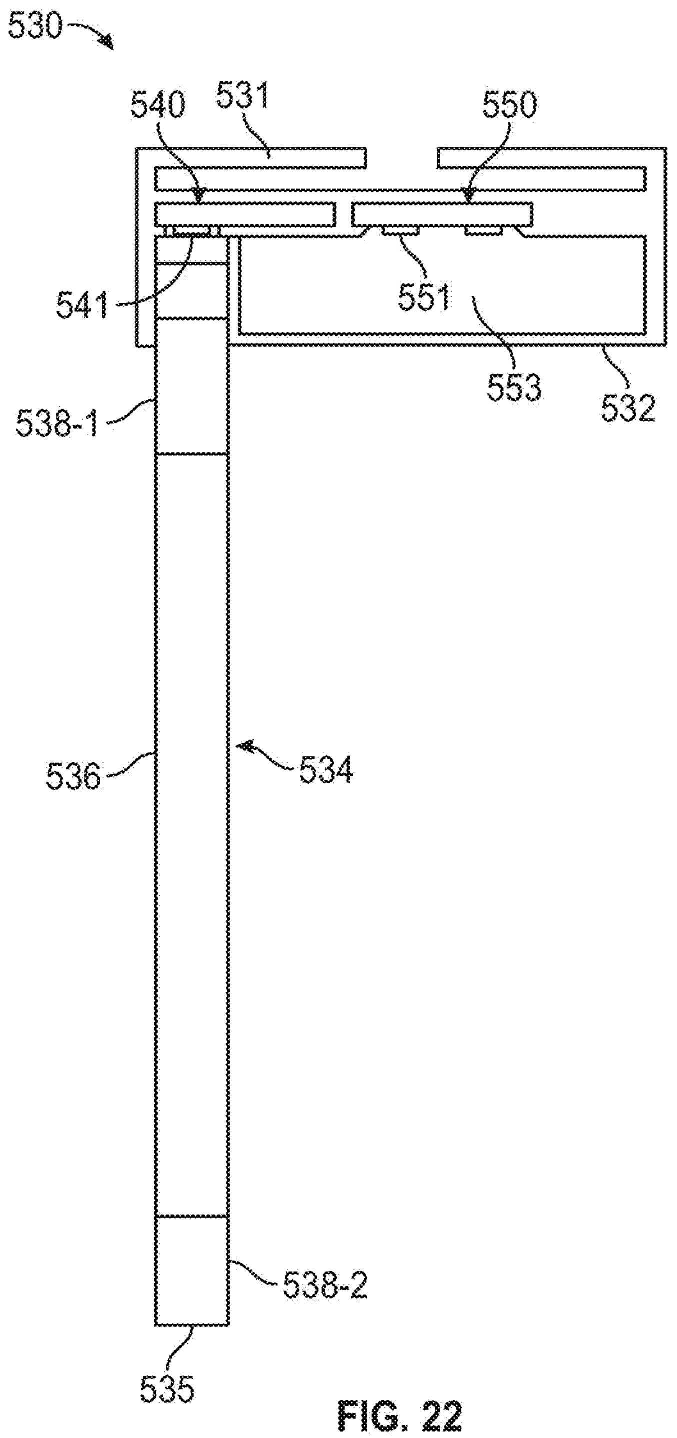
FIG. 22 is a cross-sectional view of a lighting fixture according to one embodiment similar to the lighting fixture of FIGS. 21A-21E, but including only one waveguide extending in a transverse direction relative to a light-transmissive panel.

FIG. 22 is a cross-sectional view of a lighting fixture 530 according to one embodiment similar to the lighting fixture of FIGS. 21A-21E, but including only one illuminated waveguide 534 extending in a transverse direction relative to a light-transmissive panel 532. A frame 531 is provided to support a first light source 540 (with LEDs 541 to illuminate the light-transmissive panel 532) and a second light source 540 (with LEDs 541 to illuminate the waveguide 534). The first light source 550 is separated from the light-transmissive panel 532 by a cavity 553. The waveguide 534 includes a light extraction region 536 arranged between two non-light-extraction regions 538-1, 538-2 (which may be clear, causing the light extraction region 536 to appear to float in space). The light extraction region 536 may be medially arranged between the second light source 540 and a distal end 555 of the waveguide 534.

Figure 23A:
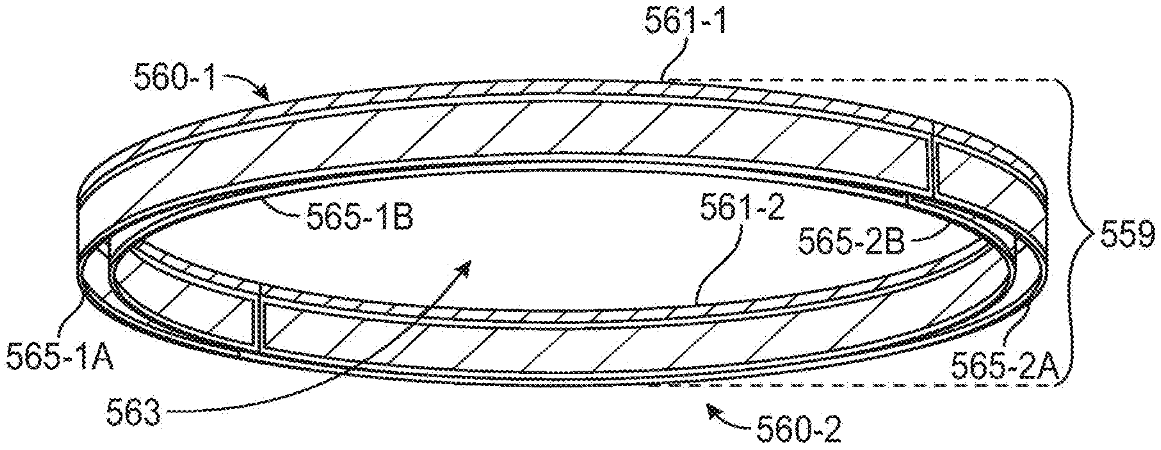
FIG. 23A is a perspective view of a lighting fixture according to one embodiment including an illuminated light-transmissive panel of an annular shape configured to emit light in a downward direction with a hollow interior, and two concentric circular groups of illuminated waveguides each having curved light-emitting faces and extending in a transverse direction relative to the light-transmissive panel.

FIG. 23A is a perspective view of a lighting fixture 559 according to one embodiment including two semi-circular assemblies 560-1, 560-2 that each include a semi-annular light-transmissive panel (e.g., resembling the light-transmissive panel 532 described in connection with FIG. 22) being laterally bounded by two downwardly-extending waveguides 565-1A, 565-1B, 565-2A, 565-2B that are transversely oriented relative to the light-transmissive panels. Each assembly 560-1, 560-2 includes a housing 561-1, 561-2 along an upper boundary thereof, wherein each light-transmissive panel is arranged within (or below) the respective housing 561-1, 561-2. In combination, the two semi-circular assemblies 560-1, 560-2 form an annular shape, with the inner waveguides 565-1B, 565-2B forming a first circle that is concentric with a second circle formed by the outer waveguides 565-1A, 565-2A, wherein the housings 561-1, 561-2 and the inner waveguides 565-1B, 565-2B bounding a hollow interior 563 that is unfilled (i.e., open from above and below). The light-transmissive panels of the assemblies 560-1, 560-2 are arranged generally above and between the waveguides 565-1A, 565-1B, 565-2A, 565-2B, and are configured to emit light in a generally downward direction, while the waveguides 565-1A, 565-1B, 565-2A, 565-2B include curved light-emitting faces and may be configured to emit light in any desired lateral and/or downward direction depending on the presence and orientation of light extraction features.

Figure 23B:
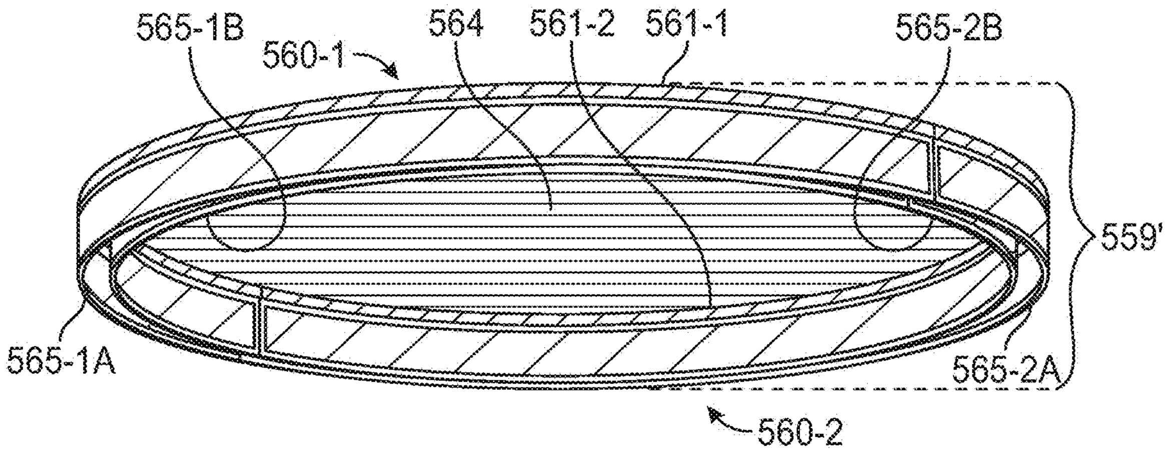
FIG. 23B is a perspective view of a lighting fixture according to one embodiment including an illuminated light-transmissive panel of an annular shape configured to emit light in a downward direction with an interior of the annular shape containing one or more sound-damping materials (e.g., acoustic insulation), and two concentric circular groups of illuminated waveguides each having curved light-emitting faces and extending in a transverse direction relative to the light-transmissive panel.

FIG. 23B is a perspective view of a lighting fixture 559' according to one embodiment that is substantially identical to the lighting fixture 559 of FIG. 23A, except that a space bounded by the housings 561-1, 561-2 of the semi-circular assemblies 560-1, 560-2 is filled instead of being unfilled. In certain embodiments, this space contains one or more sound-damping materials (e.g., acoustic insulation). Presence of sound damping materials in suspended fixtures may be very desirable in high ceiling loud sport-related areas, libraries, tall hotel lobbies, and the like. The remaining features of FIG. 23B are substantially identical to those of FIG. 23A and will not be described again, with the description for FIG. 23A being incorporated by reference with respect to FIG. 23B.

Figure 24:
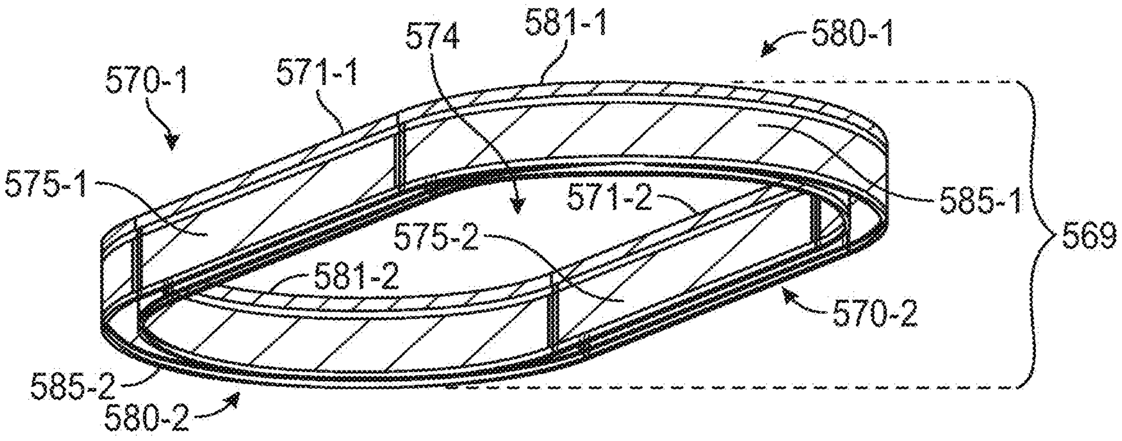
FIG. 24 is a perspective view of a lighting fixture according to one embodiment including an illuminated light-transmissive panel of "racetrack" or rounded rectangular shape having curved ends and being configured to emit light in a downward direction with a hollow interior, with two groups of illuminated waveguides extending in a transverse direction relative to the light-transmissive panel along inner and outer edges of the light-transmissive panel.

FIG. 24 is a perspective view of a lighting fixture 569 according to one embodiment including two linear assemblies 570-1, 570-2 and two semi-circular assemblies 580-1, 580-2 that in combination form a "racetrack" or rounded rectangular shape having curved ends. Each of the foregoing assemblies 570-1, 570-2, 580-1, 580-2 has a housing 571-1, 571-2, 581-1, 581-2 along an upper boundary thereof and extending in a horizontal direction, with each assembly 570-1, 570-2 including waveguides 575-1, 575-2, 585-1, 585-2 arranged transverse to the corresponding housing 571-1, 571-2, 581-1, 581-2 and extending in a downward direction. Each assembly 570-1, 570-2, 580-1, 580-2 includes a light-transmissive panel arranged within (or below) the respective housing 571-1, 571-2, 581-1, 581-2. The housings and the waveguides bound a hollow interior 574 that is unfilled (i.e., open from above and below). The light-transmissive panels of the assemblies 570-1, 570-2 are arranged generally above and between the waveguides 575-1A, 575-1B, 575-2A, 575-2B, and are configured to emit light in a generally downward direction, while the waveguides 575-1A, 575-1B, 575-2A, 575-2B include curved light-emitting faces and may be configured to emit light in any desired lateral and/or downward direction depending on the presence and orientation of light extraction features.

Figure 25A:
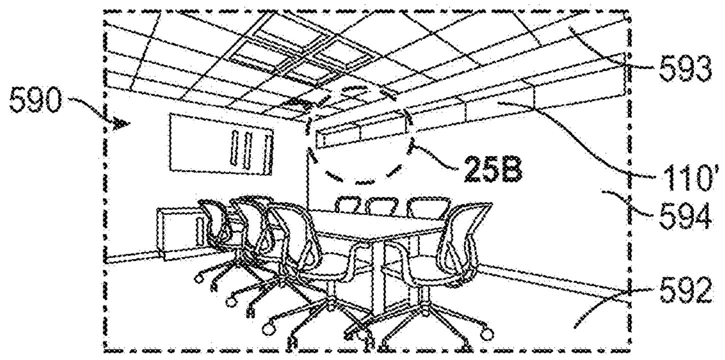
FIG. 25A is a perspective view of a room including a lighting fixture recessed into a wall and resembling a horizontal transom window and positioned closer to the ceiling than the floor of the room, with the lighting fixture including an illuminated light-transmissive panel bounded along multiple sides by illuminated waveguides that extend in a transverse direction relative to the light-transmissive panel.
Figure 25B:
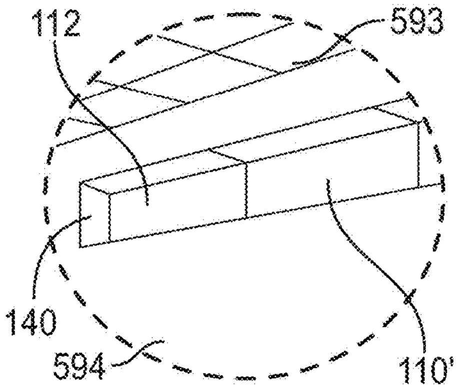
FIG. 25B is magnified perspective view of the recessed lighting fixture depicted in FIG. 25A.

FIG. 25A is a perspective view of a room 590 including a lighting fixture 110' recessed into a wall 594 and resembling a horizontal transom window, and being positioned closer to the ceiling 593 than the floor 592 of the room 590. The lighting fixture 110' includes an illuminated light-transmissive panel bounded along multiple sides by illuminated waveguides that extend in a transverse direction relative to the light-transmissive panel. FIG. 25B is magnified perspective view of the recessed lighting fixture 110' (with a light transmissive panel 112 and waveguides 140) depicted in FIG. 25A.

Figure 26A:
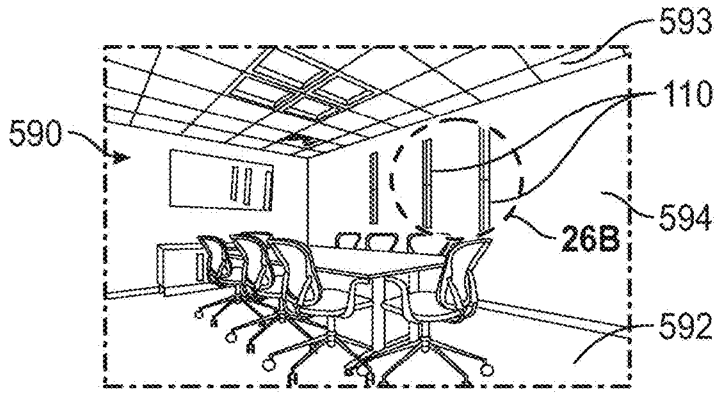
FIG. 26A is a perspective view of a room including multiple lighting fixtures recessed into a wall and resembling a vertically oriented narrow windows, with each lighting fixture including an illuminated light-transmissive panel bounded along multiple sides by illuminated waveguides that extend in a transverse direction relative to the light-transmissive panel.

FIG. 26A is a perspective view of a room 590 including multiple lighting fixtures 110 recessed into a wall 594 and resembling vertically oriented narrow windows, with each lighting fixture including an illuminated light-transmissive panel bounded along multiple sides by illuminated waveguides that extend in a transverse direction relative to the light-transmissive panel. Any desired number of lighting fixtures 110 may be positioned at any suitable location of the wall 594 between a floor 592 and a ceiling 593 of the room 590.

Figure 26B:
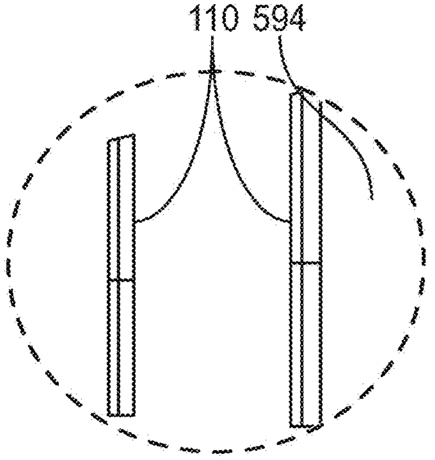
FIG. 26B is magnified perspective view of two recessed lighting fixtures depicted in FIG. 26A.

FIG. 26B is magnified perspective view of two recessed lighting fixtures 110 recessed within a wall 594 as depicted in FIG. 26A.

Figure 27A:
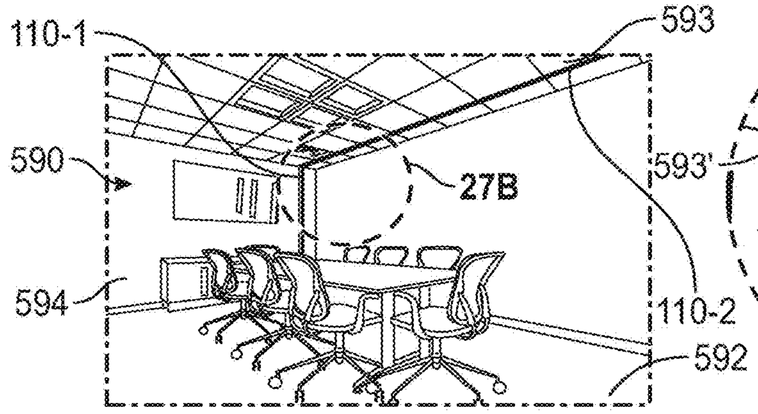
FIG. 27A is a perspective view of a room including at least one lighting fixture recessed into a wall and resembling a vertically oriented narrow windows and including at least one lighting fixture recessed into a ceiling a resembling a skylight, with each lighting fixture including an illuminated light-transmissive panel bounded along multiple sides by illuminated waveguides that extend in a transverse direction relative to the light-transmissive panel.

FIG. 27A is a perspective view of a room 590 including at least one lighting fixture 110-1 recessed into a wall 594 and resembling a vertically oriented narrow window, and including at least one lighting fixture 110-2 recessed into a ceiling 110-2 and resembling a skylight, with each lighting fixture 110-1, 110-2 including an illuminated light-transmissive panel bounded along multiple sides by illuminated waveguides that extend in a transverse direction relative to the light-transmissive panel. The at least one lighting fixture recessed into the wall 594 may extended from a floor 592 to the ceiling 593 of the room 590.

Figure 27B:
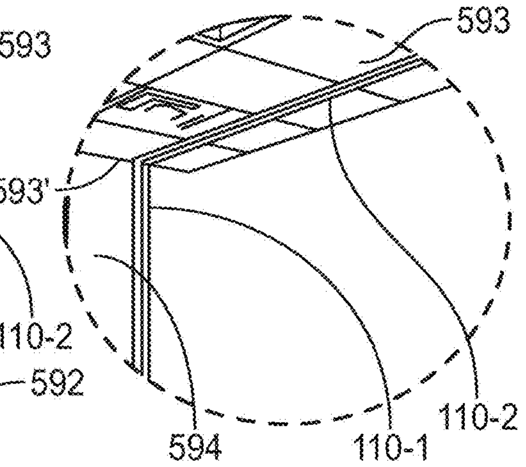
FIG. 27B is magnified perspective view of a portion of FIG. 27A showing a wall-recessed lighting fixture abutting a wall-recessed lighting fixture at a wall-ceiling interface of the room.

FIG. 27B is magnified perspective view of a portion of FIG. 27A showing the wall-recessed lighting fixture 110-1 (in wall 594) abutting the wall-recessed lighting fixture 110-2 (in ceiling 593) at a wall-ceiling interface 593' of the room 590 of FIG. 27A.

Figure 28A:
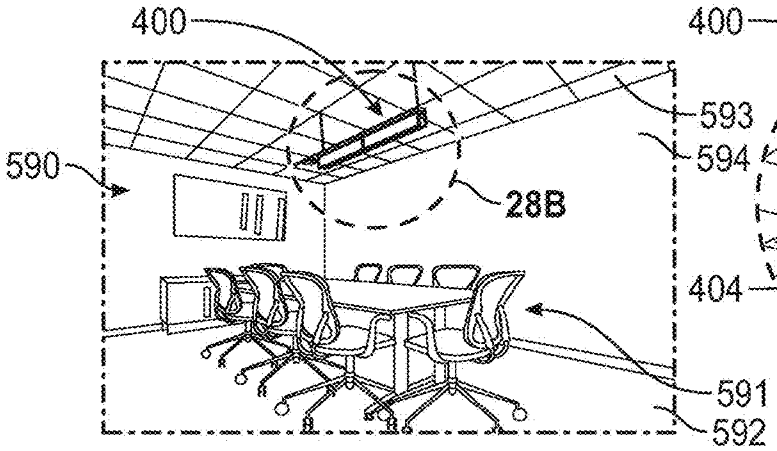
FIG. 28A is a perspective view of a room including a suspended lighting fixture that includes an illuminated light-transmissive panel bounded along two sides by illuminated waveguides that extend in a transverse direction relative to the light-transmissive panel.
Figure 28B:
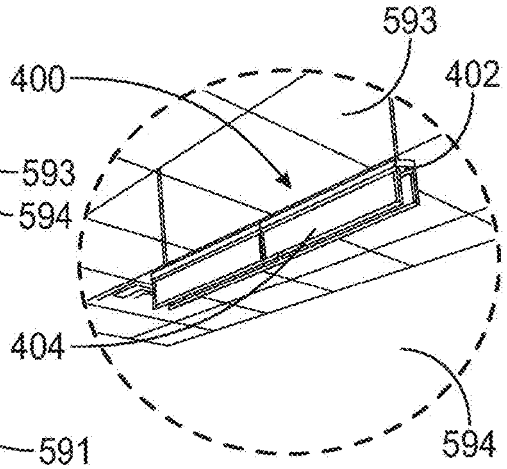
FIG. 28B is a magnified perspective view of a portion of FIG. 28A including the suspended lighting fixture.

FIG. 28A is a perspective view of a room 590 including a suspended lighting fixture 400 (shown in greater detail in the magnified view of FIG. 28B) that includes an illuminated light-transmissive panel 402 bounded along two sides by illuminated waveguides 404 that extend in a transverse direction relative to the light-transmissive panel 402. As shown, the lighting fixture 400 is suspended from ceiling 593 to primarily illuminate a table 591, but emissions of the lighting fixture 400 may secondarily illuminate portions of walls 594 and a floor 592 of the room 590.

Figure 29:
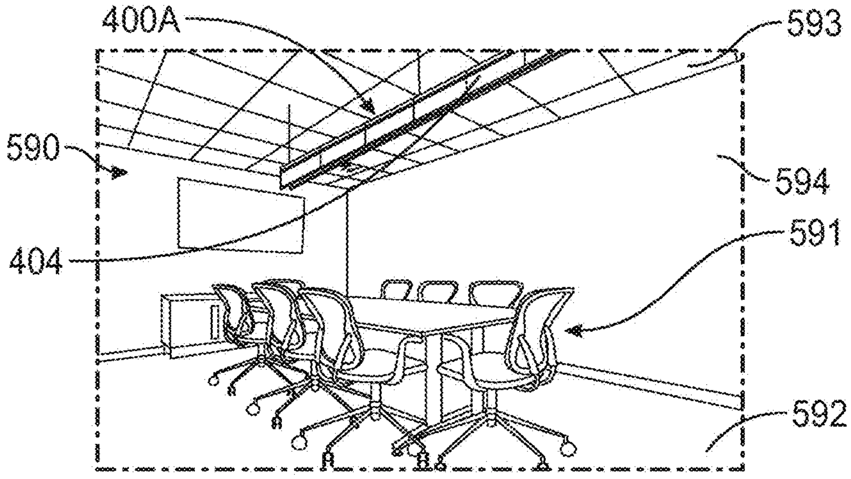
FIG. 29 is a perspective view of a room including at least one suspended lighting fixture formed of multiple collinearly arranged subassemblies, wherein each subassembly includes an illuminated light-transmissive panel bounded along two sides by illuminated waveguides that extend in a transverse direction relative to the light-transmissive panel.

FIG. 29 is a perspective view of a room 590 including at least one suspended lighting fixture 400A formed of multiple collinearly arranged subassemblies, wherein each subassembly includes an illuminated light-transmissive panel bounded along two sides by illuminated waveguides 404 that extend in a transverse direction relative to the light-transmissive panel. As shown, the lighting fixture 400A is suspended from ceiling 593 to primarily illuminate a table 591, but emissions of the lighting fixture 400 may secondarily illuminate portions of walls 594 and a floor 592 of the room 590.

Figure 30:
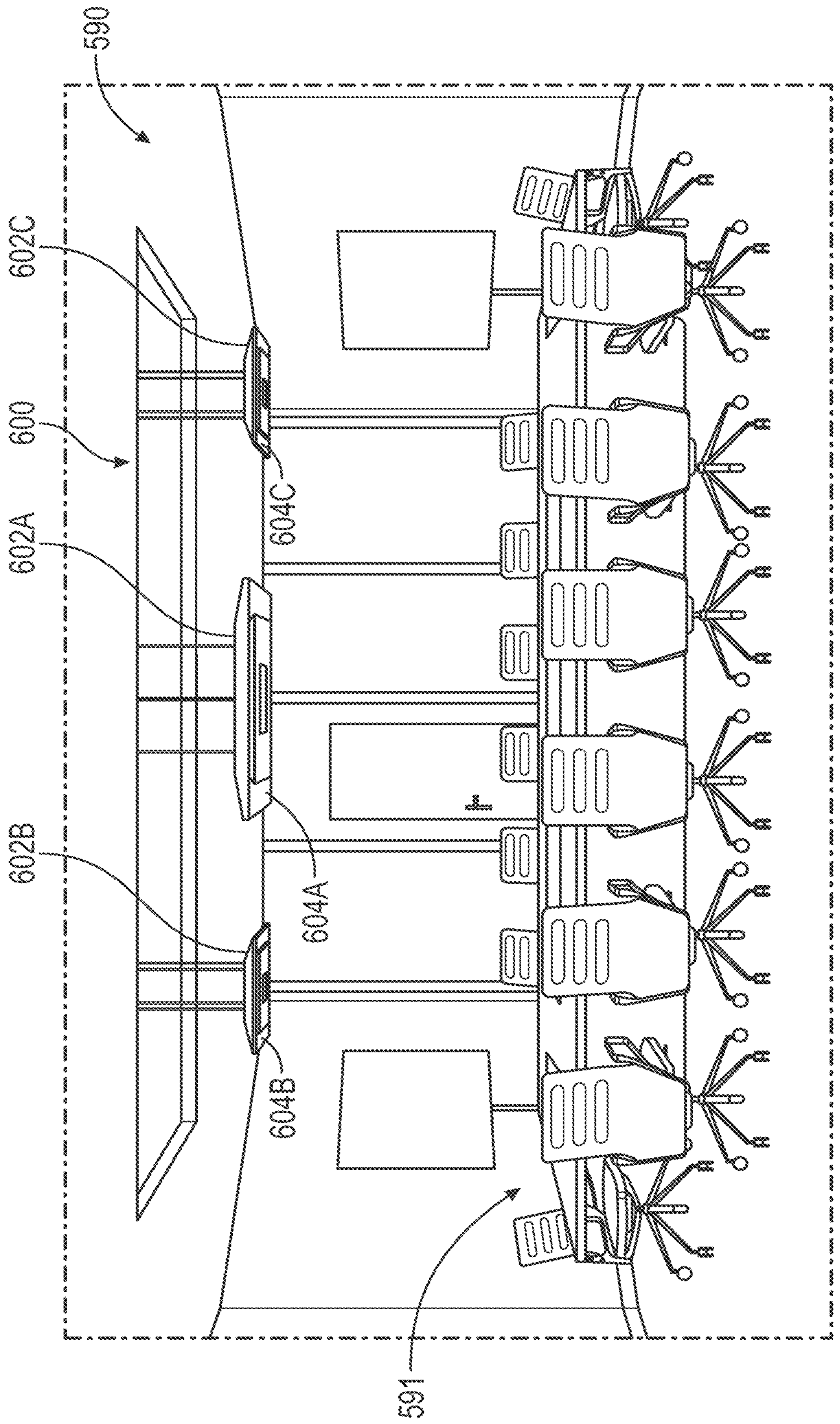
FIG. 30 is a perspective view of light system including a plurality of lighting fixtures with each lighting fixture including a peripheral emission feature embodied as a peripheral reflector.
Figure 31A:
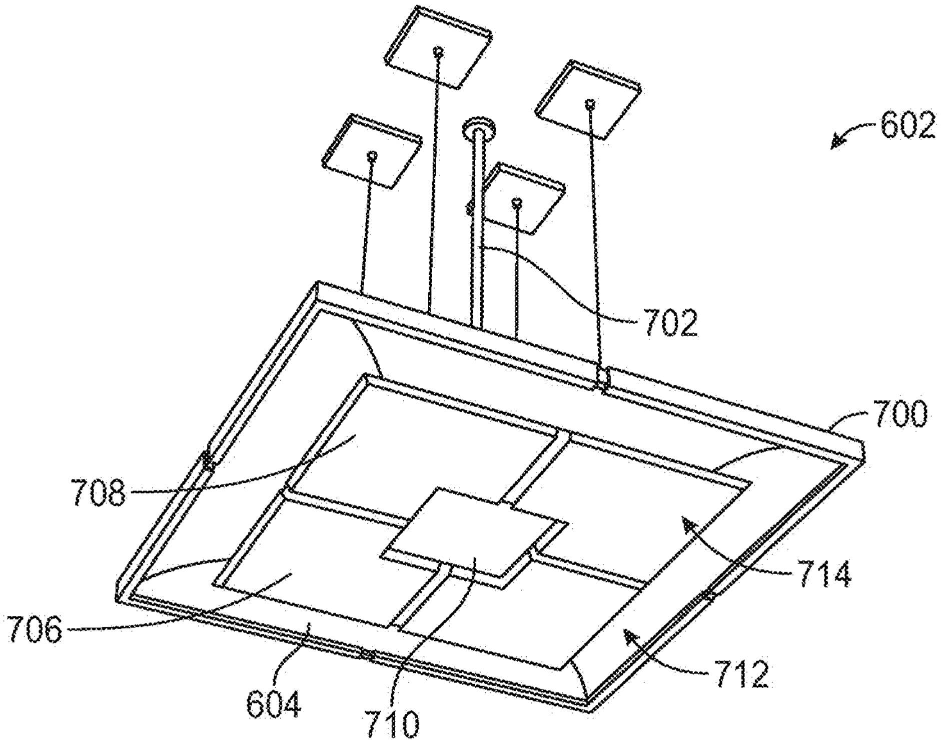
FIG. 31A is a lower perspective view of a lighting fixture of FIG. 30 with a peripheral reflector.
Figure 31B:
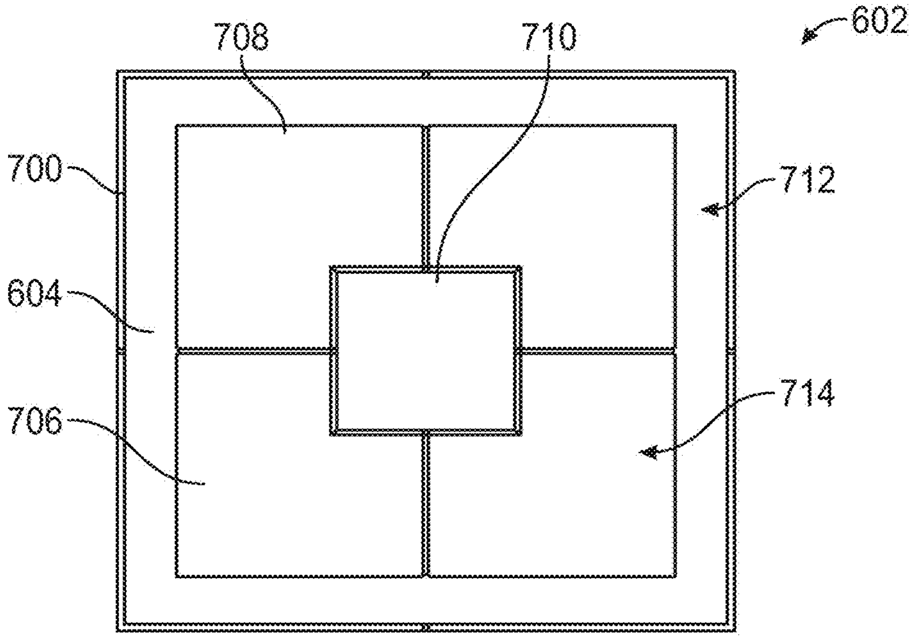
FIG. 31B is a bottom plan view of the lighting fixture of FIG. 31A.
Figure 31C:
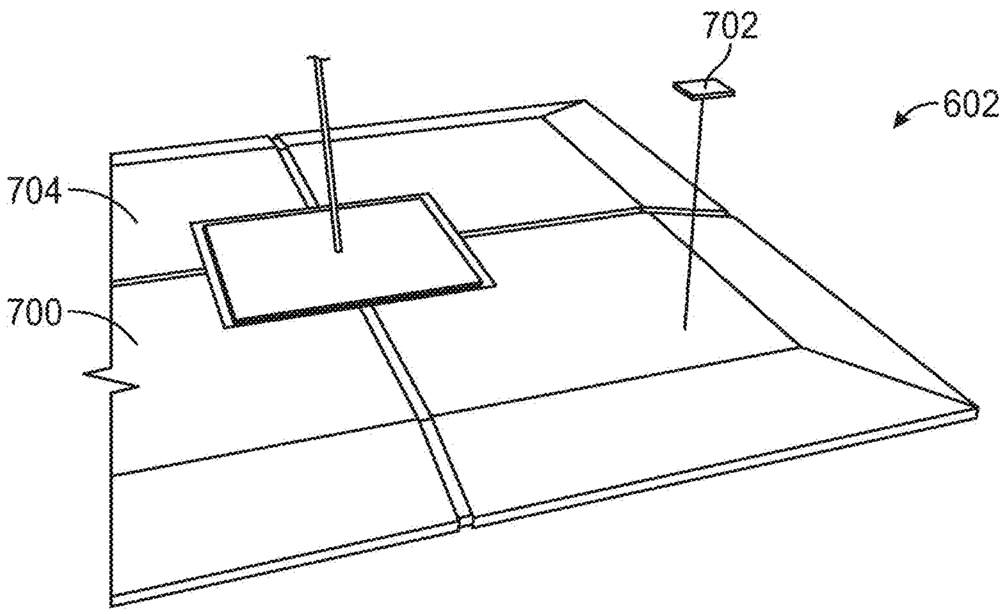
FIG. 31C is an magnified upper perspective view of a portion of the lighting fixture of FIG. 31A.

Various embodiments including lighting fixtures and/or lighting systems the incorporate peripheral emission features will now be described. In certain embodiments, a peripheral light emission feature may include a plurality of light sources distributed around a periphery of the lighting fixture and configured to illuminate a peripheral light emission feature defining a peripheral region, optionally in conjunction with a peripheral reflector defining a peripheral reflector region laterally enclosing a non-reflector region and arranged around substantially an entire perimeter of the lighting fixture. In certain embodiments, a peripheral light emission feature may include a waveguide defining a peripheral waveguide region laterally enclosing a non-waveguide region and arranged around substantially an entire perimeter of the lighting fixture. In certain embodiments, a peripheral light emission feature may include at least one waveguide that is used in conjunction with a light-transmissive panel FIG. 30 is a perspective view of a lighting system 600 including a plurality of lighting fixtures 602A-602C each including a respective peripheral emission feature embodied in a peripheral reflector 604A-604C. FIG. 31A is a As shown, the lighting fixtures 602A-602C may come in a plurality of shapes and sizes (e.g., with lighting fixtures 602B-602C being smaller than fixture 602A, but all having a square footprint), such as having a width in a range between 1 foot and 10 feet (e.g., 2 feet, 4 feet, 8 feet, etc.). Of course, different shapes and/or sizes may be used as desired. Although the lighting fixtures 602A-602C are illustrated as being suspended in a room 590 above a table 591, lighting fixtures according to various embodiments may be mounted in a variety of ways (e.g., partially recessed, flush mounted, surface mounted, suspended, etc.) relative to a ceiling and/or walls of a room. Each of the lighting fixtures 602A-602C may be generically referred to as lighting fixture 602 hereinafter.

FIGS. 31A-31D are views of a lighting fixture 602 incorporating a peripheral reflector 604. The lighting fixture 602 includes a fixture housing 700 and a mounting element 702. The lighting fixture 602 further includes a plurality of light sources (e.g., including light emitting diodes (LEDs) in certain embodiments) and electrical components (e.g., as shown in FIGS. 32A-32B) contained within the fixture housing 700.

The fixture housing 700 includes an upper shell 704, a lower shell 706, and the at least one peripheral reflector 604. In certain embodiments, the upper shell 704 is of unitary construction and spans the entirety of a total projected top and/or bottom area of the lighting fixture 602. In certain embodiments, the upper shell 704 includes a metal material. In certain embodiments, the lower shell 706 is a non-unitary construction and spans less than an entirety of the total projected top and/or bottom area of the lighting fixture 602. In certain embodiments, the lower shell 706 includes a surrounding non-reflector region 708 and a central non-reflector region 710. In certain embodiments, the central non-reflector region 710 is vertically offset from the surrounding non-reflector region 708. In certain embodiments, at least a portion of the bottom shell 706 includes acoustic insulation material (which may also be referred to as sound damping materials). Such acoustic insulation may prevent echoes and improve the overall acoustics of a room in which the lighting fixture 602 is mounted.

The at least one peripheral reflector 604 defines at least one peripheral reflector region 712 laterally bounding or surrounding a non-reflector region 714. In certain embodiments, the at least one peripheral reflector region 712 is continuous and is arranged around substantially an entire perimeter of the lighting fixture 602. In certain embodiments, the at least one peripheral reflector region 712 is arranged around at least 95% of the entire perimeter (e.g., 100% of the entire perimeter in certain embodiments). In certain embodiments, the at least one peripheral reflector region 712 embodies less than 50% of a total projected bottom area of the lighting fixture 602 (e.g., less than 20% of a total projected bottom area of the lighting fixture 602).

Figure 32A:
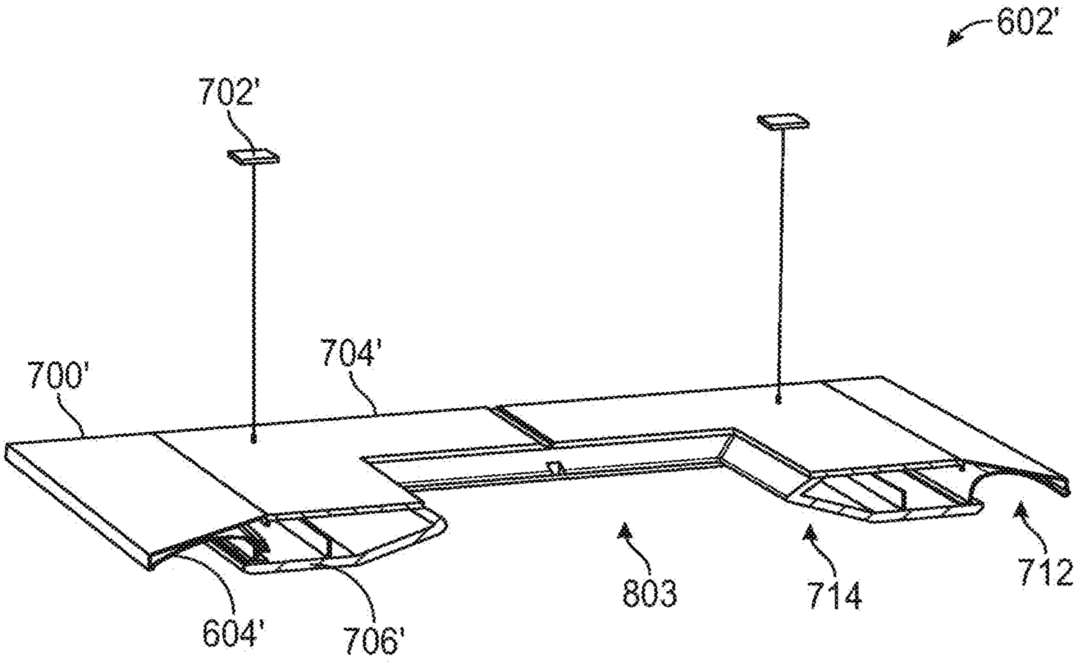
FIG. 32A is a cross-sectional perspective view of a lighting fixture similar to that of FIGS. 30-31D.
Figure 32B:
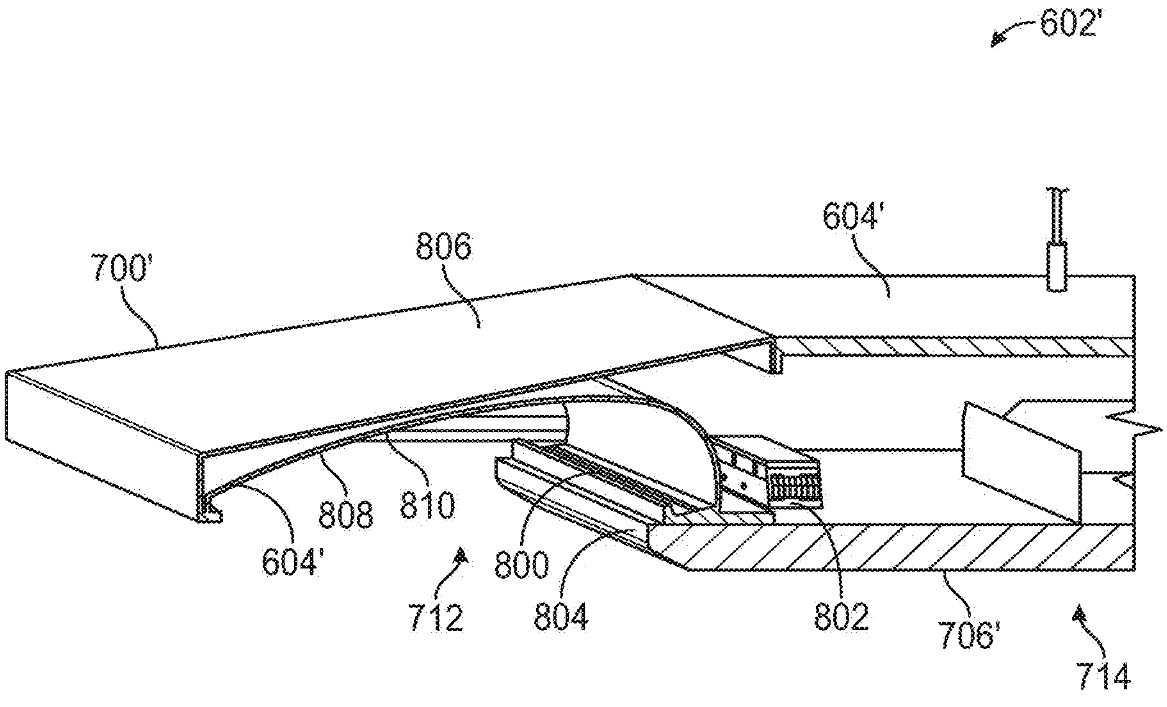
FIG. 32B is an enlarged cross-sectional perspective view of the lighting fixture of FIG. 32A.

A plurality of light sources (as shown in FIGS. 32A-32B) is distributed around a periphery of the lighting fixture 602 and is configured to illuminate the at least one peripheral reflector region 712. In certain embodiments, the plurality of light sources and/or the peripheral reflector 704 are configured for direct lighting and/or indirect lighting. The at least one peripheral reflector 604 is configured to reflect at least a portion of emissions of the plurality of light sources in a downward direction, such that the peripheral reflector 604 may provide substantially even and uniform lighting with little to no glare.

Figure 31D:
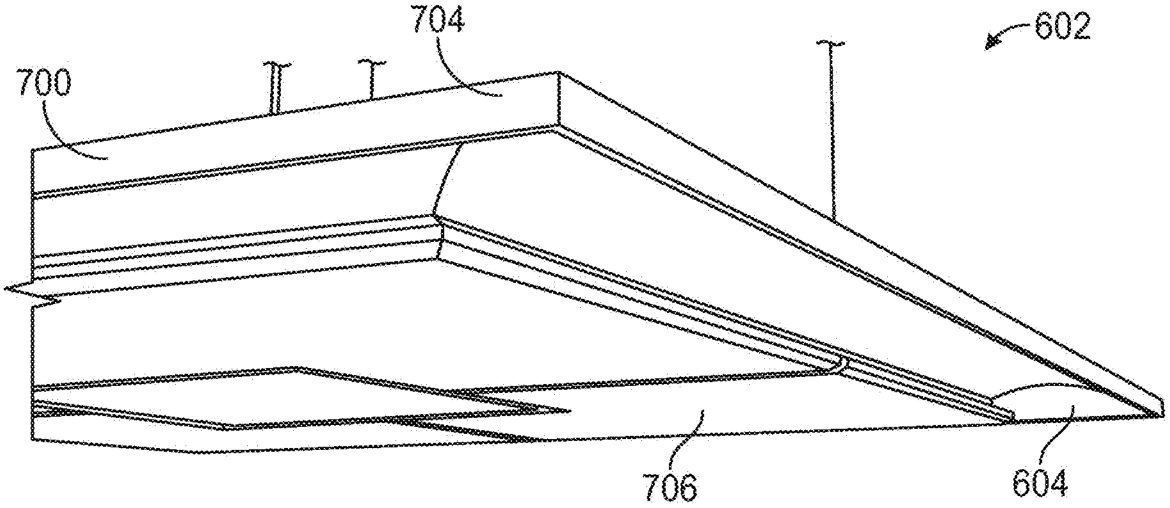
FIG. 31D is an magnified lower perspective view of a portion of the lighting fixture of FIG. 31A.

FIGS. 32A-32B are cross-sectional perspective views of portions of a lighting fixture 602' similar to the fixtures shown in FIGS. 30-31D. The lighting fixture 602' includes a fixture housing 700' and a mounting element 702'. As shown in FIG. 32B, a plurality of light sources 800 and electrical components 802 are contained within the fixture housing 700'.

In certain embodiments, the light sources 800 include light emitting diodes (LEDs), which may be embodied in single- or multiple-LED chips and/or LED modules. In certain embodiments, each LED element or module may be a single white LED chip, a single non-white colored LED chip, or other bare LED, either mounted separately or together on a single substrate or package to form a module including, for example, at least one phosphor-coated LED either alone or in combination with at least one colored LED (e.g., a green LED, a yellow LED, a red LED, etc.). Different color temperatures and appearances may be produced using other LED combinations, as known in the art. In certain embodiments, the lighting fixture 602' may provide aggregate emissions having a correlated color temperature (CCT) in a range of 2700K-6500K, and in certain embodiments the CCT may be adjusted with respect to time (e.g., within a day and/or with respect to different days of a calendar year) to provide Circadian benefits.

With continued reference to FIGS. 32A-32B, the fixture housing 700' further includes an upper shell 704', a lower shell 706', and the at least one peripheral reflector 604'. The upper shell 704' and the lower shell 706' define a central opening 803 extending vertically through the lighting fixture 602'. In certain embodiments, the central opening 803 may be decorative or functional (e.g., to receive a functional feature therein).

The electrical components 802 are positioned in an interior bounded by the upper shell 704', the lower shell 706', and the peripheral reflector 604'. The plurality of light sources 800 are positioned along a periphery of the non-reflector region 714 at an upper surface 804 of the lower shell 806'. In certain embodiments, the plurality of light sources 800 are distributed around an inner edge of the at least one peripheral reflector region 712 and/or inset relative to an outer edge of the at least one peripheral reflector region 712.

The peripheral reflector 604' includes an upper casing 806 and a lower casing 808. The upper casing 806 of the peripheral reflector 604' mechanically couples to the upper shell 704' of the lighting fixture 602', and the lower casing 808 of the peripheral reflector 604' mechanically couples to the lower shell 706' of the lighting fixture 602'. The lower casing 808 of the peripheral reflector 604' includes a curved cross-sectional shape. The lower casing 808 of the peripheral reflector 604' includes a reflective light output surface 810 to direct light from the plurality of light sources 800 downward.

The light output surface 810 partially overlaps with, and extends outwardly from, the lower shell 706'. The plurality of light sources 800 is adjacent to the peripheral reflector 604' and is configured to direct emissions upward toward the light output surface 810. The peripheral reflector 604' is configured to reflect substantially an entirety of the emissions of the plurality of light sources 800 in the downward direction for indirect illumination of a space in which the lighting fixture 602 is arranged. In certain embodiments, the peripheral reflector 604' is configured for diffuse reflection. In certain embodiments, the peripheral reflector 604' is configured for specular reflection.

In certain embodiments, the lighting fixture 602' is devoid of a lens arranged between the plurality of light sources 800 and the light output surface 810, and the light output surface 810 is configured to direct the at least a portion of the emissions of the plurality of light sources 800 in the downward direction. In certain embodiments, the lighting fixture 602' is devoid of a diffuser arranged between the plurality of light sources 800 and the light output surface 810, and the light output surface 810 is configured to direct the at least a portion of the emissions of the plurality of light sources 800 in the downward direction. In certain embodiments, the lighting fixture 602' is devoid of a lens and a diffuser in a light path originating from the plurality of light sources 800 and the at least a portion of the emissions emitted into an environment containing the lighting fixture 602'. The plurality of light sources 800 emit light upward at an inner edge of the peripheral reflector region 712 and toward the light output surface 810, which redirects the light downward. Thus, a light path from the plurality of light sources 800 into a room may be devoid of a lens and/or diffuser. In certain embodiments, the light output surface 810 can be configured to alter (e.g., diffuse) light emitted from the plurality of light sources 800.

In certain embodiments, the lighting fixture 602' may be configured to be at least partially recessed into a ceiling structure. In such an embodiment, the plurality of light sources 600 may be configured to be positioned below a visible ceiling plane of the ceiling structure.

Figure 33A:
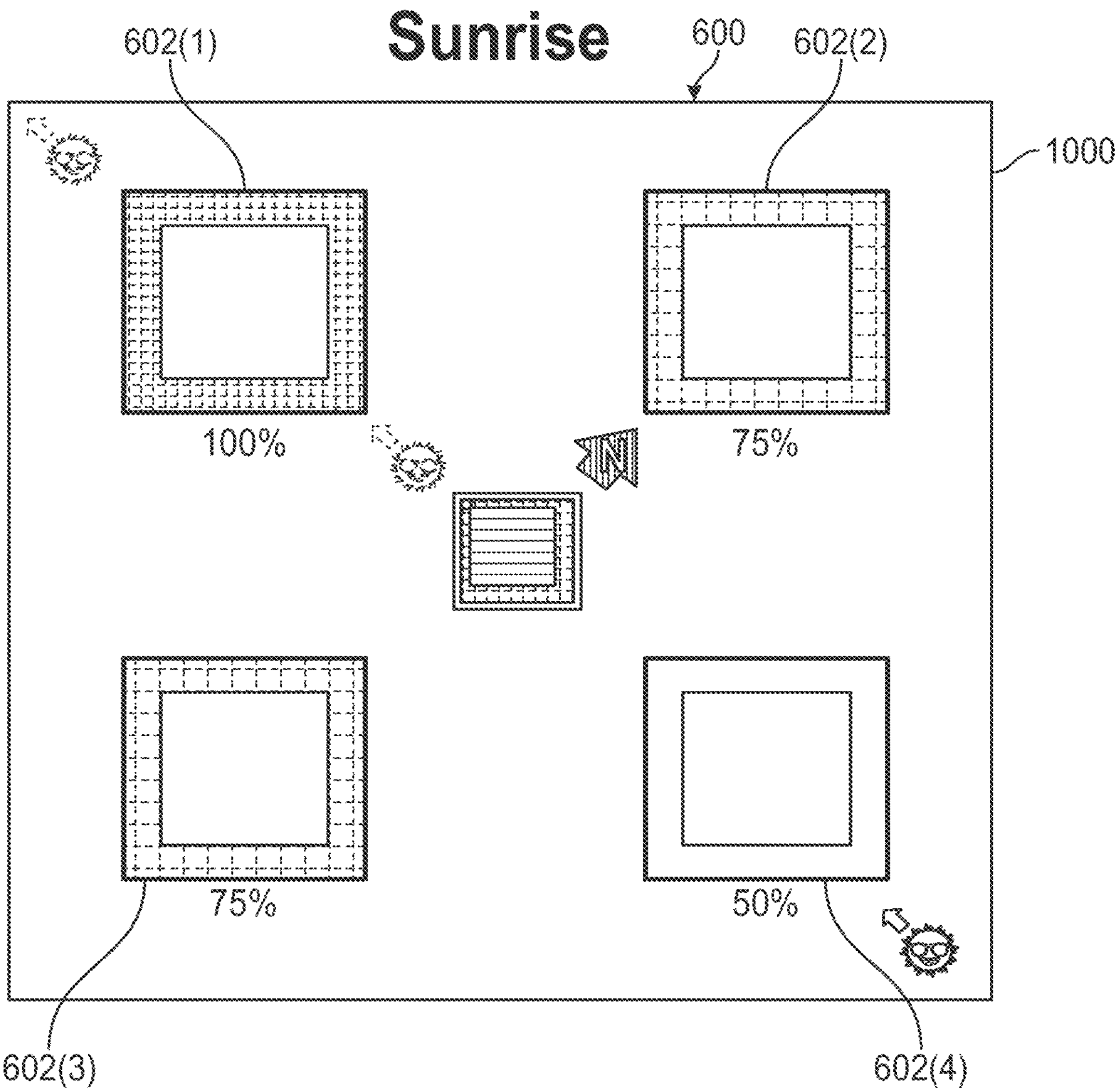
FIG. 33A is a diagram illustrating a first dynamic lighting operating state provided by a system incorporating lighting fixtures according to FIGS. 30-32B.
Figure 33B:
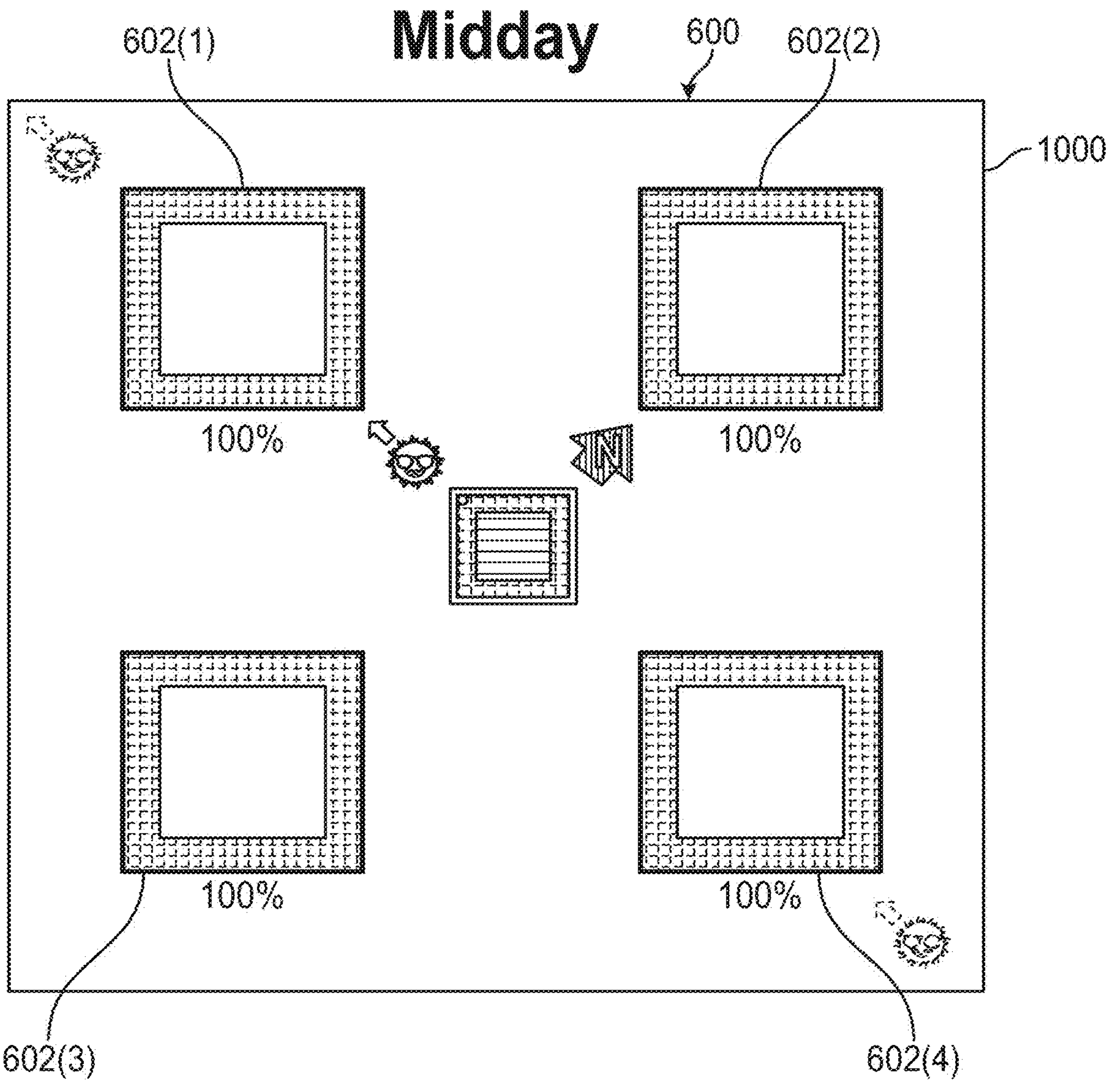
FIG. 33B is a diagram illustrating a second dynamic lighting operating state provided by the system of lighting fixtures of FIG. 33A.
Figure 33C:
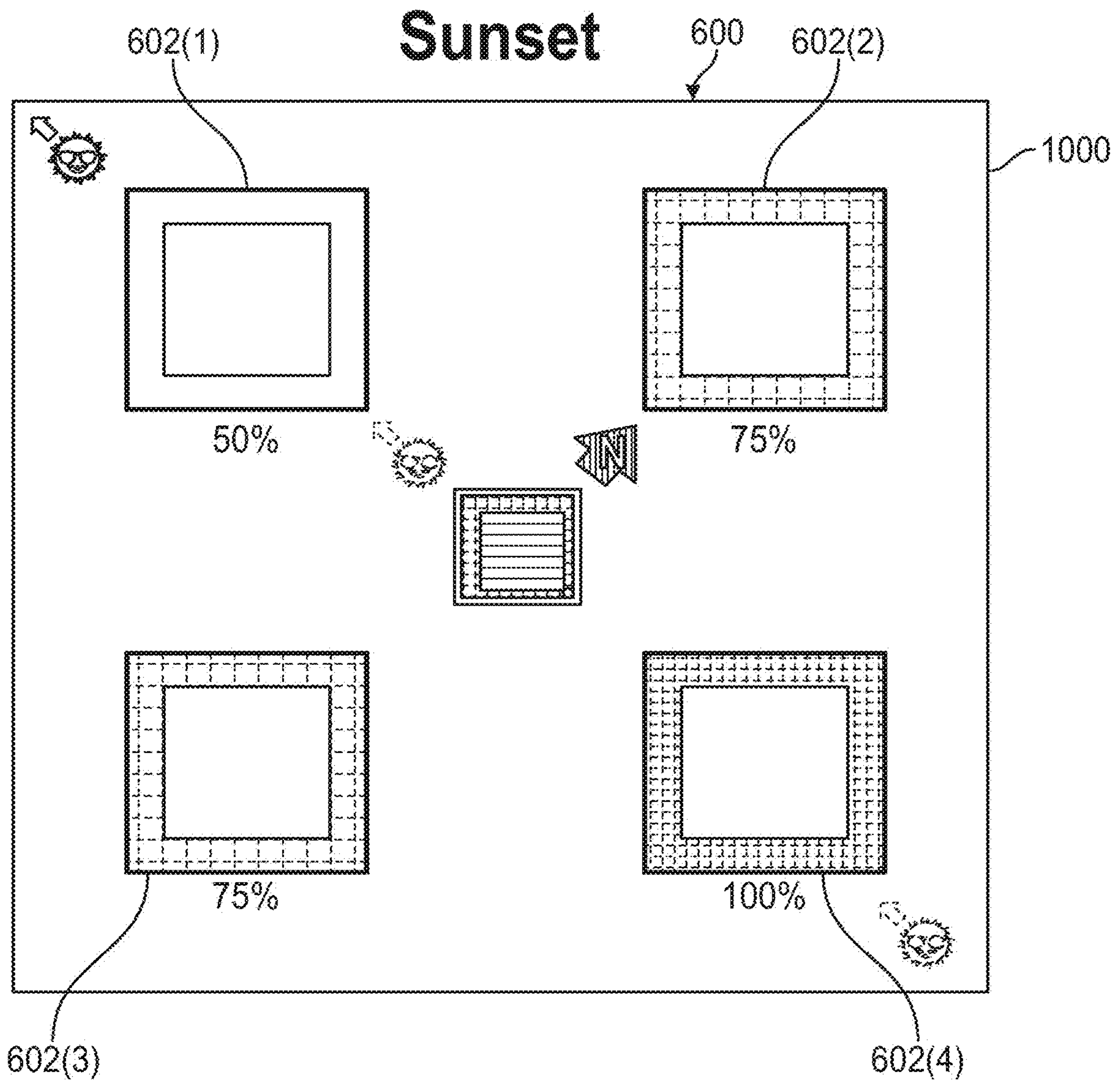
FIG. 33C is a diagram illustrating a third dynamic lighting operating state provided by the system of lighting fixtures of FIG. 33A.

FIGS. 33A-33C are diagrams illustrating dynamic lighting operating states provided by a system 600 including multiple lighting fixtures 602(1) to 602(4) each according to the light fixtures described in connection with one or more of FIGS. 30-32B. In certain embodiments, the system 600 includes control circuitry (e.g., including some or all elements depicted in FIG. 12) configured to separately adjust, for each lighting fixture 602(1) to 602(4), at least one of intensity, color temperature, and directionality of emissions of the lighting fixture 602(1) to 602(4) to cause aggregate emissions of the lighting system 6000 to dynamically change over time. In certain embodiments, the control circuitry is provided within each lighting fixture 602(1) to 602(4). In certain embodiments, the control circuitry is configured to selectively illuminate the plurality of solid-state light sources (see FIG. 32A-32B) of each lighting fixture 602(1) to 602(4) to compensate for, and adjust operation of the light sources 800, according to the position of the sun (and/or the position of the moon) throughout a 24 hour period.

Referring to FIG. 33A, the lighting system 600 in room 1000 includes four lighting fixtures 602(1)-602(4) positioned adjacent to different corners or quadrants of the room 1000, which in the illustrated embodiment coincide with the four cardinal directions (north, south, east, and west). In the morning, to simulate sunrise, the first lighting fixture 602(1) emits light at 100% relative brightness, the second lighting fixture 602(2) and the third lighting fixture 602(3) emit light at 75% relative brightness, and the fourth lighting fixture 602(4) emits light at 50% relative brightness. Accordingly, such a configuration increases the brightness at the west side of the room 1000 when the sun is positioned on the east side of the room 1000 during sunrise.

Referring to FIG. 33B, to simulate midday when the sun is directly overhead, the lighting fixtures 602(1)-602(4) all emit light at 100% relative brightness.

Referring to FIG. 33C, in the evening, to simulate sunset, the first lighting fixture 602(1) emits light at 50% relative brightness, the second lighting fixture 602(2) and the third lighting fixture 602(3) emit light at 75% relative brightness, and the fourth lighting fixture 602(4) emits light at 100% relative brightness. Accordingly, such a configuration increases the brightness at the east side of the room 1000 when the sun is positioned on the west side of the room 1000 during sunset.

Similarly, in certain embodiments, control circuitry may be configured to selectively illuminate the plurality of solid-state light sources (as shown in FIG. 32A-32B) such that a perceived direction of external illumination of one or more lighting fixtures 602(1) to 602(4) moves from east to west over time. Accordingly, as the sun passes throughout the day, the color of the light, the panels/fixture illuminated, and the intensity of light are controlled. In such a configuration, the lighting system 600 works together to increase relative brightness at the east side of the room 1000 (and/or decrease relative brightness at the west side of the room 1000) in the morning consistent with a natural sunrise condition. Further, the lighting system works together to increase the brightness at the west side of the room 1000 (and/or decrease relative brightness at the east side of the room 1000) in the evening consistent with a natural sunset condition.

In certain embodiments, as illustrated, each lighting fixture 602(1) to 602(4) provides uniform illumination over an entire lower area thereof. In certain embodiments, each lighting fixture 602(1) to 602(4) can provide non-uniform illumination, such that, for example, one side of a lighting fixture 602(1) to 602(4) delivers a different brightness than an opposing side of the lighting fixture 602(1) to 602(4).

FIGS. 34A-34F are views of further embodiments of the lighting fixtures embodying features similar to the lighting fixtures 602, 602' described in connection with FIGS. 30-32B.

Figure 34A:
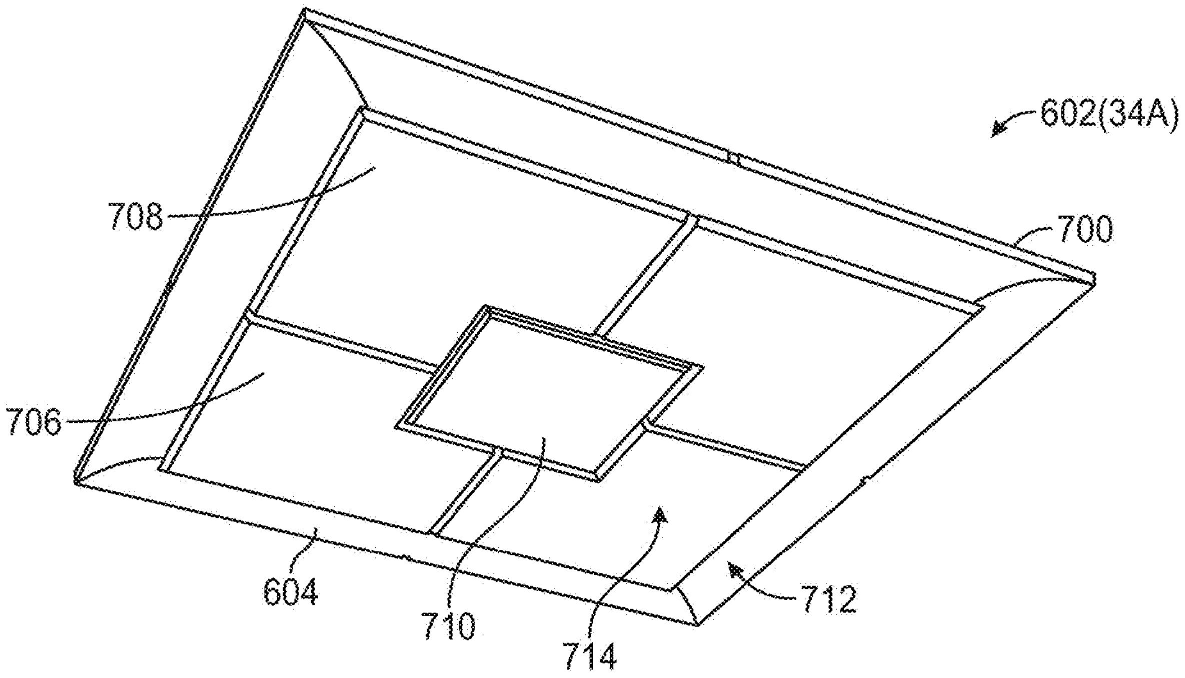
FIG. 34A is a perspective view of another embodiment of a lighting fixture according to FIGS. 30-32B having a center non-reflector region flush with a surrounding non-reflector region.

FIG. 34A is a perspective view of a lighting fixture 602(34A) according to one embodiment having a square shape, in which a central non-reflector region 710 is arranged substantially flush with a surrounding a non-reflector region 714 that includes a lower shell 706 that may be divided into multiple panels 708. In certain embodiments, acoustic insulation is arranged within at least a portion of the non-reflector region 714. The central non-reflector region 710, and the surrounding non-reflector region 714, may be provided in a variety of shapes and sizes. A peripheral reflector region 710 having at least one peripheral reflector 604 is arranged around a perimeter of the lighting fixture 602(34A) and surrounds the non-reflector region 714.

Figure 34B:
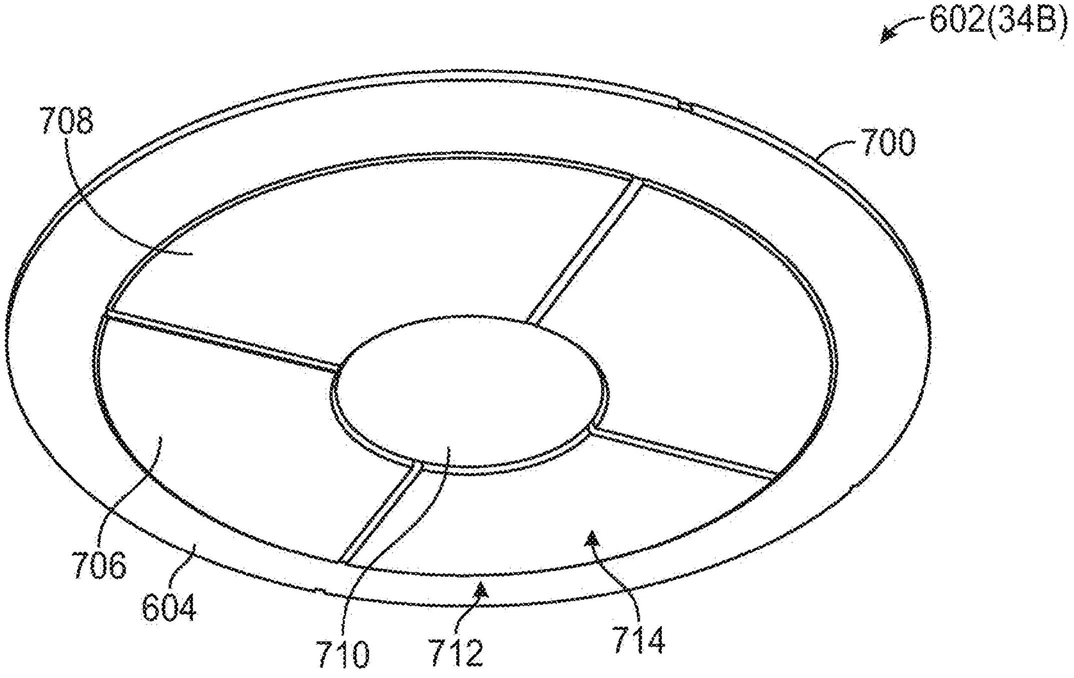
FIG. 34B is a perspective view of another embodiment of a lighting fixture according to FIGS. 30-32B having a circular shape.

FIG. 34B is a perspective view of a lighting fixture 602(34B) according to one embodiment having a circular shape. The fixture housing 700 and a central non-reflector region 710 have a circular shape, while an intermediately arranged non-reflector region 714 and a peripheral reflector region 712(having at least one peripheral reflector 604), each having an annular shape. It is to be appreciated that the lighting fixture 602(34B) could be provided in any of a variety of shapes and sizes. In certain embodiments, the peripheral reflector region 712 may enclose a shape that is generally rectangular, hexagonal, circular, or oval. In certain embodiments, the at least one peripheral reflector region 712 may enclose a shape having four or more sides. The intermediately arranged non-reflector region 714 includes a lower shell 706 that may be divided into multiple panels 708.

Figure 34C:
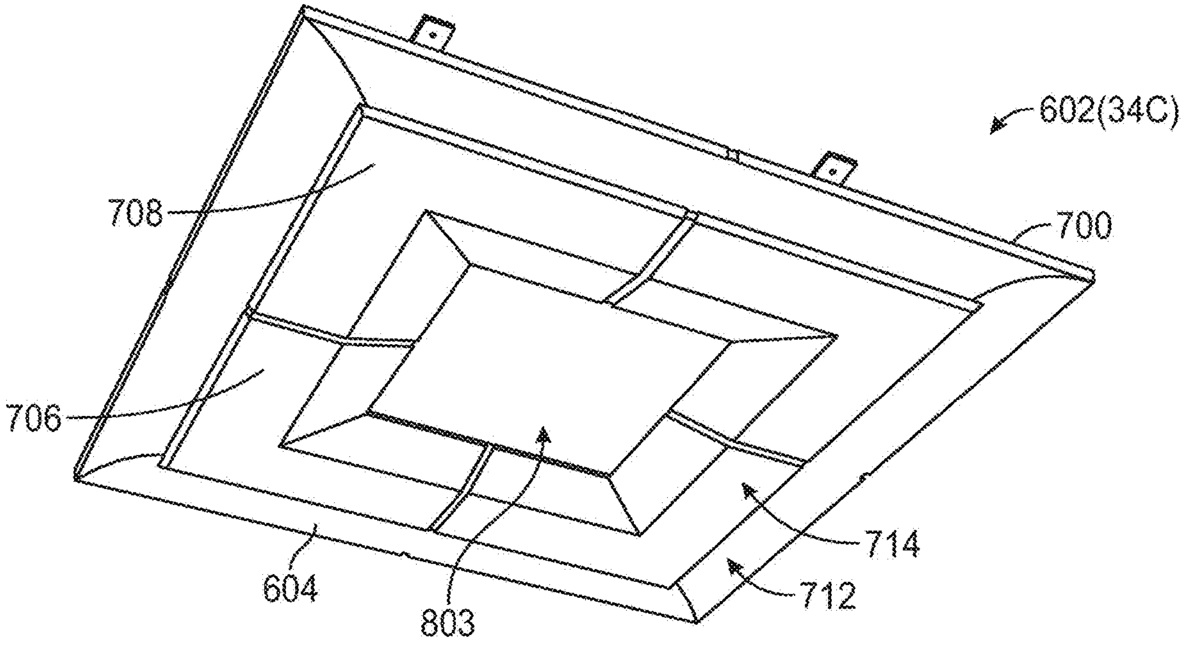
FIG. 34C is a perspective view of another embodiment of a lighting fixture according to FIGS. 30-32B having an unfilled central opening.

FIG. 34C is a perspective view of a lighting fixture 602(34C) according to another embodiment having an unfilled central opening 803. The lighting fixture 602(34C) is square in shape, and includes a peripheral reflector region 712 having at least one peripheral reflector 604. The peripheral reflector region 712 laterally surrounds a non-reflector region 714 (including a lower shell 706 that may be divided into multiple panels 708) that laterally surrounds the central opening 803. The unfilled central opening 803 may be decorative and/or functional. For example, the unfilled central opening 803 may accommodate a functional feature associated with a room (e.g., an air register or return air vent) to blend with the room.

Figure 34D:
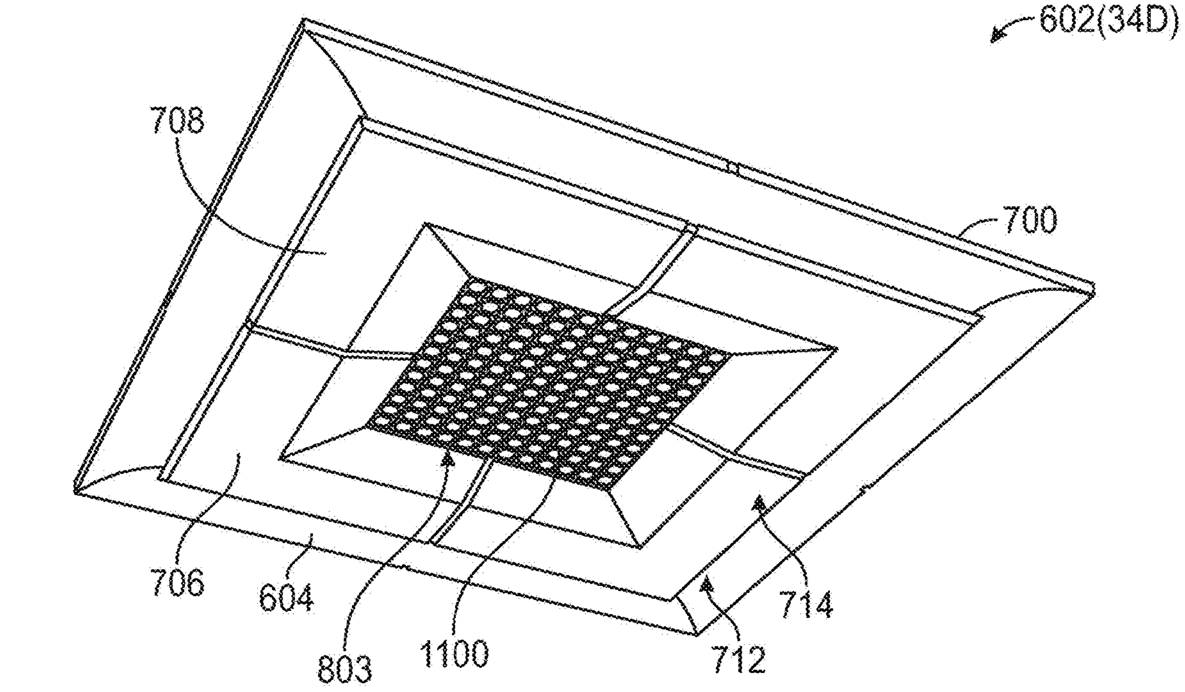
FIG. 34D is a perspective view of another embodiment of a lighting fixture according to FIGS. 30-32B having an air vent within the central opening.
Figure 34E:
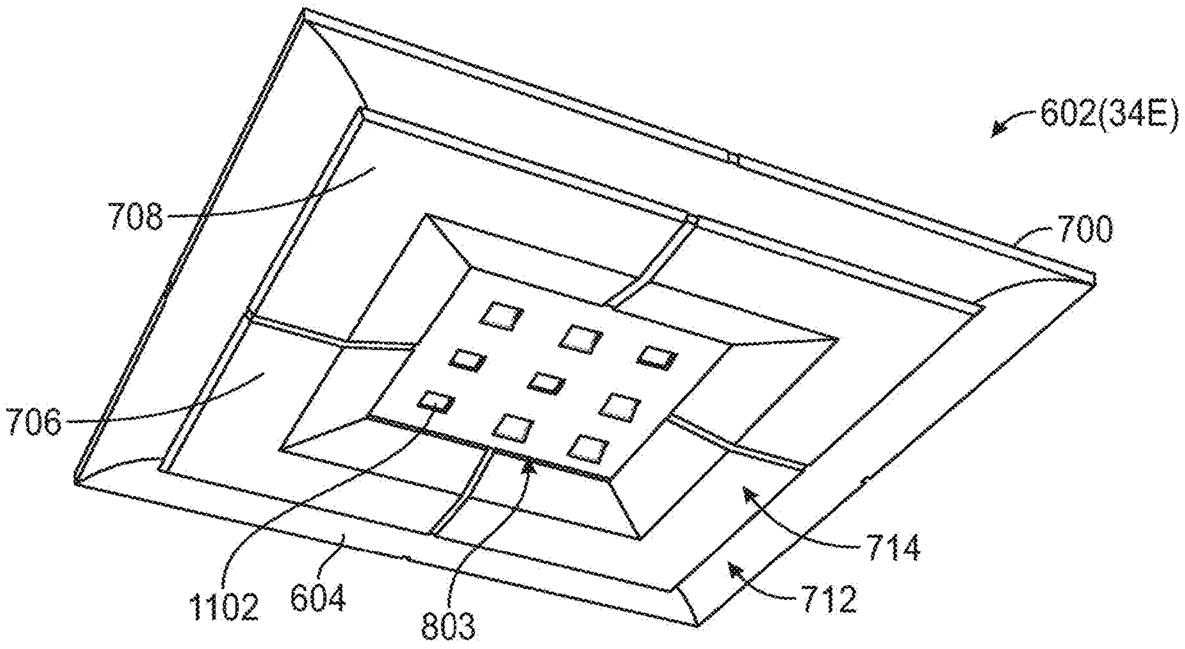
FIG. 34E is a perspective view of another embodiment of a lighting fixture according to FIGS. 30-32B having plurality of sensors within the central opening.
Figure 34F:
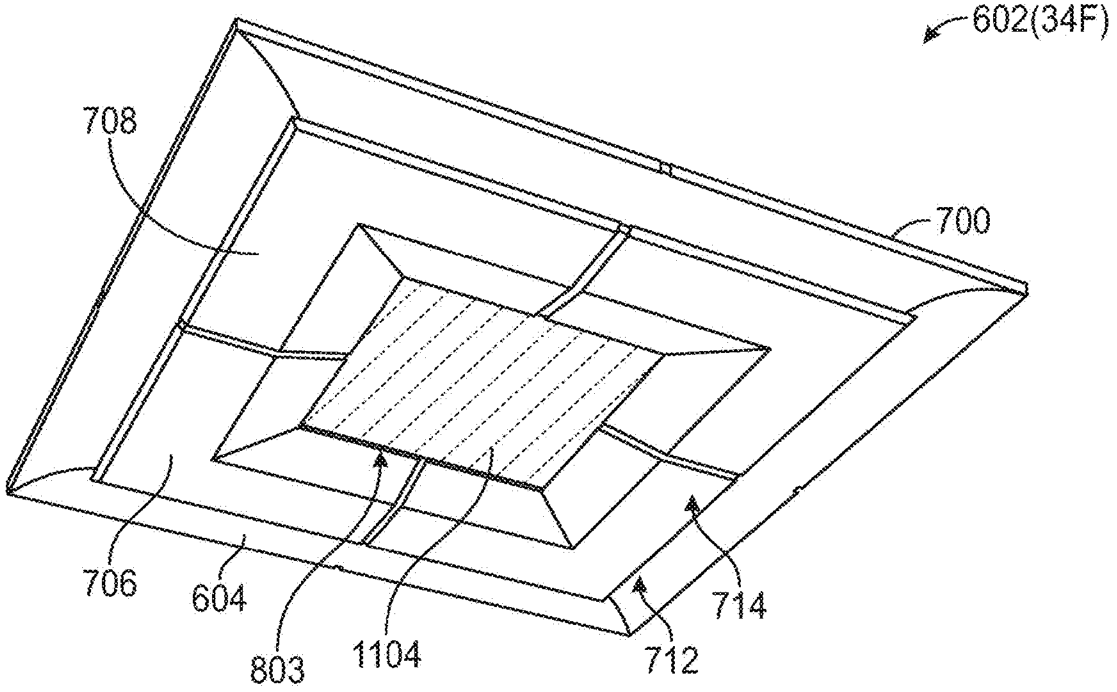
FIG. 34F is a perspective view of another embodiment of a lighting fixture according to FIGS. 30-32B having a light-transmissive panel (i.e., a skylight panel) within the central opening.

Referring to FIGS. 34D-34F, in certain embodiments, a non-reflector region 714 bounds a central opening 803 configured to be at least partially filled by at least one functional feature. In certain embodiments, the at least one functional feature includes at least one of a ceiling tile, an air duct opening, a downlight, a skylight, a light-transmissive panel resembling a skylight (which may also be referred to as a skylight fixture or skylight subassembly), a smoke detector, or a sensor. In each of FIGS. 34D-34F, the respective lighting fixtures 602(34D)-602(34F) each include a peripheral reflector region 712(having at least one peripheral reflector 604) that laterally surrounds a non-reflector region 714 (including a lower shell 706 that may be divided into multiple panels 708) that itself laterally surrounds the central opening 803, FIG. 34D is a perspective view of a lighting fixture 602(34D) according to one embodiment having an air vent 1100 within the central opening 803. FIG. 34E is a perspective view of a lighting fixture 602(34E) according to one embodiment having plurality of sensors 1102 within the central opening 803. In certain embodiments, the plurality of sensors 1102 may include an ambient light sensor, an occupancy sensor, one or more image sensors, and/or a temperature sensor, etc.

FIG. 34F is a perspective view of a lighting fixture 602(34F) according to one embodiment having a light-transmissive panel 1104 such as a skylight panel within the central opening 803. In certain embodiments, the light-transmissive panel 1104 incorporates dynamic lighting functionality similar to that described in connection with FIGS. 33A-33C. In certain embodiments, the light-transmissive panel 1104 cooperates with a plurality of light sources within the lighting fixture 602(34F) to provide such dynamic lighting. In certain embodiments, the light-transmissive panel 1104 emulates a window portion of a traditional skylight.

In certain embodiments, the light-transmissive panel 1104 is configured to be oriented substantially parallel to a wall structure or a ceiling structure. The lighting fixture 602(34F) includes a first light source configured to illuminate the light-transmissive panel, a plurality of waveguides arranged around a perimeter of the light-transmissive panel, and a plurality of second light sources. Control circuitry is configured to separately adjust, for the first light source and the plurality of second light sources, at least one of intensity and color temperature to cause aggregate emissions of the lighting system to dynamically change over time. In certain embodiments, the control circuitry is configured to selectively adjust at least one of intensity and color temperature for the first light source and the plurality of second light sources to illuminate the light-transmissive panel and the plurality of waveguides such that the lighting fixture resembles a skylight that is externally illuminated by the sun, such that a perceived direction of external illumination of the lighting fixture moves from east to west over time.

In certain embodiments, at least a portion of a lighting fixture 602(34F) resembles a skylight and may be referred to as a skylight fixture as described previously herein.

As noted previously, peripheral reflectors 604 of lighting fixtures disclosed here may embody various shapes and configurations to provide desired beam output patterns, illumination functionality, and/or aesthetics. FIGS. 35A-35F provide side cross-sectional views of peripheral reflector assemblies 604A-604F that may be used with lighting fixtures of FIGS. 30-32B and other fixtures disclosed herein to provide indirect and/or direct lighting.

Figure 35A:
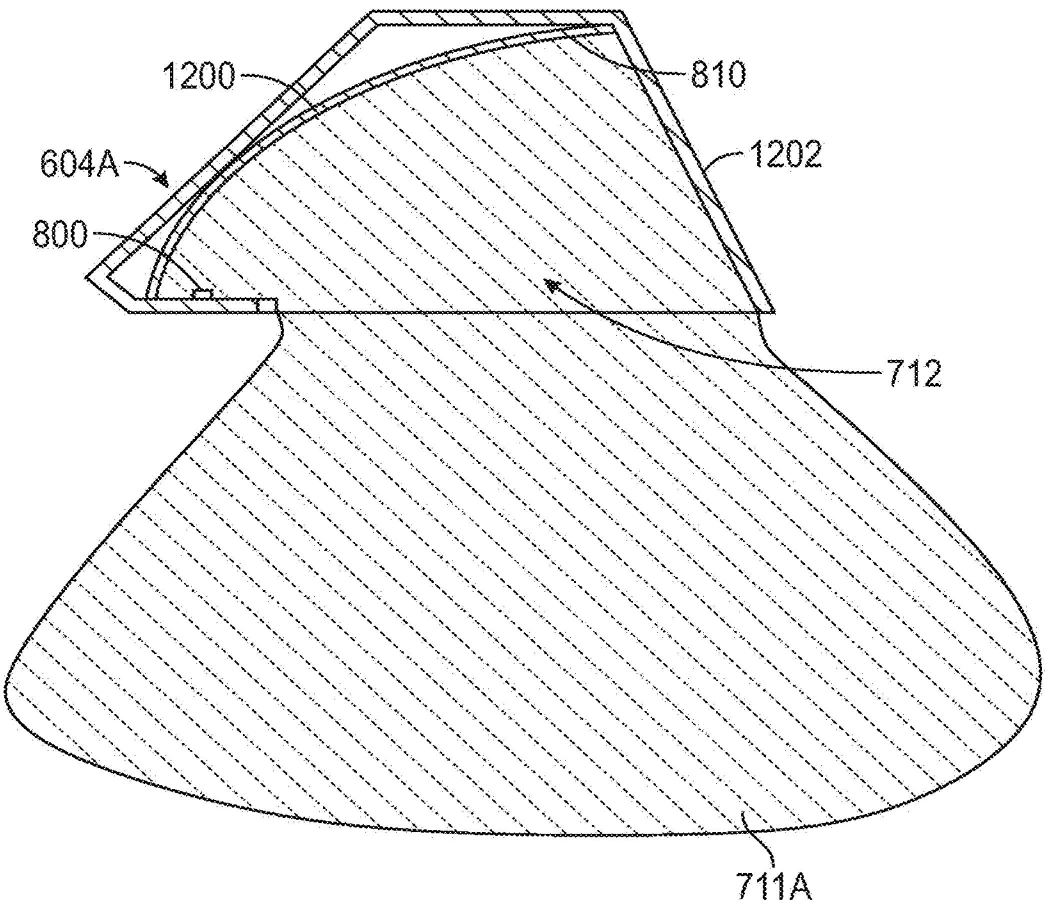
FIG. 35A is a side cross-sectional view of a peripheral reflector assembly according to one embodiment useable with a lighting fixture according to FIGS. 30-32B to provide indirect lighting, the peripheral reflector assembly including a reflecting outer wall to direct light downward.
Figure 35B:
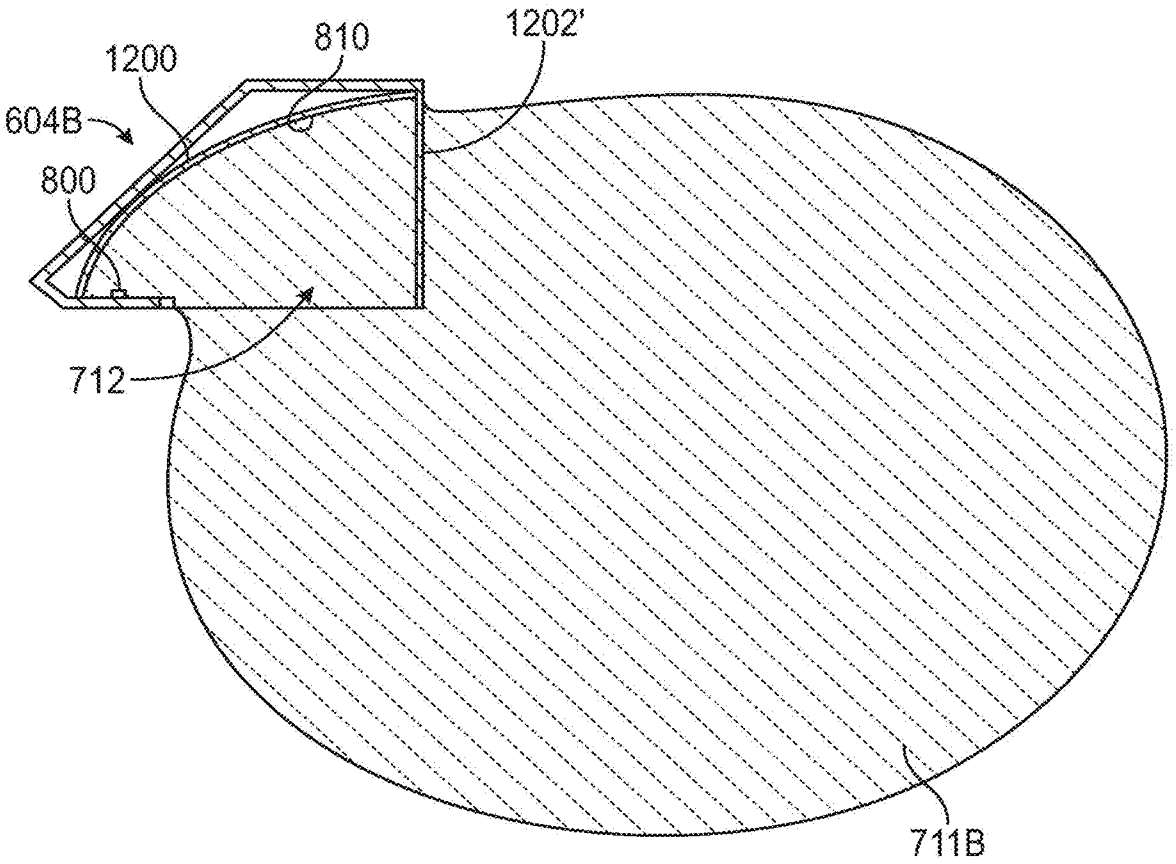
FIG. 35B is a side cross-sectional view of a peripheral reflector assembly according to one embodiment useable with a lighting fixture according to FIGS. 30-32B to provide indirect lighting, the peripheral reflector assembly including a transmissive outer wall to direct light outward.
Figure 35C:
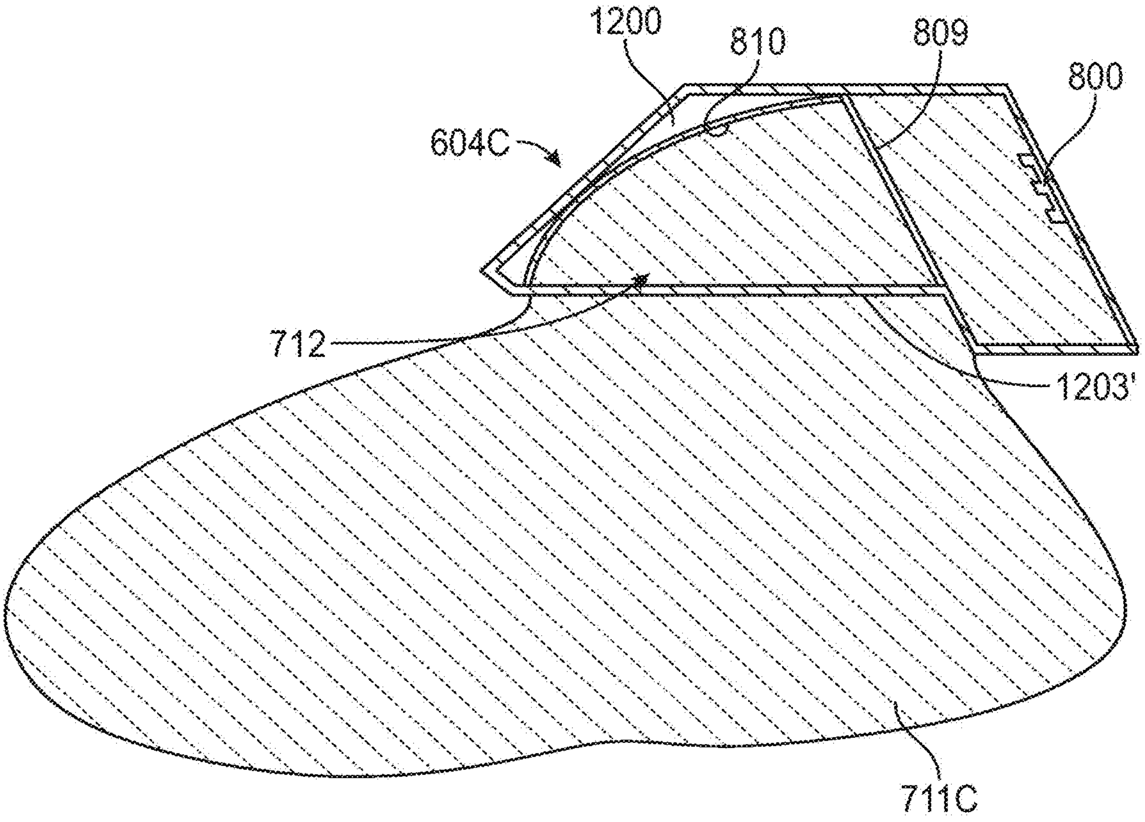
FIG. 35C is a side cross-sectional view of a peripheral reflector assembly according to one embodiment useable with a lighting fixture according to FIGS. 30-32B to provide indirect lighting, and having a light source arranged at an outer edge of the peripheral reflector.

FIG. 35A is a side cross-sectional side view of a peripheral reflector assembly 604A according to one embodiment and useable with a lighting fixture to provide indirect lighting. The peripheral reflector assembly 604A includes a reflective curved inner wall 1200 and an angled outer wall 1202(together forming a light output surface 810) to direct light downward and provide an output beam pattern 711A. A light source 800 is positioned at an inner edge of the peripheral reflector region 712(offset from an outer edge of a lighting fixture) toward a bottom of the peripheral reflector assembly 604A, and is oriented to emit light upward. FIG. 35B is a side cross-sectional side view of a peripheral reflector assembly 604B according to one embodiment and useable with a lighting fixture to provide indirect lighting. The peripheral reflector assembly 604B includes a reflective curved inner wall 1200 and a transmissive outer wall 1202' (in combination serving as a light output surface 810) to direct light outward, and to provide an output beam pattern 711B. A light source 800 is positioned at an inner edge of the peripheral reflector region 712(offset from an outer edge of a lighting fixture) toward a bottom of the peripheral reflector assembly 604B, and oriented to emit light upward. FIG. 35C is a side cross-sectional view of a peripheral reflector assembly 604C according to one embodiment and useable with a lighting fixture to provide indirect lighting. A light source 800 is positioned at an outer edge of the peripheral reflector assembly 604C. A light source 800 is positioned at an outer edge of the peripheral reflector region 712 (at an outer edge of a lighting fixture) and arranged to transmit light through a transmissive intermediate wall 809 to impinge on a reflective curved inner wall 1200 that serves as a light output surface 810 to reflect light downward through a transmissive bottom wall 1203' to reflect light downward to provide an output beam pattern 711C.

Figure 35D:
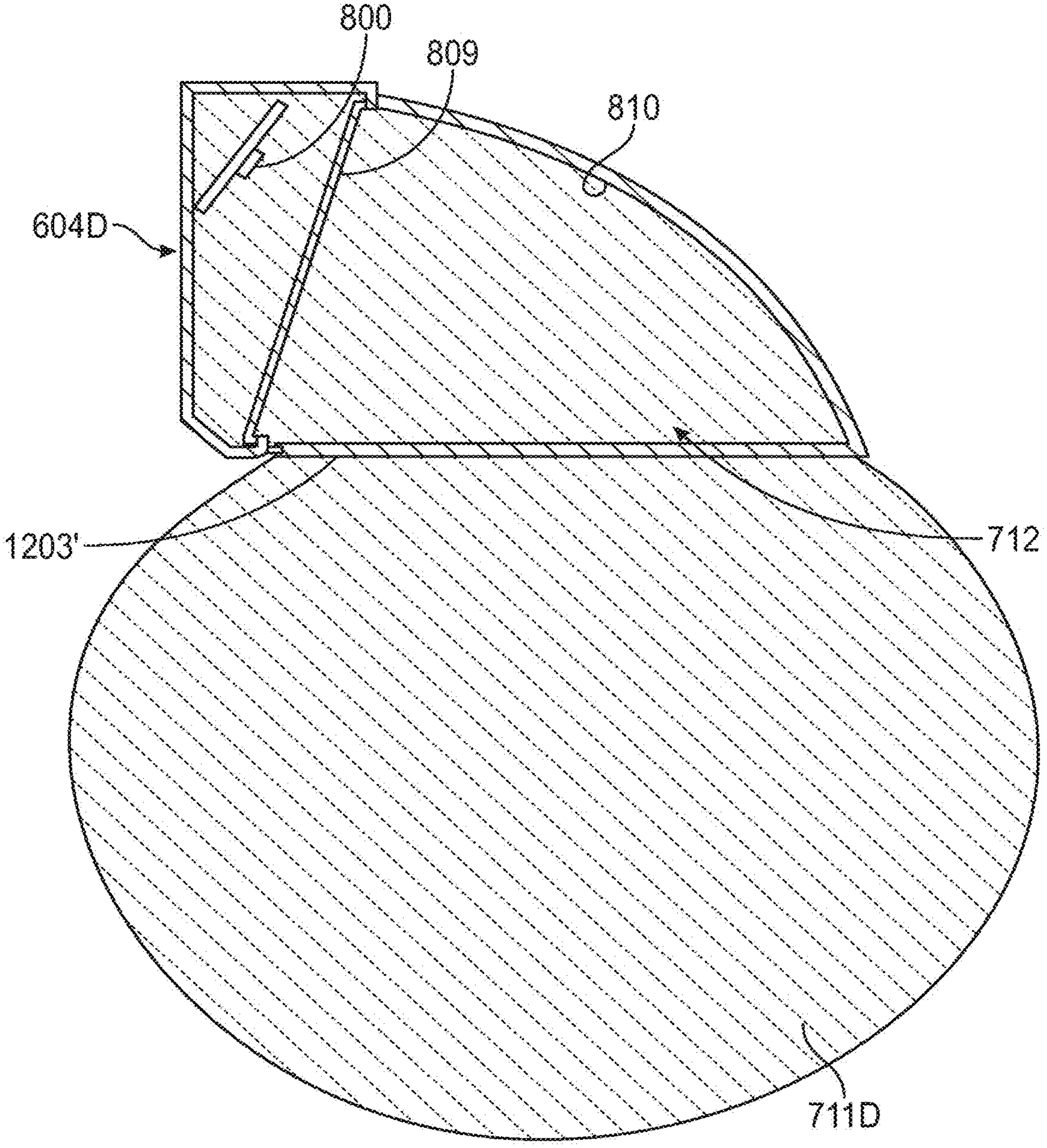
FIG. 35D is a side cross-sectional view of a peripheral reflector assembly according to one embodiment useable with a lighting fixture according to FIGS. 30-32B to provide direct lighting, the peripheral reflector assembly including a curved surface.

FIG. 35D is a side cross-sectional view of a peripheral reflector assembly 604D according to another embodiment and useable with a lighting fixture providing direct lighting.

Figure 35E:
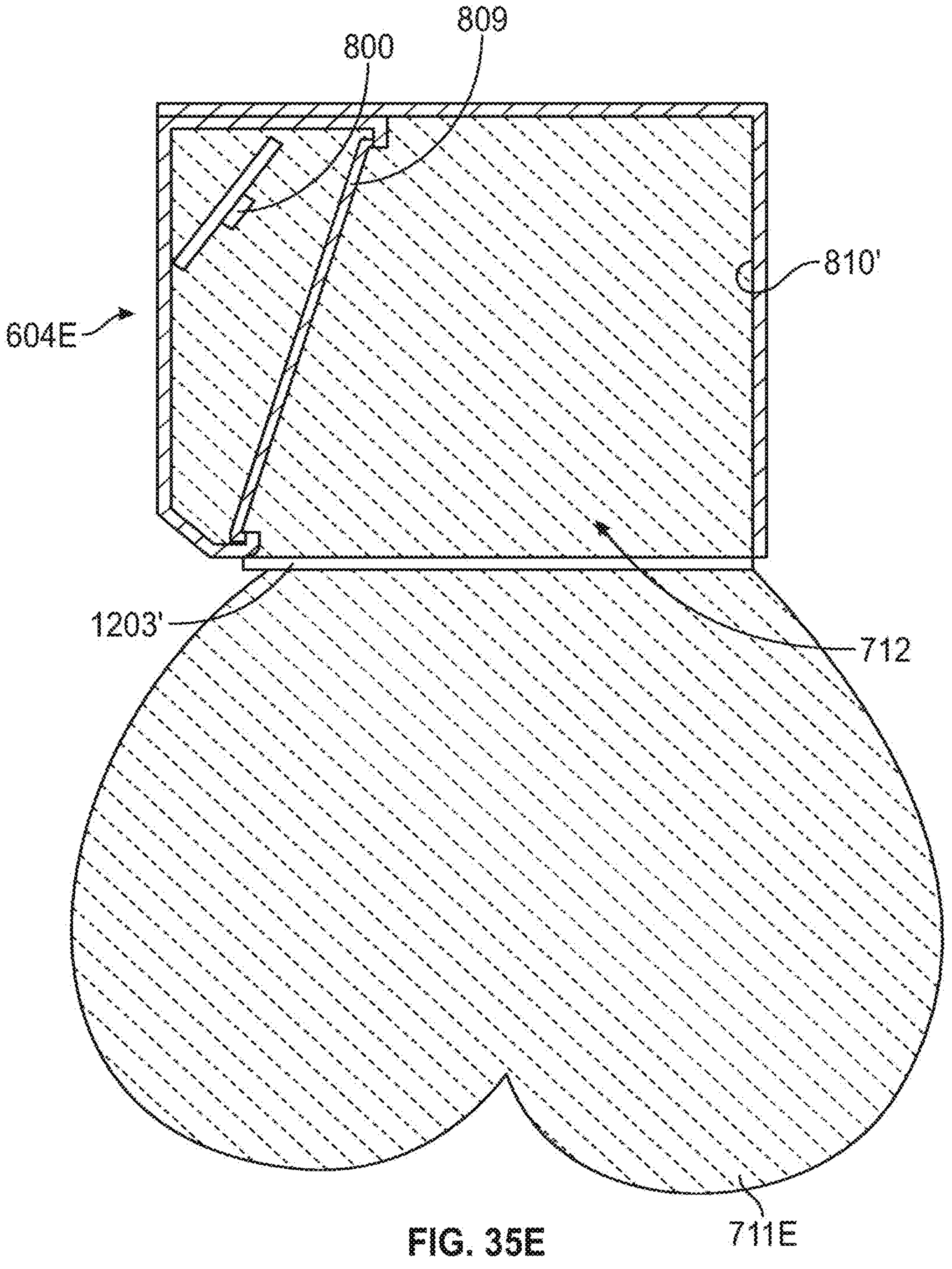
FIG. 35E is a side cross-sectional view of a peripheral reflector assembly according to one embodiment useable with a lighting fixture according to FIGS. 30-32B to provide direct lighting, the peripheral reflector assembly including an angled (non-vertical, and non-horizontal) output surface.
Figure 35F:
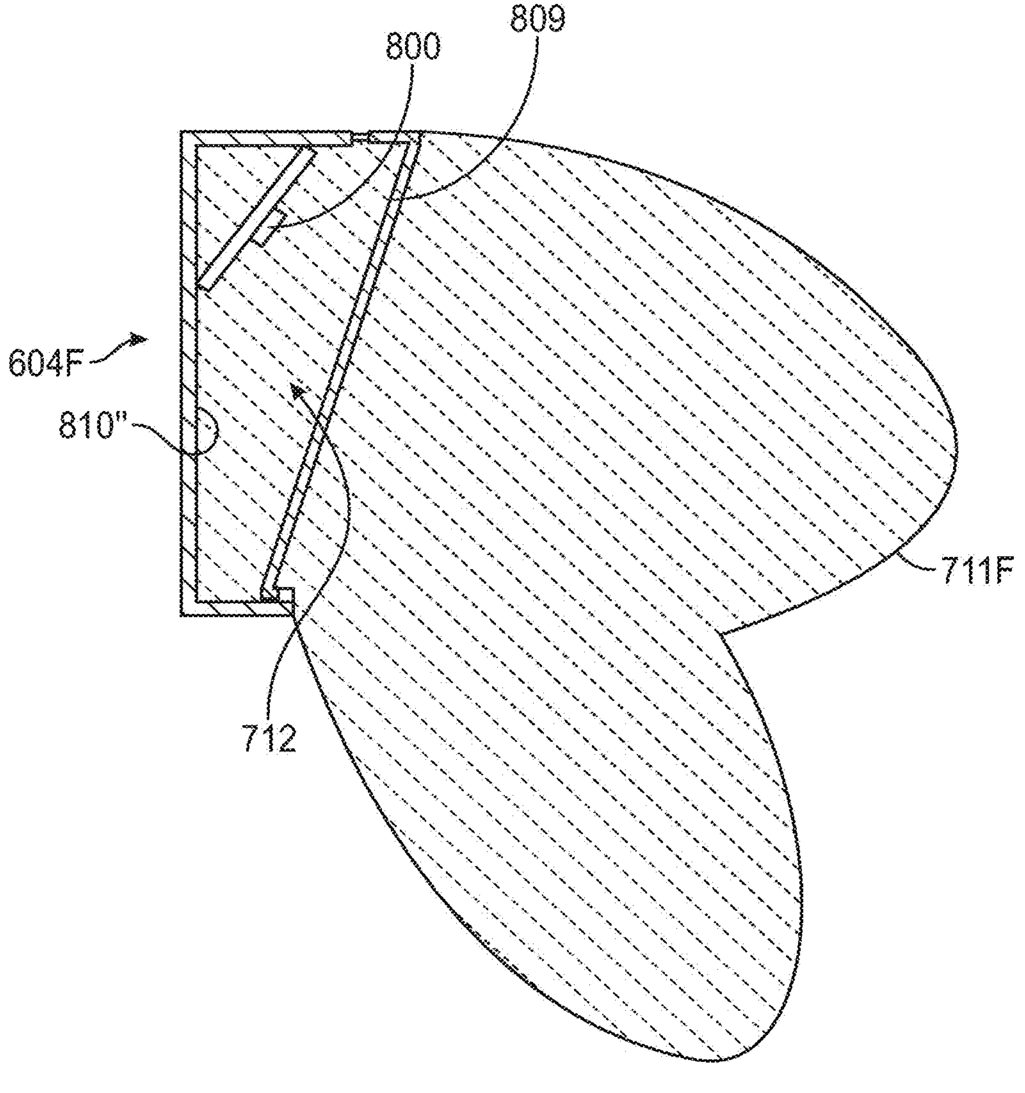
FIG. 35F is a side cross-sectional view of a peripheral reflector assembly according to one embodiment useable with a lighting fixture according to FIGS. 30-32B to provide direct lighting, the peripheral reflector assembly being compact.

The peripheral reflector assembly 604D includes a curved reflective surface 810. A light source 800 is positioned at an inner edge of a peripheral reflector region 712(offset from an outer edge of a lighting fixture) toward a top of the peripheral reflector assembly 604D, and is oriented to emit light in a generally downward direction through an angled (non-vertical, and non-horizontal) transmissive wall 809 and a transmissive horizontal wall 1203' to provide an output beam pattern 711D. FIG. 35E is a side cross-sectional view of a peripheral reflector assembly 604E according to another embodiment and useable with a lighting fixture to provide direct lighting. The peripheral reflector assembly 604E includes an angled (non-vertical, and non-horizontal) transmissive wall 809 and a horizontal transmissive wall 1203'. A light source 800 is positioned at an inner edge of the peripheral reflector region 712(offset from an outer edge of a lighting fixture) toward a top of the peripheral reflector assembly 704E, and is oriented to emit light in a generally downward and outward direction through the transmissive wall 809, to be reflected by reflective wall 810', and to pass through transmissive wall 1203' to provide an output beam pattern 711E. FIG. 35F is a side cross-sectional view of a peripheral reflector assembly 604F according to another embodiment and useable with a the lighting fixture to provide direct lighting, the peripheral reflector assembly 604F being compact and including an angled (non-vertical, and non-horizontal) transmissive wall 809 that serves as a light output surface. A light source 800 is positioned at an inner edge of the peripheral reflector region 712(offset from an outer edge of a lighting fixture), in front of a reflective surface 810" and toward a top of the peripheral reflector 604F. The light source 300 is oriented to emit light in a generally downward and outward direction through the light-transmissive wall 809 to provide an output beam pattern 711F.

FIGS. 36A-36E are perspective views of lighting fixtures according to further embodiments illustrating various schemes for mounting lighting fixtures to a ceiling structure or wall structure. In certain embodiments, the lighting fixture is configured to be at least partially recessed into a ceiling structure, flush mounted to a ceiling structure, or suspended from a ceiling structure.

Figure 36A:
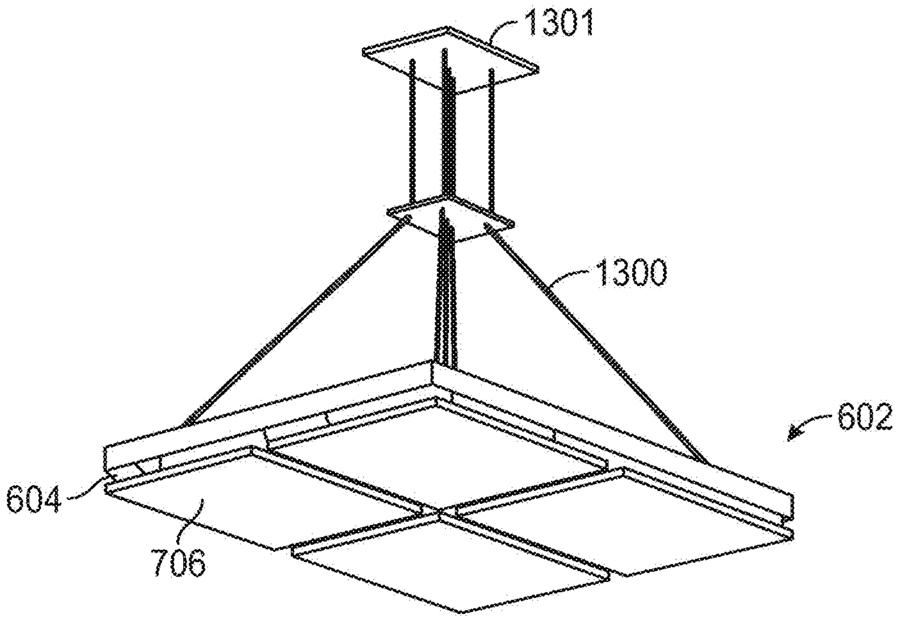
FIG. 36A is a perspective view of one embodiment of a lighting fixture according to FIGS. 30-32B, the lighting fixture being suspension mounted from a ceiling structure.
Figure 36B:
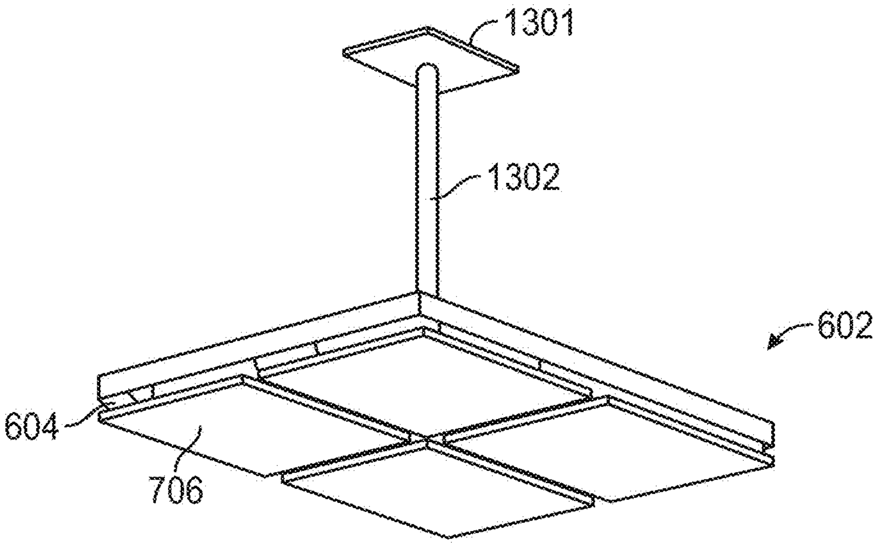
FIG. 36B is a perspective view of one embodiment of a lighting fixture according to FIGS. 30-32B, the lighting fixture being pendant mounted from a ceiling structure.
Figure 36C:
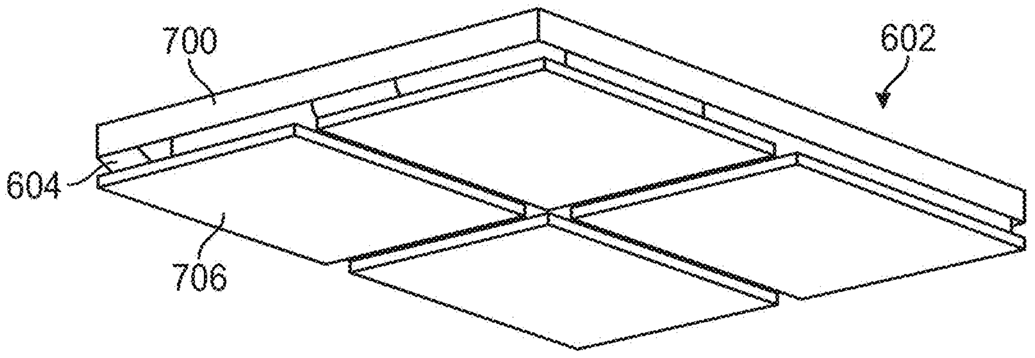
FIG. 36C is a perspective view of one embodiment of a lighting fixture according to FIGS. 30-32B, the lighting fixture being surface mounted from a ceiling structure.
Figure 36D:
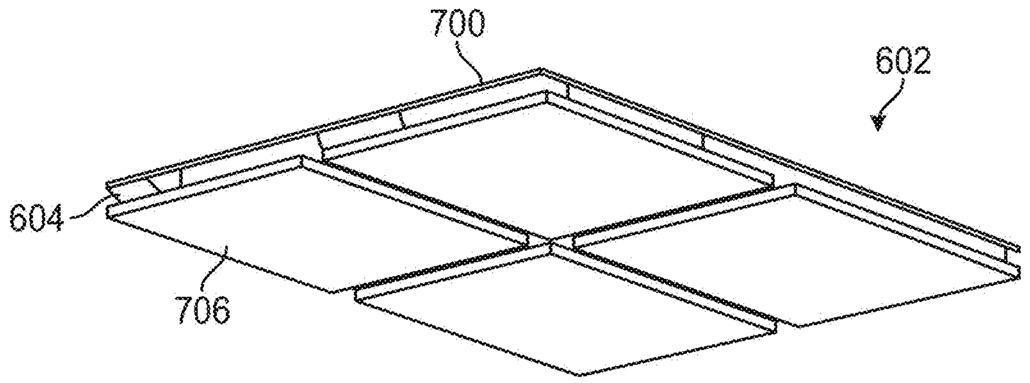
FIG. 36D is a perspective view of one embodiment of a lighting fixture according to FIGS. 30-32B, the lighting fixture being recess mounted within a ceiling structure.
Figure 36E:
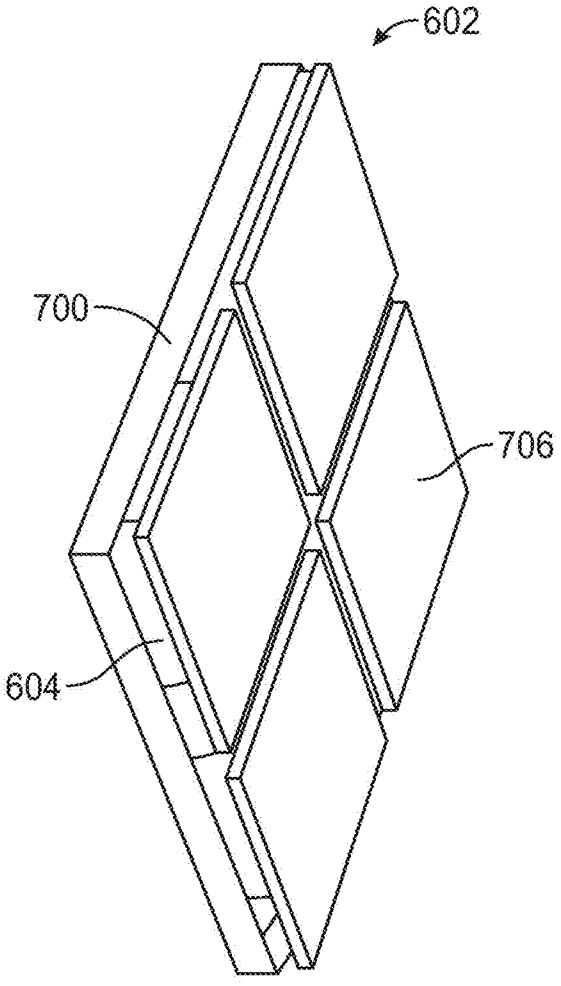
FIG. 36E is a perspective view of one embodiment of a lighting fixture according to FIGS. 30-32B, the lighting fixture being wall mounted to a wall structure.

FIG. 36A is a perspective view of a lighting fixture 602, having a peripheral reflector region 604 surrounding a lower shell 706 (serving as a non-reflector region), that is suspension mounted from a ceiling mount 1301 by suspension cables 1300. FIG. 36B is a perspective view a lighting fixture 602, having a peripheral reflector region 604 surrounding a lower shell 706 (serving as a non-reflector region), that is pendant mounted from a ceiling mount 1301 by a pendant 1302. FIG. 36C is a perspective view of a lighting fixture 602, having a peripheral reflector region 604 surrounding a lower shell 706 (serving as a non-reflector region), that is surface mounted to a ceiling structure with a fixture housing 700 configured to extend downward relative to a ceiling. FIG. 36D is a perspective view of a lighting fixture 602 configured to be mounted in a recessed manner within a ceiling structure. The lighting fixture 606 includes a peripheral reflector region 604 surrounding a lower shell 706 (serving as a non-reflector region), wherein a fixture housing (not shown) is configured to be positioned flush with or above a ceiling level FIG. 36E is a perspective view of a lighting fixture 602, having a peripheral reflector region surrounding an outer shell 706, configured to be wall mounted to a wall structure. The lighting fixture 602 includes a fixture housing 700, and includes a peripheral reflector region 604 surrounding the outer shell 706 that embodies a non-reflector region.

Figure 37A:
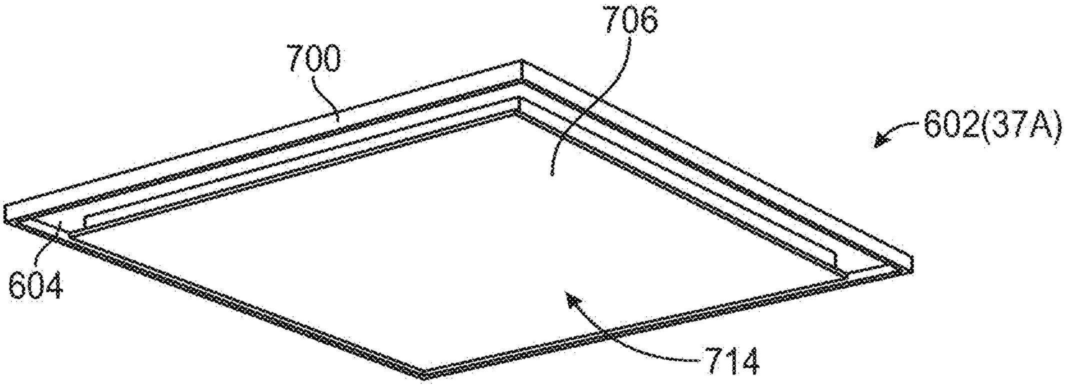
FIG. 37A is a perspective view of another embodiment of a lighting fixture according to FIGS. 30-32B with a single unitary bottom surface within the non-reflector region.

FIGS. 37A-37J are perspective views of additional lighting fixtures embodying features (e.g., peripheral emission features) similar to the lighting fixtures 602, 602' described in connection with FIGS. 30-32B. FIG. 37A is a perspective view of a lighting fixture 602(37A) according to one embodiment having a rectangular fixture housing 700 with a unitary bottom surface (e.g., bottom shell) 706 forming a central non-reflector region 714 that is laterally surrounded by a peripheral reflector region 604.

Figure 37B:
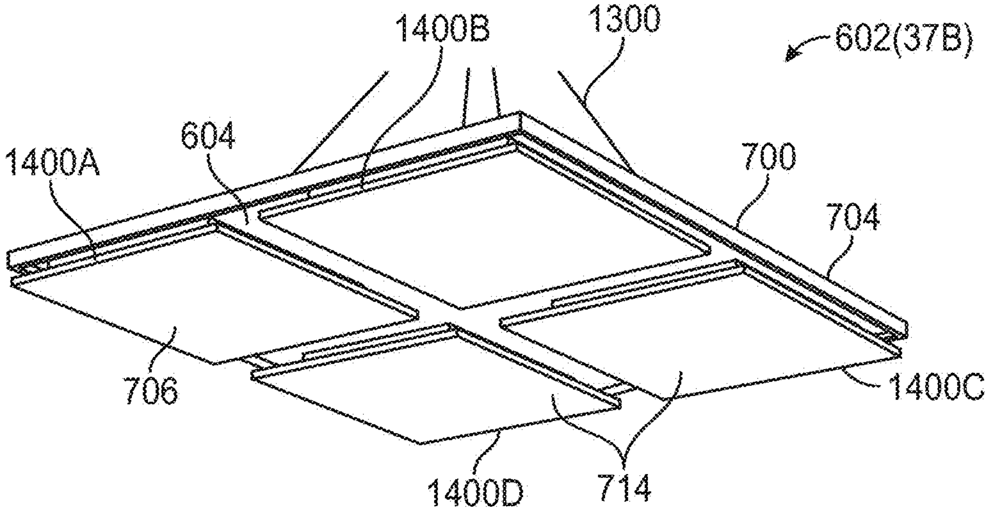
FIG. 37B is a perspective view of another embodiment of a lighting fixture according to FIGS. 30-32B having a plurality of subassemblies with a single fixture housing.

FIG. 37B is a perspective view of a lighting fixture 602(37B) having a plurality of subassemblies 1400A-1400D arranged in an array and associated with a single fixture housing 700 having an upper shell 704. Each subassembly 1400A-1400D is rectangular and has a lower shell 706 that serves as a non-reflector region 715, and that is laterally surrounded by a peripheral reflector region 604.

Each subassembly 1400A-1400D further includes a plurality of light sources (e.g., as shown in FIGS. 32A-32B) distributed around a periphery of the non-reflector region 714 and configured to illuminate the at least one peripheral reflector region 604, which is configured to reflect at least a portion of emissions of the plurality of light sources in a downward direction. For at least one subassembly 1400A-1400D, at least a portion of the at least one peripheral reflector region 604 overlaps with at least a portion of a peripheral reflector region 604 of another subassembly 1400A-1400D. The lighting fixture 602(37B) is arranged to be suspension mounted from a ceiling mount (not shown) by suspension cables 1300.

Figure 37C:
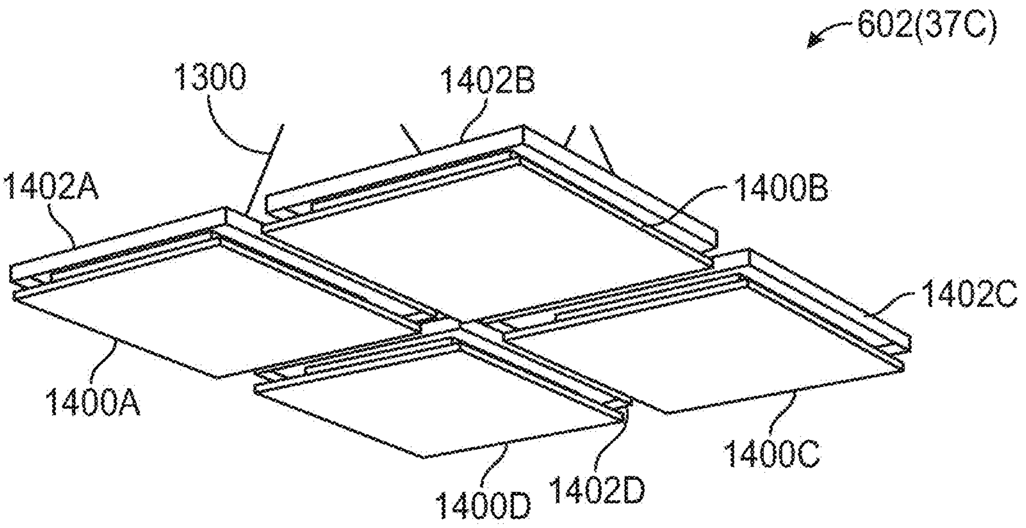
FIG. 37C is a perspective view of another embodiment of a lighting fixture according to FIGS. 30-32B having a plurality of subassemblies with a plurality of subassembly housings.

FIG. 37C is a perspective view of a lighting fixture 602(37C) having a plurality of rectangular subassemblies 1400A-1400D each having a respective subassembly housing 1402A-1402D, and a peripheral reflector region. Each subassembly 1400A-1400D is arranged to be suspension mounted from a ceiling mount (not shown) by suspension cables 1300.

Figure 37D:
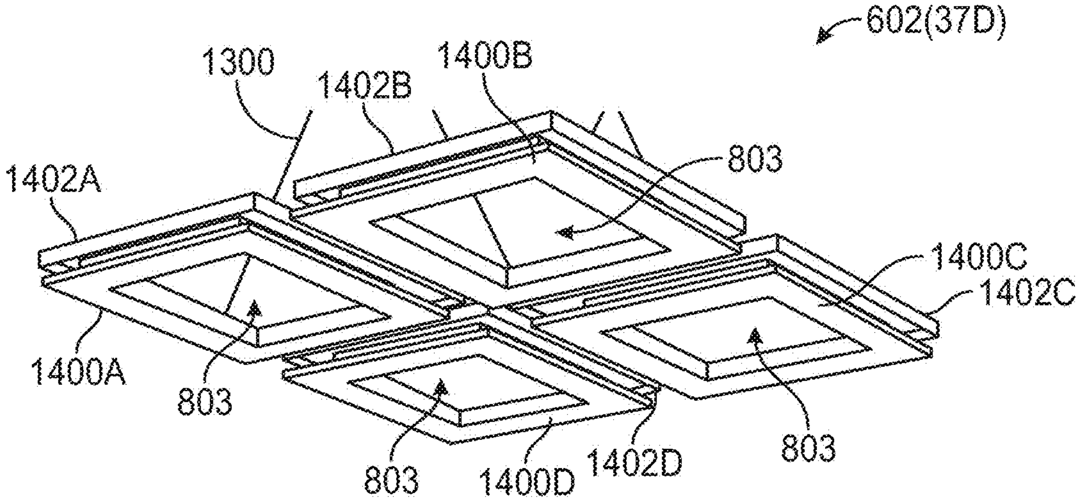
FIG. 37D is a perspective view of another embodiment of a lighting fixture according to FIGS. 30-32B having a plurality of subassemblies with a plurality of subassembly housings, each subassembly having a central opening.

FIG. 37D is a perspective view of a lighting fixture 602(37D) having a plurality of subassemblies 1400A-1400D and that is substantially identical to the lighting fixture 602(37C) of FIG. 37C, except that each subassembly defines a central opening 803 extending vertically through the subassembly 1400A-1400D. The description of the remaining features of the lighting fixture 602(37C) of FIG. 37C are hereby incorporated by reference with respect to FIG. 37D.

Figure 37E:
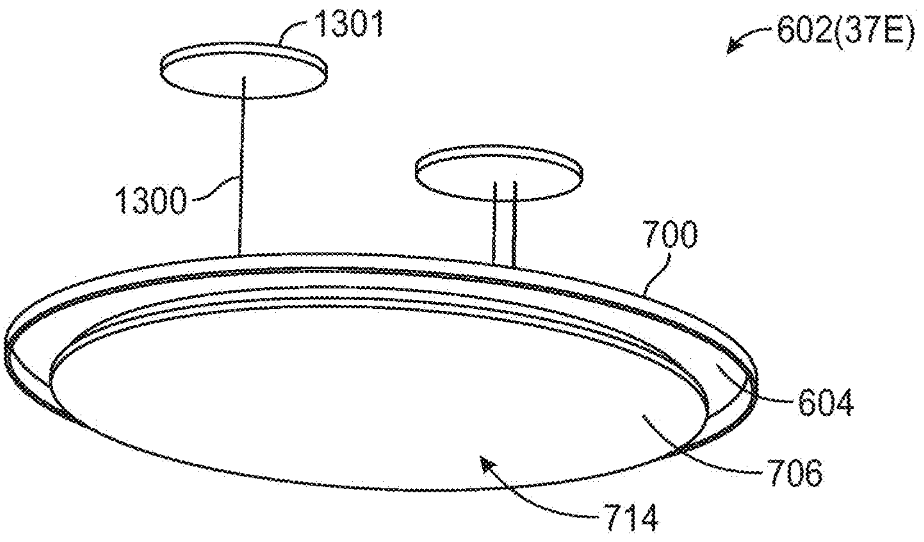
FIG. 37E is a perspective view of another embodiment of a lighting fixture according to FIGS. 30-32B, the lighting fixture being circular with a single unitary bottom surface within the non-reflector region.
Figure 37F:
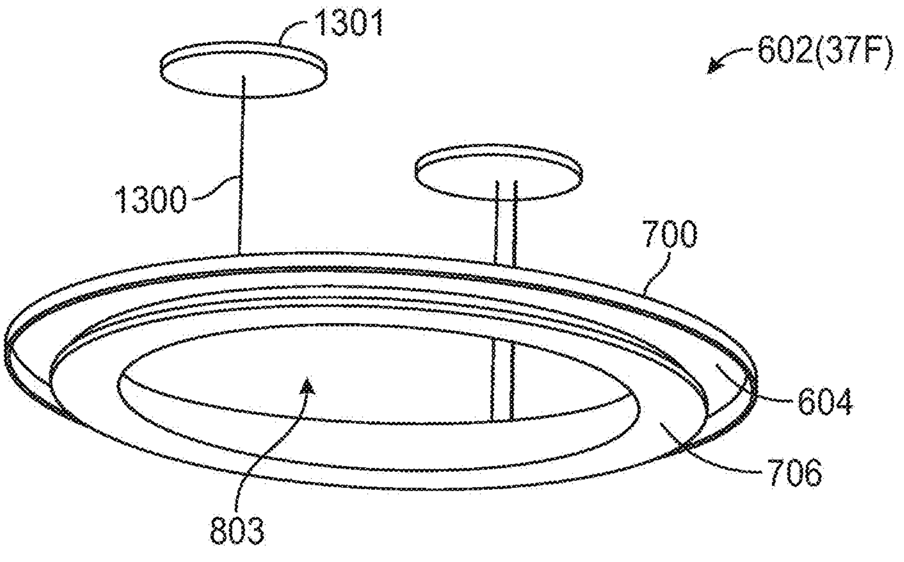
FIG. 37F is a perspective view of another embodiment of a lighting fixture according to FIGS. 30-32B, the lighting fixture being circular and defining a central opening.
Figure 37G:
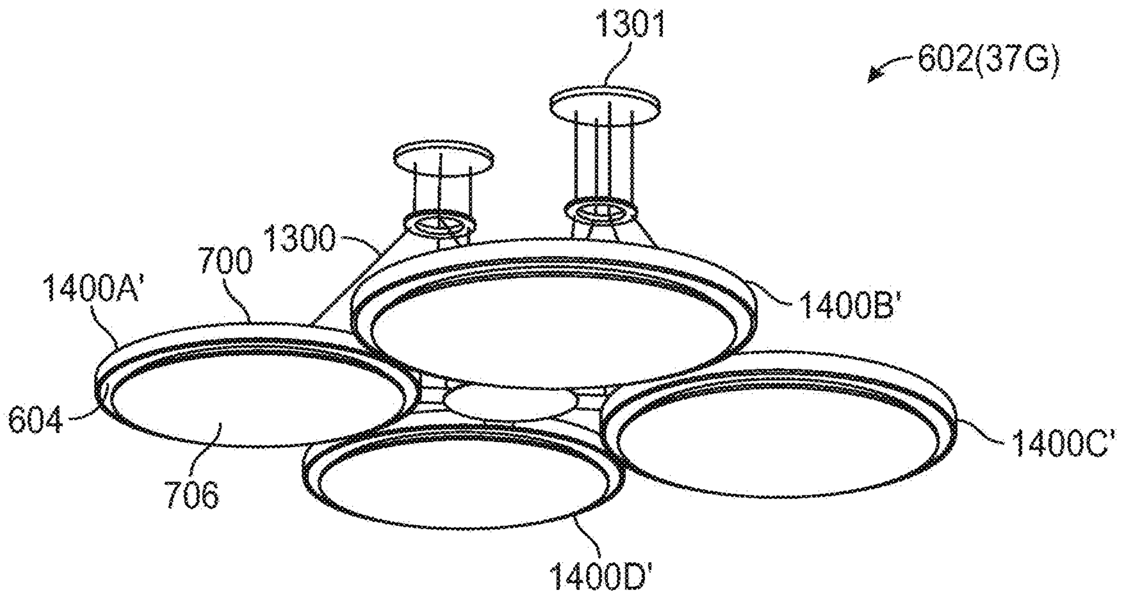
FIG. 37G is a perspective view of another embodiment of a lighting fixture according to FIGS. 30-32B, the lighting fixture being having a cluster of circular subassemblies.

Lighting fixtures as disclosed herein can be provided in any of a variety of shapes and sizes. FIGS. 37E-37G depict lighting fixtures each incorporating a circular shape. FIG. 37E is a perspective view a lighting fixture 602(37E) having a fixture housing 700 and a non-reflector region 714 (embodying a unitary lower shell 706) that are circular in shape. The non-reflector region 714 is surrounded by a peripheral reflector region 604 that is annular in shape. The lighting fixture 602(37E) is arranged to be mounted from one or more ceiling mounts 1301 by cables 1300. FIG. 37F is a perspective view of a similar lighting fixture 602(37F) that is circular in shape but that defines a circular central opening 803 through a lower shell 806 that is annular in shape, and that is surrounded by an annular peripheral reflector region 604 disposed below an annular fixture housing 700. The lighting fixture 602(37F) is arranged to be mounted from one or more ceiling mounts 1301 by cables 1300.

FIG. 37G is a perspective view of a lighting fixture 602(37G) has according to one embodiment having a cluster of circular subassemblies 1400A-1400D each having a circular fixture housing 700 and having a circular lower shell

706 serving as a non-reflector region that is laterally surrounded by a peripheral reflector region 604. The lighting fixture 602(37G) is arranged to be suspension mounted from one or more ceiling mounts 1301 by suspension cables 1300.

Figure 37H:
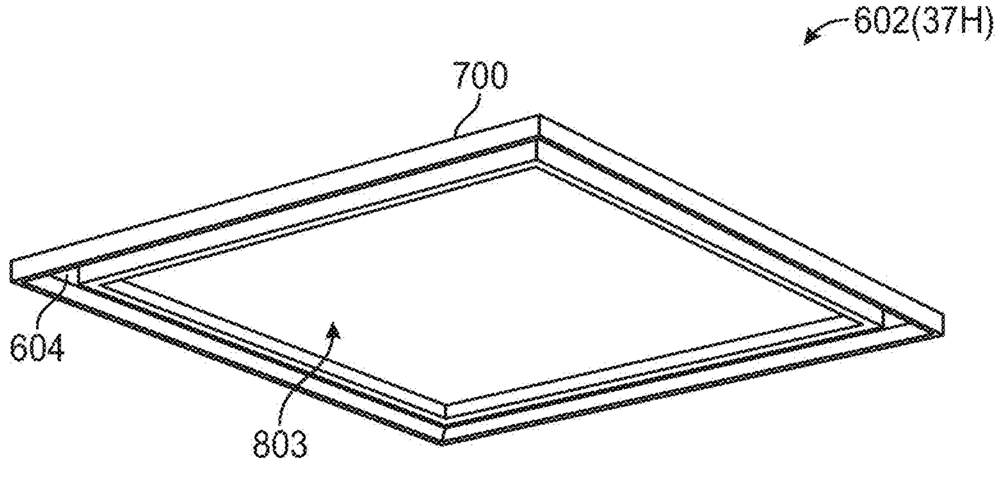
FIG. 37H is a perspective view of another embodiment of a lighting fixture according to FIGS. 30-32B, the lighting fixture defining a central opening and directing light downward.
Figure 37I:
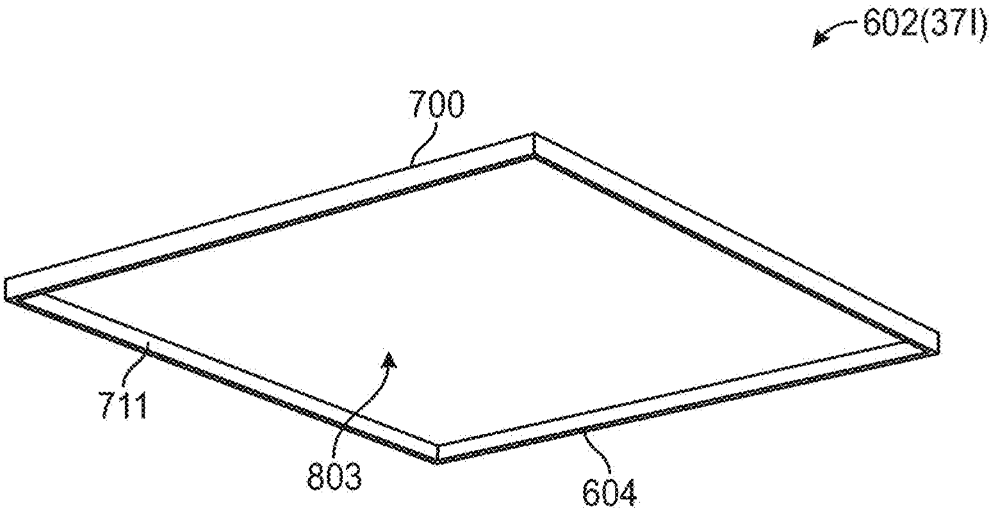
FIG. 37I is a perspective view of another embodiment of a lighting fixture according to FIGS. 30-32B, the lighting fixture defining a central opening and directing light downward and inward.
Figure 37J:
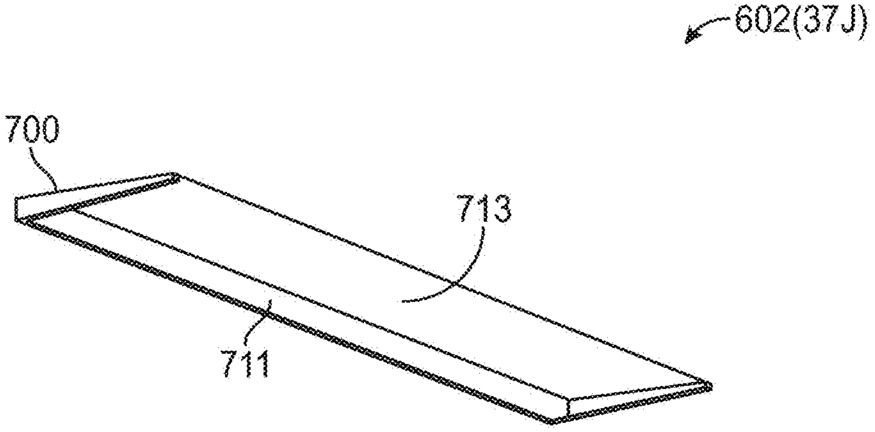
FIG. 37J is a perspective view of another embodiment of a lighting fixture according to FIGS. 30-31B, the lighting fixture including a sloped panel.

FIG. 37H is a perspective view of a lighting fixture 602(37H) according to one embodiment having a rectangular housing 700 supporting a peripheral reflector region 604 and defining a central opening 803, with the fixture 602 (37H) being configured to direct light downward. Viewed from below, the housing 700 is of a shape resembling two nested rectangular picture frames of slightly different sizes. FIG. 37I is a perspective view of a lighting fixture 602(37I) according to one embodiment having a rectangular housing 700 supporting a peripheral reflector region 604 and having inwardly directed light transmissive walls 711 bounding a central opening 803. The lighting fixture 602(37I) is configured to direct light downward and inward. FIG. 37J is a perspective view a lighting fixture 602(37J) according to one embodiment including a fixture housing 700, a light-transmissive wall 711, and a sloped panel 713, being configured to transmit light in downward and outward directions.

In certain embodiments, one or more peripheral emission features of a lighting fixture may include or embody waveguides. Such waveguides may be arranged to emit light in downward, sideward, and/or upward directions. A lighting fixture incorporating waveguides as peripheral emission features may include any other features illustrated and/or described herein.

Figure 38:
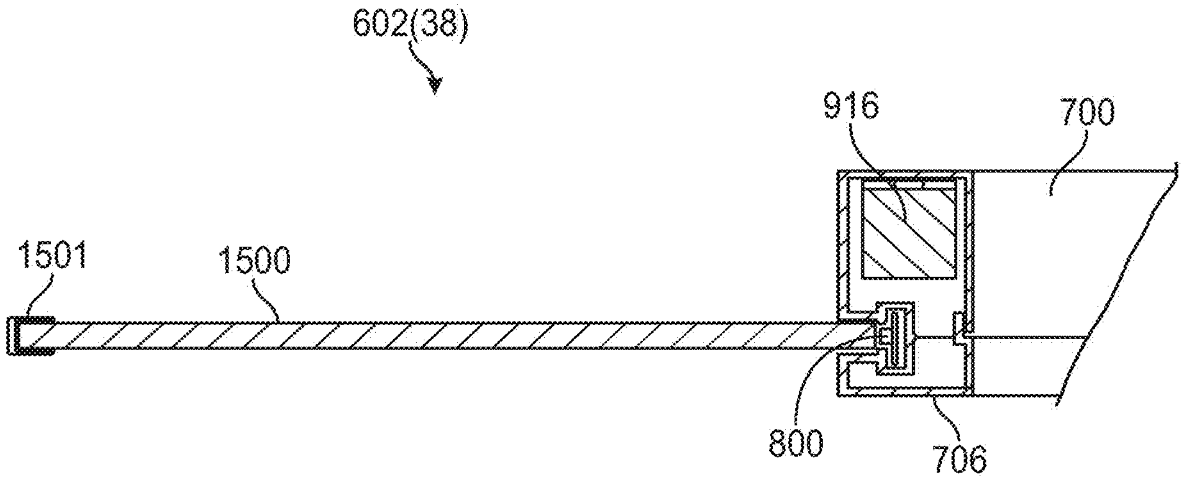
FIG. 38 is a cross-sectional side view of a peripheral emission feature embodied as a waveguide.

FIG. 38 is a side cross-sectional view of a portion of a lighting fixture 602(38) including a peripheral emission feature embodied in a waveguide 1500. The lighting fixture portion 602(38) includes a fixture housing 700, a driver 916 positioned within the fixture housing 700, light sources 800 (e.g., LEDs) positioned within the fixture housing 700, and an optical waveguide 1500 (which may also be referred to as an edge lit lens) protruding from a periphery of the fixture housing 700, with a distal end of the optical waveguide 1500 optionally having a bezel or end cap 1501 that may include a reflective inner surface. The driver 916 controls operation of the light source 800, which is arranged to emit light into the optical waveguide 1500. The optical waveguide 1500 may include one or more light extraction features to cause light to be emitted from the lighting fixture portion 602(38).

The lighting fixture portion 602(38) of FIG. 38 and components thereof (including waveguide 1500) may be incorporated into waveguide-containing lighting fixtures of various types and configurations. Exemplary embodiments including a waveguide 1500 and associated components incorporated into lighting fixtures are shown in FIGS. 39A-39F FIG. 39A is a perspective view of a lighting fixture 602(39A) incorporating a waveguide 1500 according to FIG. 38. The lighting fixture 602(39A) is suspension mounted to two ceiling mounts 1301 using suspension cables 1300; however, any suitable mounting type may be used.

The lighting fixture 602(39A) includes at least one peripheral waveguide 1500 defining at least one peripheral waveguide region 1502 that laterally bounds a non-waveguide region 1504, wherein the at least one peripheral waveguide region 1502 is arranged around substantially an entire perimeter of the lighting fixture 602(39A). The lighting fixture 602(39A) further includes a fixture housing 1305 containing a plurality of light sources (as shown in FIGS. 32A-32B) configured to illuminate the waveguide 1500. In certain embodiments, the lighting fixture 602(39A) includes a bezel or cap 1505 at an outermost peripheral edge of the waveguide 1500.

The at least one peripheral waveguide region 1502 may include the same or different configurations, orientations, and features as those discussed above regarding the peripheral reflector region. For example, in certain embodiments, the at least one peripheral waveguide region 1502 is arranged around at least 95% of the entire perimeter of the lighting fixture 602(39A) (e.g., around the entire perimeter of the lighting fixture). In certain embodiments, the at least one peripheral waveguide region 1502 includes less than 50% of a total projected bottom area of the lighting fixture 602(39A) (e.g., less than 20% of a total projected bottom area of the lighting fixture 602(39A)).

In certain embodiments, at least one peripheral waveguide region 1502 may enclose a shape that is generally rectangular, hexagonal, circular, or oval. In certain embodiments, at least one peripheral waveguide region 1502 may encloses a shape having four or more sides.

In certain embodiments, the non-waveguide region 1504 laterally bounds an unfilled opening 1506 configured to be at least partially filled by at least one functional feature (e.g., a ceiling tile, an air duct opening, a downlight, a skylight, a light-transmissive panel resembling a skylight, a smoke detector, or a sensor). In certain embodiments, the lighting fixture 602(39A) further includes acoustic insulation arranged within at least a portion of the non-waveguide region 1504.

In certain embodiments, the lighting fixture 602(39A) may be configured to be at least partially recessed into a ceiling structure, flush mounted to a ceiling structure, or suspended from a ceiling structure. In certain embodiments, light sources of a plurality of light sources are distributed around an inner edge of the at least one peripheral waveguide region 1502. In certain embodiments, light sources may be inset relative to an outer edge of the at least one peripheral waveguide region 1502.

In certain embodiments, a lighting system includes a plurality of the lighting fixtures 602(39A) arranged to illuminate a space. In certain embodiments, lighting fixtures 602(39A) of the plurality of lighting fixtures 602(39A) are arranged in a one-dimensional array. In certain embodiments, lighting fixtures 602(39A) of the plurality of lighting fixtures 602(39A) are arranged in a two-dimensional array.

Figure 39A:
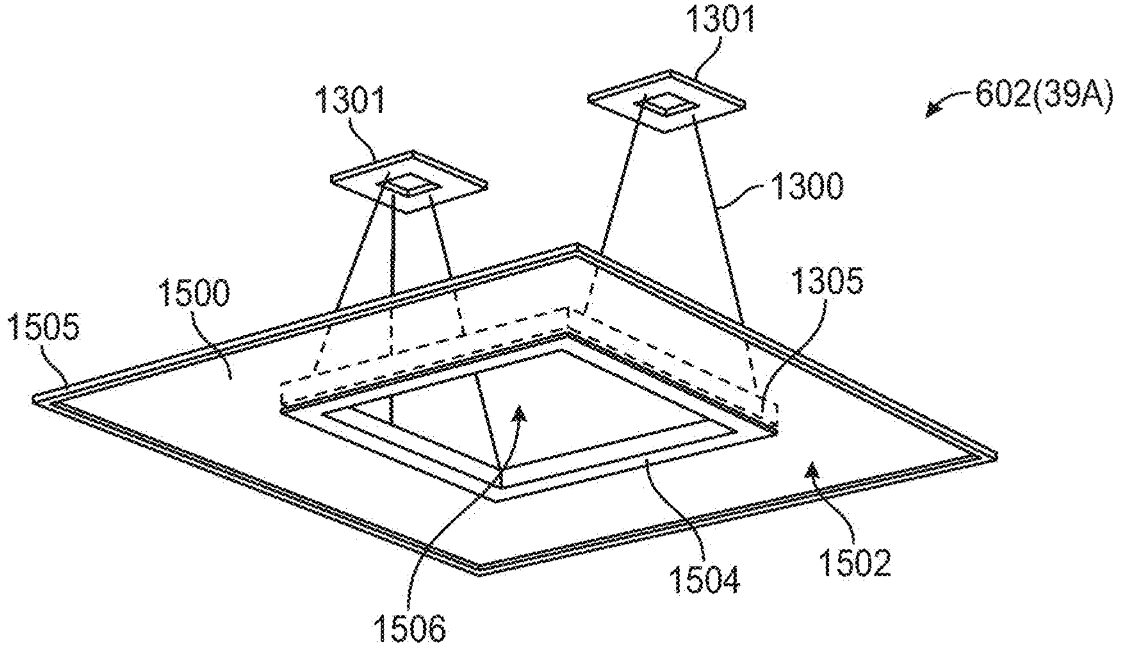
FIG. 39A is a perspective view of a lighting fixture using the waveguide of FIG. 38, the lighting fixture suspension mounted to a ceiling structure using two suspension mounts.
Figure 39B:
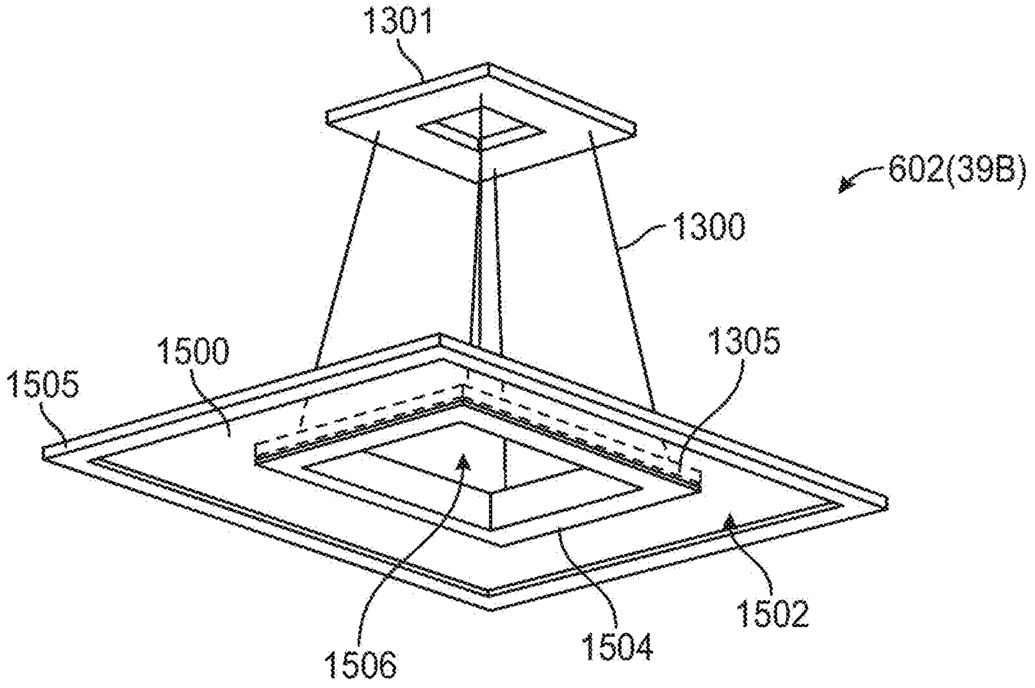
FIG. 39B is a perspective view of another embodiment of a lighting fixture using the waveguide of FIG. 38, the lighting fixture suspension mounted to a ceiling structure using a single suspension mount.

FIG. 39B is a perspective view of a lighting fixture 602(39B) incorporating a waveguide 1500 according to FIG. 38. The lighting fixture 602(39B) is suspension mounted to a single ceiling mount 1301 using suspension cables 1300. The remaining features of the lighting fixture 602(39B) are identical to those described in connection with the lighting fixture 602(39A) of FIG. 39A.

Figure 39C:
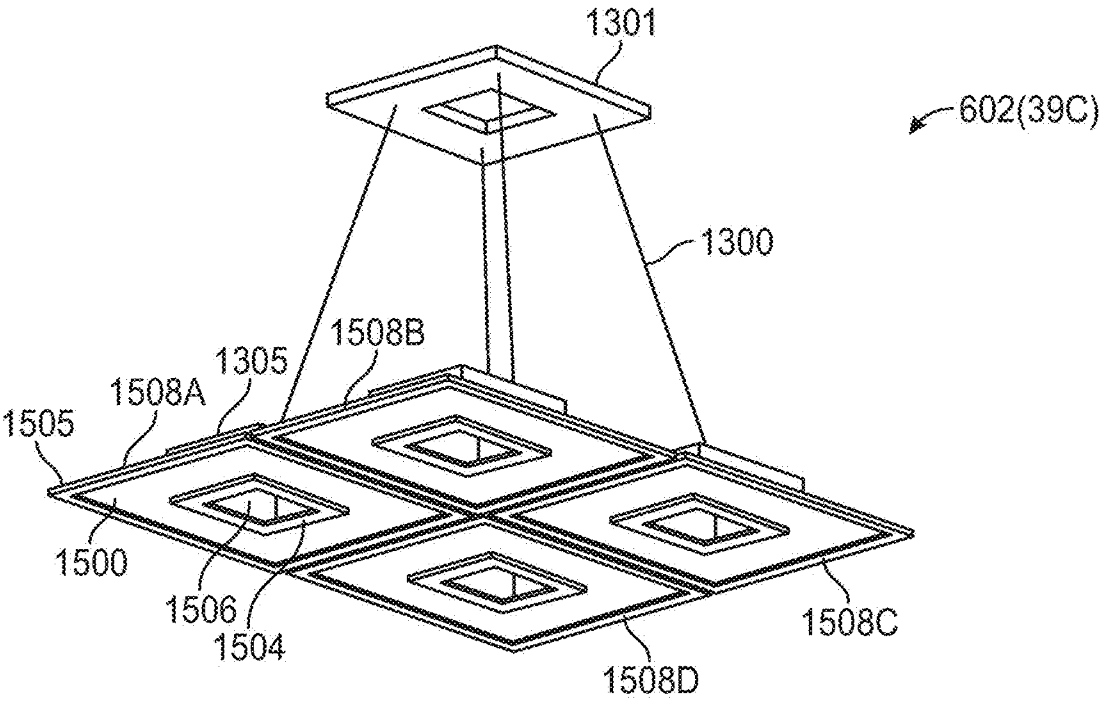
FIG. 39C is a perspective view of another embodiment of a lighting fixture using the waveguide of FIG. 38, the lighting fixture including a plurality of subassemblies in a grid array.

FIG. 39C is a perspective view of a lighting fixture 602(39C) incorporating waveguides 1500 (each according to FIG. 38) that are included in multiple subassemblies 1508A-1508D arranged in a two-dimensional array or grid. Each subassembly 1508A-1508D includes a non-waveguide region 1504 that laterally bounds an unfilled opening 1506, with the non-waveguide region being laterally surrounded by a waveguide 1500. Each waveguide 1500 may be illuminated with light sources contained in a subassembly housing 1305, and may be bounded along peripheral edges thereof with a bezel or cap 1505. The lighting fixture 602(39C) is suspension mounted to a single ceiling mount 1301 using suspension cables 1300.

In certain embodiments, a lighting system includes a plurality of the lighting fixtures 602(39C) arranged to illuminate a space. In certain embodiments, each lighting fixture 602(39C) of the plurality of lighting fixtures 602(39C) abuts at least one other lighting fixture 602(49C) of the plurality of lighting fixtures 602(39C). In certain embodiments, the array is a one-dimensional array. In certain embodiments, the array is a two-dimensional array.

Figure 39D:
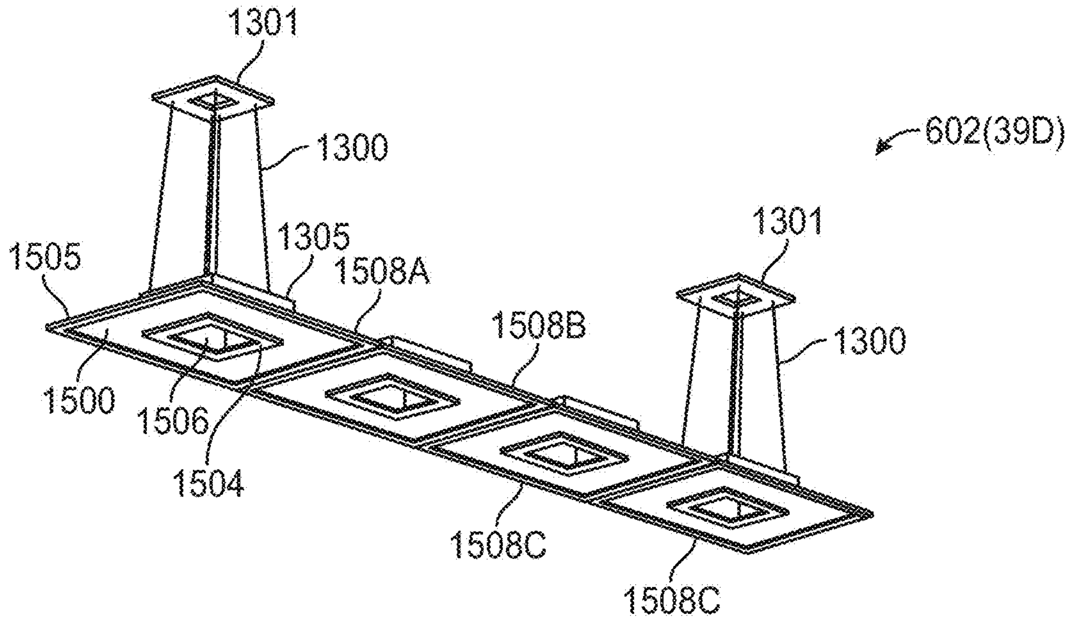
FIG. 39D is a perspective view of another embodiment of a lighting fixture using a waveguide according to FIG. 38, the lighting fixture including a plurality of subassemblies in a linear array.

FIG. 39D is a perspective view of a lighting fixture 602(39D) according to another embodiment including waveguides 1500 (each according to FIG. 38) incorporated into respective subassemblies 1508A-1508D that are arranged in a one-dimensional (linear) array. Each subassembly 1508A-1508D includes a non-waveguide region 1504 that laterally bounds an unfilled opening 1506, with the non-waveguide region being laterally surrounded by a waveguide 1500. Each waveguide 1500 may be illuminated with light sources contained in a subassembly housing 1305, and may be bounded along peripheral edges thereof with a bezel or cap 1505. The lighting fixture 602(39C) is suspension mounted to a single ceiling mount 1301 using suspension cables 1300.

Figure 39E:
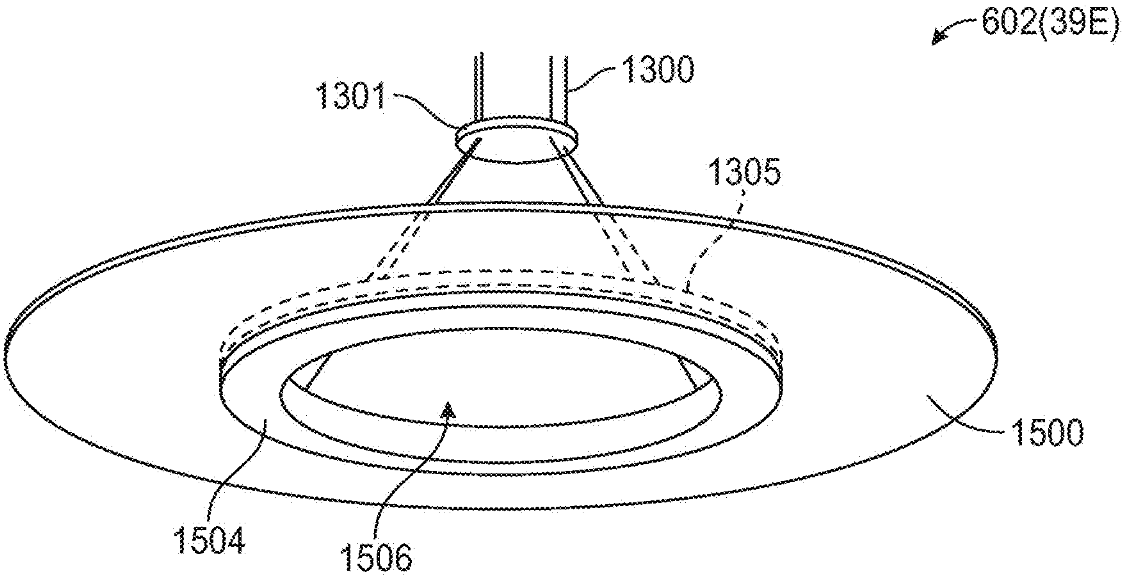
FIG. 39E is a perspective view of another embodiment of a lighting fixture using a waveguide according to FIG. 38, the lighting fixture being configured for suspension mounting to a ceiling structure and having a circular shape.
Figure 39F:
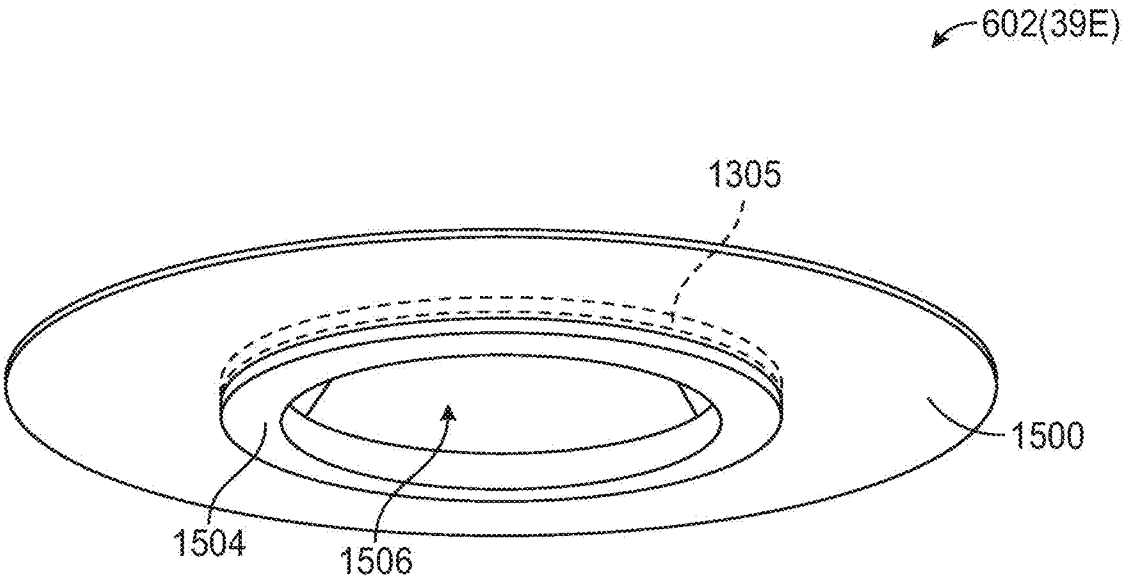
FIG. 39F is a perspective view of another embodiment of a lighting fixture using the waveguide of FIG. 38, the lighting fixture being configured for surface mounting to a ceiling structure and having a circular shape.

FIG. 39E is a perspective view of a lighting fixture 602(39E) according to one embodiment having a round shape, incorporating a waveguide 1500 according to FIG. 38, and being configured for suspension mounting by a ceiling mount 1301 and cables 1300. The lighting fixture 602(39E) includes a non-waveguide region 1504 that laterally bounds an unfilled opening 1506, with the non-waveguide region 1504 being laterally surrounded by the waveguide 1500. The waveguide 1500 may be illuminated with light sources contained in an annular shaped fixture housing 1305, and the waveguide 1500 may be devoid of a peripheral bezel or cap at an outermost edge thereof, FIG. 39F is a perspective view of a lighting fixture 602(39F) that is substantially identical to the fixture 602 (39E) shown in FIG. 39E (such that like elements will not be described again), but that is configured for surface mounting to a ceiling and is therefore devoid of suspension cables.

In certain embodiments, lighting fixtures described herein may include one or more peripheral reflector regions as well as one or more waveguides, wherein the foregoing items may be illuminated by separate light sources.

It is to be appreciated that any lighting fixtures described herein may be operated according to any of the operating modes or states described herein.

In certain embodiments, any of the foregoing aspects, and/or various separate aspects and features as described herein, may be combined for additional advantage. Any of the various features and elements as disclosed herein may be combined with one or more other disclosed features and elements unless indicated to the contrary herein.

Those skilled in the art will recognize improvements and modifications to the preferred embodiments of the present disclosure. All such improvements and modifications are considered within the scope of the concepts disclosed herein and the claims that follow.

The invention claimed is:

1. A lighting fixture comprising:
- a light-transmissive panel positioned under an array of light sources to provide a first cavity between the light-transmissive panel and the array of light sources; and
- a plurality of substantially parallel side panels along a perimeter of the light-transmissive panel, wherein the side panels comprise at least one inner face that is transversely oriented relative to the light-transmissive panel to define a second cavity bounded by and under the light-transmissive panel, and at least one outer face, wherein at least a portion of the at least one outer face defines a lateral edge of the lighting fixture; and a second light source configured to transmit light in a direction opposite the first light sources, wherein the second light source resides in a third cavity positioned over the first cavity.

2. The lighting fixture of claim 1, wherein the lighting fixture is configured to be suspended from a ceiling structure, and the light-transmissive panel emits light in a downward direction.

3. The lighting fixture of claim 1, wherein at least one of the side panels is a waveguide.

4. The lighting fixture of claim 3 further comprising an additional light source to illuminate the waveguide.

5. The lighting fixture of claim 4, wherein the light sources and the additional light source each comprise light emitting diodes.

6. The lighting fixture of claim 1, wherein the side panels are positioned along less than the entirety of the perimeter of the light-transmissive panel.

7. The lighting fixture of claim 1 further comprising control circuitry configured to selectively adjust, for one or more of the light sources, at least one of intensity and color temperature to cause aggregate emissions of the lighting fixture to dynamically change over time.

8. The lighting fixture of claim 1, wherein light emitted by the light-transmissive panel is shielded or filtered by the side panels.

9. The lighting fixture of claim 1, wherein the first cavity is closed to preclude transmission of natural light from an external environment through the light-transmissive panel.

10. The lighting fixture of claim 7, wherein the control circuitry is configured to selectively adjust at least one of intensity and color temperature for the light sources to illuminate the light-transmissive panel such that the lighting fixture resembles a skylight that is externally illuminated by the sun, and such that a perceived direction of external illumination of the lighting fixture moves from east to west over time.

11. A light fixture comprising:
- a light-transmissive panel positioned under an array of first light sources to provide a first cavity between the light-transmissive panel and the array of first light sources;
- a plurality of substantially parallel side panels along a perimeter of the light-transmissive panel, wherein the side panels comprise at least one face that is transversely oriented relative to the light-transmissive panel to define a second cavity bounded by and under the light-transmissive panel; and
- a second light source configured to transmit light in a direction opposite the first light sources, wherein the second light source resides in a third cavity positioned over the first cavity.

12. The lighting fixture of claim 11, wherein the lighting fixture is configured to be suspended from a ceiling structure, and the light-transmissive panel emits light in a downward direction, and the second light source emits light in an upward direction.

13. The lighting fixture of claim 11, wherein the third cavity is covered by a light-transmissive cover.

14. The lighting fixture of claim 11 further comprising control circuitry configured to selectively adjust, for one or more of the first light sources and the second light source, at least one of intensity and color temperature to cause aggregate emissions of the lighting fixture to dynamically change over time.

15. The lighting fixture of claim 11, wherein light emitted by the light-transmissive panel is shielded or filtered by the side panels.

16. The lighting fixture of claim 11, wherein at least one of the side panels is a waveguide.

17. The lighting fixture of claim 11, wherein the side panels are along less than the entirety of the perimeter of the light-transmissive panel.

18. The lighting fixture of claim 11, wherein the side panels are along the entirety of the perimeter of the light-transmissive panel.

19. The lighting fixture of claim 3, wherein the waveguide has a substantially linear geometry in the transverse direction relative to the light-transmissive panel.

* * * * *